(12) United States Patent
Cristofalo et al.

(10) Patent No.: US 9,396,475 B2
(45) Date of Patent: Jul. 19, 2016

(54) INTELLIGENT TARGETING OF TAGS IN A BROADCAST NETWORK

(75) Inventors: Michael Cristofalo, Doylestown, PA (US); Bruce J. Anderson, Chesterfield, NJ (US); Daniel C. Wilson, Edmonton (CA)

(73) Assignee: Invidi Technologies Corporation, Princeton, NJ (US)

( * ) Notice: Subject to any disclaimer, the term of this patent is extended or adjusted under 35 U.S.C. 154(b) by 1640 days.

(21) Appl. No.: 12/024,757

(22) Filed: Feb. 1, 2008

(65) Prior Publication Data
US 2008/0301727 A1 Dec. 4, 2008

Related U.S. Application Data

(60) Provisional application No. 60/877,753, filed on Feb. 1, 2007.

(51) Int. Cl.
*H04N 7/10* (2006.01)
*G06Q 30/02* (2012.01)

(52) U.S. Cl.
CPC ..................... *G06Q 30/02* (2013.01)

(58) Field of Classification Search
USPC .................... 725/32, 33, 34, 35, 36
See application file for complete search history.

(56) References Cited

U.S. PATENT DOCUMENTS

| | | | |
|---|---|---|---|
| 5,933,811 A | 8/1999 | Angles | |
| 2002/0059094 A1* | 5/2002 | Hosea et al. | 705/10 |
| 2006/0287915 A1* | 12/2006 | Boulet et al. | 705/14 |
| 2006/0293954 A1* | 12/2006 | Anderson et al. | 705/14 |
| 2006/0293955 A1* | 12/2006 | Wilson et al. | 705/14 |
| 2007/0162927 A1* | 7/2007 | Ramaswamy et al. | 725/36 |
| 2008/0022300 A1* | 1/2008 | Angiolillo et al. | 725/32 |

FOREIGN PATENT DOCUMENTS

EP 1 083 504 3/2001

* cited by examiner

*Primary Examiner* — Michael Hong
(74) *Attorney, Agent, or Firm* — Marsh Fischmann & Breyfogle LLP; Kent A. Fischmann

(57) ABSTRACT

A system and associated methodology are disclosed for targeting tags in a broadcast network. The tags may be associated with an ad or programming. In one implementation, the tags to be delivered at a user equipment device are selected at the user equipment device, for example, based on location or other user classification parameters. In this manner, different user equipment devices that are on the same bandwidth segment in the same network subdivision can receive different tags.

16 Claims, 50 Drawing Sheets

| ASSET | CLASSIFICATION | CHANNEL | BREAK |
|---|---|---|---|
| 0001 | M 18-24 | | 7 - 8 (1) |
| 0002 | M > 50K | | 7 - 8 (1) |
| 0003 | F 24-40 | | 7 - 8 (1) |
| 0004 | F 14-18 | CBS | 7 - 8 (1) |
| 0005 | M-F, 24-40 | CBS | 7 - 8 (1) |
| 0006 | M-F > 50K | V1 | 7 - 8 (1) |
| 0007 | L = 80304+00 | | 7 - 8 (1) |
| ⋮ | ⋮ | ⋮ | ⋮ |
| N | M-F, 50+ | | 7 - 8 (1) |

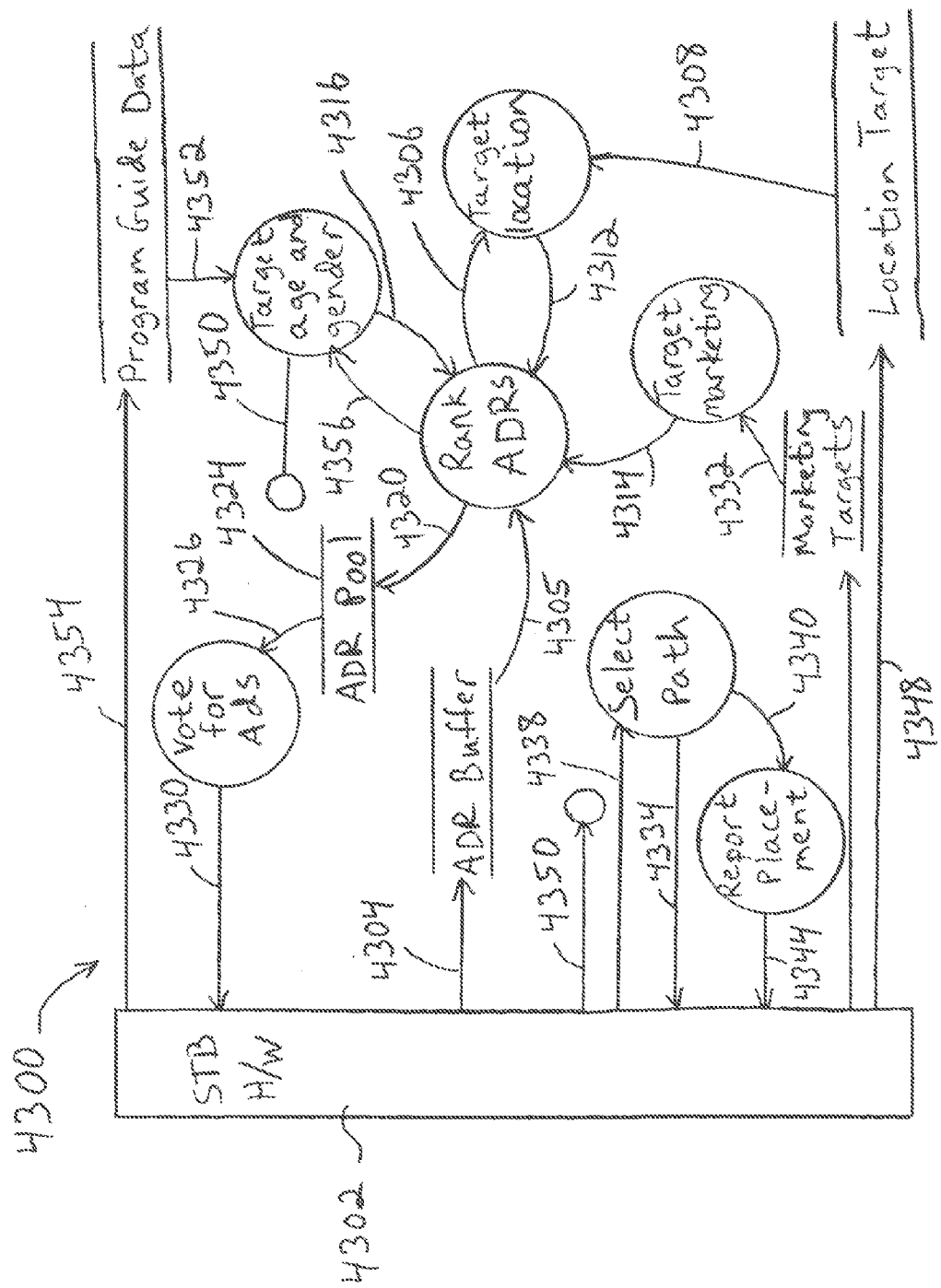

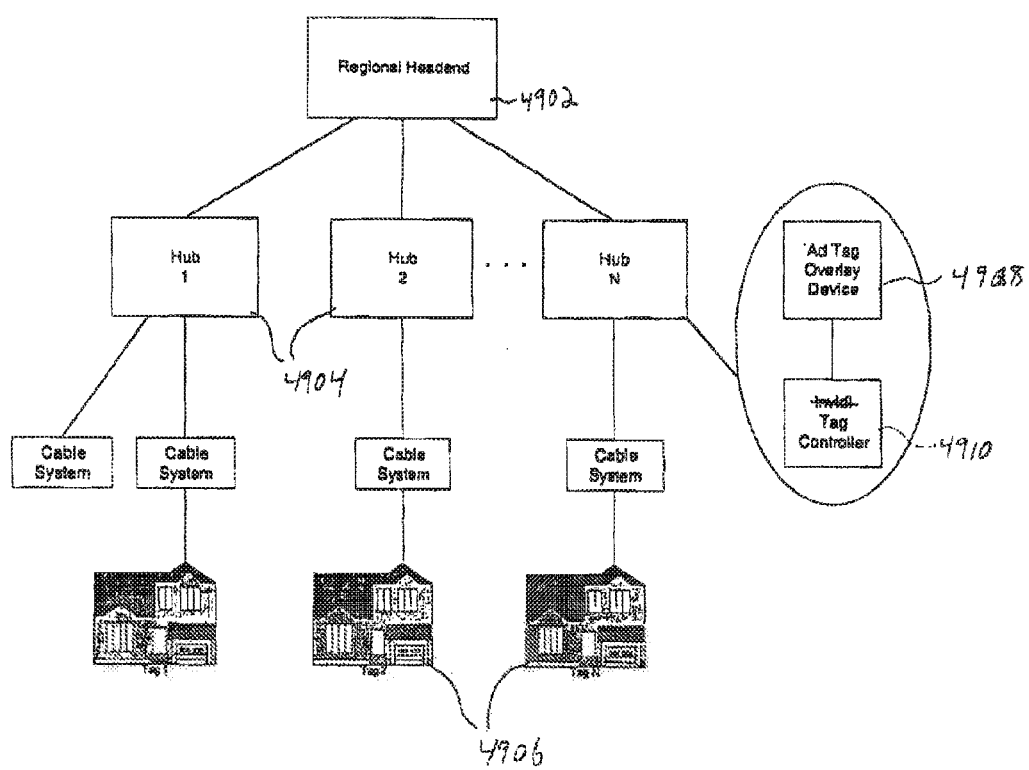

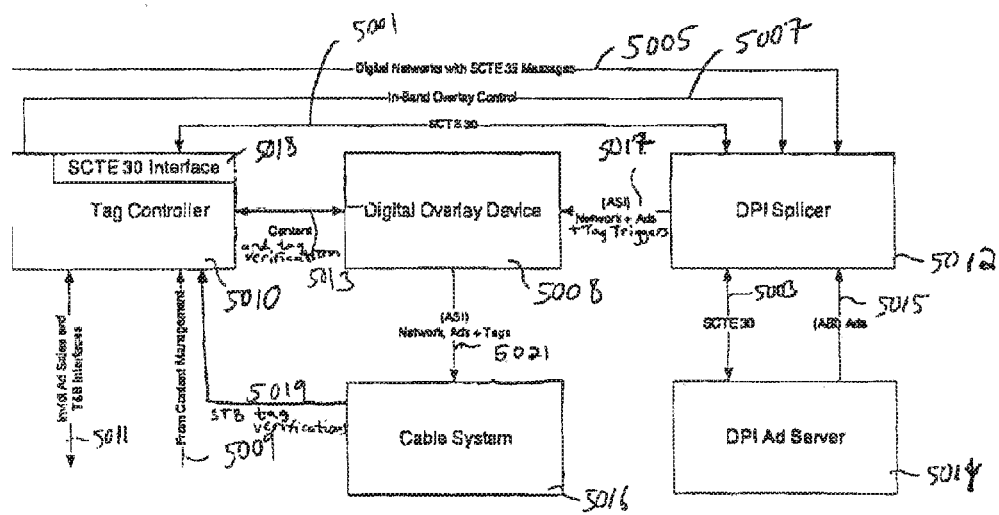

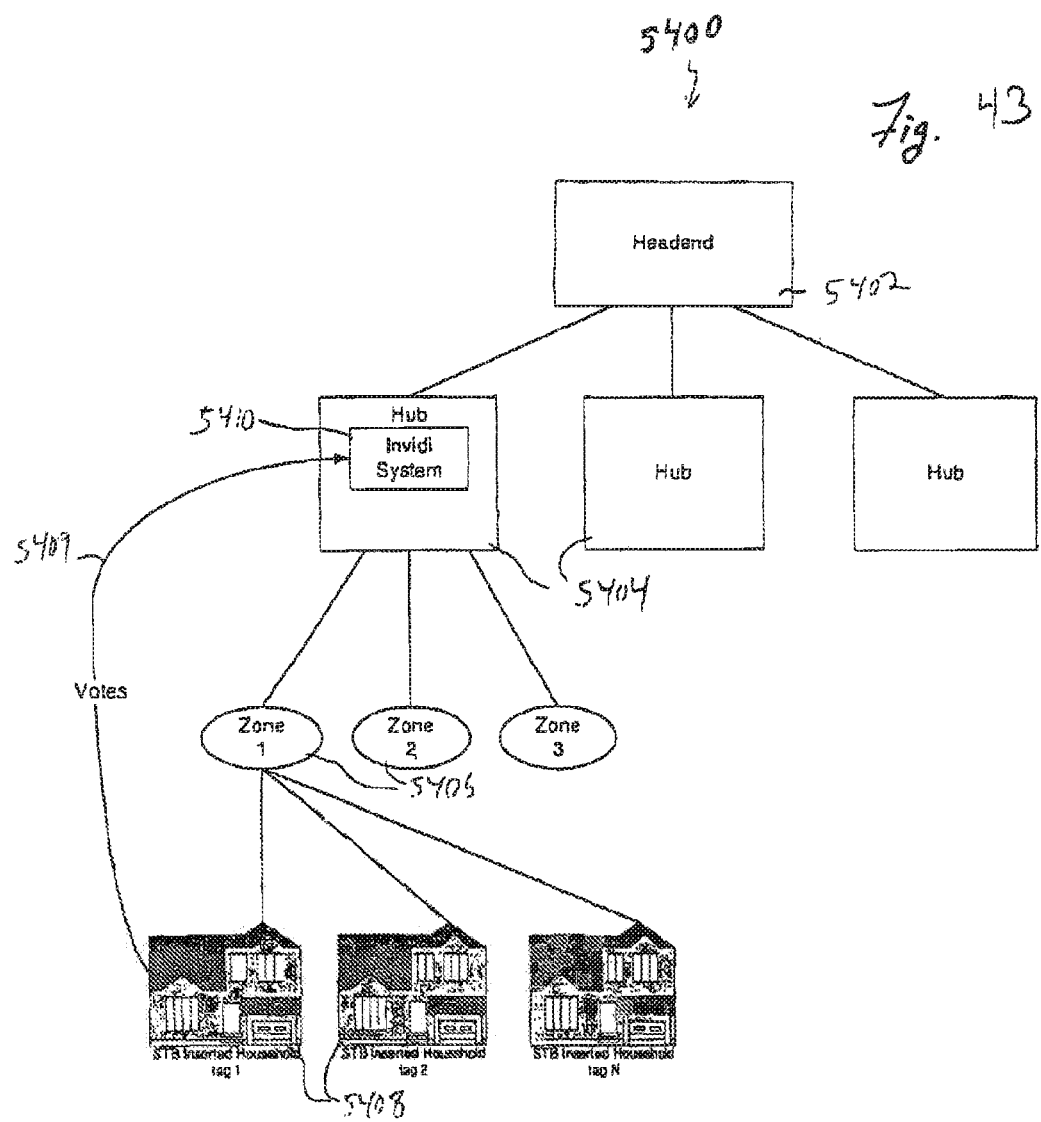

INTELLIGENT TARGETING OF TAGS IN A BROADCAST NETWORK

CROSS-REFERENCE TO RELATED APPLICATION

This application claims priority under 35 U.S.C. 119 to U.S. Provisional Application No. 60/877,753, entitled, "INTELLIGENT TARGETING OF TAGS IN A BROADCAST NETWORK," filed on Feb. 1, 2007, the contents of which are incorporated herein as if set forth in full.

FIELD OF INVENTION

The present invention relates in general to the provision of tags, e.g., localized, personalized or otherwise differentiated content, in connection with the provision of associated assets, such as advertisements or programming, in a broadcast network. More specifically, the present invention relates to improved targeting of tags to desired audiences and improved accounting based on actual tag delivery by user equipment devices.

BACKGROUND OF THE INVENTION

In broadcast networks, content is made available to multiple users, typically in synchronous fashion, without being specifically addressed to individual user equipment devices in point-to-point fashion. Examples of broadcast networks include cable and satellite television networks, satellite radio networks, IP networks used for multicasting content and networks used for podcasts or telephony broadcasts/multicasts. Content may also be broadcast over the airwaves. The content may be consumed by users in real-time or on a time-translated basis (e.g., recorded for later playback). Broadcast network content may be distributed or re-distributed in a direct address network, e.g., an IP network or data enabled telephony network.

Broadcast network content often includes programming content and informational content. For example, in the case of a television network, the programming content may include news programs, serial television programs, movies, paid programming or other content. The informational content may include advertisements, public service announcements, tags, trailers, weather or emergency notifications and a variety of other content, including both paid and unpaid content. Items of programming content and/or informational content constitute assets of asset providers such as advertisers or programming content providers.

In order to achieve a better return on their investment, asset providers often desire to target their assets to a selected audience. The case of advertisers on a cable television network is illustrative. For instance, an advertiser or a cable television network may desire to target its ads to certain demographic groups based on, for example, gender, age, income, geographic location, etc. Accordingly, tinder the conventional advertising model, once an advertiser has created an ad that is targeted to a desired group of viewers (e.g., targeted group) the advertiser may attempt to procure insertion-times in the network programming when the targeted group is expected to be among the audience of the network programming.

Targeting based on geographic location is of particular interest for certain advertisers. Continuing with the example of ads on a television network, an advertiser may desire to target ads or customize ads based on geographic zones or the like. For example, an advertiser may wish to limit ad distribution to locations proximate to a business outlet or to customize ads with contact information that varies depending on location, e.g., contact information for the local automobile dealership or information specific to a voting district or precinct. Moreover, an advertiser may desire to customize offerings based on location, e.g., to implement a plan of market protection at minimum cost. For example, a network operator may desire to provide a special offer to existing subscribers in a specific geographic area to avoid losing subscribers to a competing service provider. In such cases, it would be advantageous to target or customize ads based on the location of asset delivery.

Unfortunately, location targeting of ads in broadcast networks has generally been available only on a coarse basis. In the case of airwave television broadcast networks, for example, national and local ad spots may be designated. In this manner, certain ads can be "targeted" with respect to large broadcast areas, such as on a city-by-city basis. In cable networks, somewhat finer targeting is possible. For example, cable plants are generally divided into a number of subdivisions associated with network nodes. In some cases, different ads can be inserted at different nodes, allowing for finer location based targeting than is generally possible in airwave broadcast networks.

Additionally, due to the nature of broadcast networks, the ability to target assets to the targeted groups based on other audience classification parameters has been limited. That is, because undifferentiated content is typically broadcast to all users in a broadcast area, only coarse or group targeting based on such parameters has generally been possible. For example, as noted above, advertisers have conventionally purchased spots on programs believed to have an audience that roughly matched target demographics. Of course, though ratings information allows for some degree of certainty in predicting audience size and composition, the actual audience may vary considerably from the prediction. Moreover, even where the audience matches the targeted group in a gross sense, a significant portion of the audience may be outside of the targeted group.

In order to provide a further level of targeting, tags are sometimes used in connection with ads. In a typical application, such tags may include textual information that is appended to an ad, for example, on a black background or still-frame graphics for a few seconds at the conclusion of the ad. Thus, for example, if the ad was an automobile ad produced for general dissemination, the tag might provide information for a local dealer. Such tags gave generally been limited to regional granularity or, perhaps, somewhat less coarse granularity corresponding to network topology or distribution subdivisions in the case of cable television networks. In any case, such location targeting has generally been coarse and limited to network topology, which may or may not match the desired location zones for targeting. Moreover, targeting of such tags has generally been location dependent and has not been directly based on other targeting parameters, e.g., related to demographics.

SUMMARY OF THE INVENTION

The present invention is directed to an improved system and associated methodology for targeting tags in connection with broadcast network content. The tags are generally associated with a complete or stand-alone asset, such as an ad or programming. That is, the tag is not a necessary component of the asset but, rather, supplements the asset content. In this regard, the tag may be delivered at the start of or immediately preceding the asset, may be appended at the end of the asset or may be overlayed with the asset content during an asset delivery time period. The tag and associated asset can be conveniently inserted into the same bandwidth segment of the broadcast network. Alternatively, the tag can be provided out of band, or the tag and asset can be provided via separate bandwidth segments.

Generally, the asset will include content intended for more general distribution whereas the tag is directed to a narrower audience. The tag can thus serve to customize the asset relative to a target audience. In this manner, asset providers can devote substantial resources to develop a highly effective asset, where such resources are justified by the large distribution base for that asset, and use the tags to obtain the benefit of enhanced targeting. For example, the asset may be a product ad developed for regional, national or international deployment, and the tag may provide contact or other information regarding a local sales outlet for the product. Alternatively, the asset may be a television program or a program guide, and the tag may be a banner ad, a crawl or other content. The tag may include text, graphics (still frame or full video), audio content or any other matter or combination thereof, depending, for example, on the nature of the broadcast network and the preferences of the asset provider or others. In addition, the tag may have any desired duration, for example, shorter than, substantially equivalent to or greater than that of an associated asset. Moreover, the tag need not be associated with an asset with respect to how the tag is defined, distributed or how delivery is purchased or billed. For example, in the case of a tag implemented as a banner ad on a program guide, the banner ad space may be sold, and the content thereof may be established independently of the program guide content.

The present invention enables a variety of desirable attributes in relation to the use of such tags. For example, targeted tag distribution may be based on feedback or votes from individual user equipment devices (e.g., customer premises equipment such as a set-top box or enhanced television, or portable equipment such as a wireless phone, PDA, portable hard drive-based device, or the like) so that targeting is based on current network conditions, such as the size and composition of the current audience. In addition, different asset-tag combinations may be delivered to different users in the same network subdivision (e.g., the smallest level of broadcast distribution) using the same bandwidth segment of the broadcast network. In this regard, targeting may be based on user classification parameters other than network subdivision location for improved targeting. Moreover, reports can be generated reflecting actual tag delivery so as to allow for improved accounting. For example, a "watermark" or metadata may be transmitted with the tag such that the tag can be identified by the user equipment device for reporting purposes. Alternatively, for certain implementations, tag delivery can be verified by a network platform such as a headend in the case of cable television networks or other platforms in other systems such as satellite networks or Telco networks. In either case, such report information can further be used to provide search estimates to assist asset providers in designing future campaigns. Other desirable attributes will be apparent from the description below.

The tag system of the present invention can be implemented using a variety of architectures. For example, tags may be centrally generated and overlayed with assets in various asset-tag combinations. This allows for convenient centralized tag generation, e.g., using a digital overlay device, such as a dedicated overlay device or conventional digital ad insertion equipment with digital overlay capabilities. However, tags may be selected and inserted at any content origination location or combinations thereof, such as, in the case of cable television networks, at the headend, hub, zone and/or at the set top box. Similarly, insertion may occur at many different points in connection with other delivery mechanisms such as satellite or Telco networks. For example, a partial tag, such as a high-resolution background/logo graphic, may be generated at one location and another partial tag, such as text, may be generated at another. It will be appreciated that user equipment device implementation allows for individualized targeting but involves appropriate logic at the user equipment device. Implementation by an intermediate platform reduces or eliminates the need for tag targeting dedicated logic at individual user equipment devices but may result in less fine targeting. Hybrid targeting may also be implemented. For example, roughly targeted tags may be generated at an intermediate platform with highly targeted tag information added at the user equipment device. Various combinations of the noted attributes and architectures are associated with the several aspects of the invention as discussed below.

In accordance with one aspect of the present invention, a method and apparatus ("utility") involves generating asset-tag combinations at a central location and selectively distributing the combinations at local platforms. More specifically, the utility involves a first platform for transmitting combined asset-tag content segments. For example, in the case of a cable television network, the first platform may be implemented in a headend structure, a video on demand server or a zone or hub structure. Similarly, a variety of central location platforms exist in connection with other delivery mechanisms such as satellite and Telco networks. The utility further involves a number of second network platforms operative for receiving content from the first network platform or from another source, e.g., delivered via another network such as over the internet, and selectively providing portions of the content for delivery at one or more user equipment devices. For example, the second network platforms may include local hubs and/or platforms co-located with user equipment devices in the case of a cable network or other intermediate platforms or subscriber equipment in other networks. First and second combined content segments are transmitted from the first network platform to the second network platforms. Each of the combined content segments includes an asset portion and a tag portion. A first combined content segment is then provided from one of the second network platforms to at least one of the user equipment devices, and the second combined content segment is provided from another one of the second network platforms to another one of the user equipment devices. In this manner, different asset-tag combinations can be centrally generated for targeted distribution. The asset tag combinations may be distributed for delivery in connection with real time or time-shifted programming. Moreover, the tag may be overlayed (in whole or in part) with the asset at a network platform or at the user equipment device.

In accordance with another aspect of the present invention, reports are generated regarding actual tag delivery so as to allow for better accounting. It will be appreciated that it is desirable to account for actual tag delivery. In the case of targeted tag distribution, such accounting may be difficult due to contingent delivery associated with targeting parameters. Accordingly, the present aspect of the invention involves: providing a billing system for billing asset providers for delivery of assets within a broadcast area of the broadcast network; selectively delivering a tag to less than all of the current users of a given bandwidth segment of the broadcast network; and providing report information to the billing system. The report information provides an indication concerning actual delivery of the tag and may be provided by user equipment devices, a central network platform, and/or intermediate platforms interposed between the central network platform and the user equipment devices. For example, in the case of reporting by user equipment devices, such reporting may be based on a watermark or metadata associated with the tag, as described above. Such report information allows for better accounting for tag delivery than may be available, for example, in connection with ratings information that may not accurately reflect actual delivery to the targeted groups.

In accordance with a further aspect of the present invention, tags are targeted based on feedback regarding current network conditions, such as information regarding the size and/or composition of the current audience. An associated utility involves providing a number of tags for association with assets in the broadcast network, receiving communications (e.g., votes) from user equipment devices and transmitting one or more tags to user equipment devices based on the communications. In the case of votes, at least some user equipment devices may receive a list of available tags, together with targeting information for each tag (e.g., identifying a target demographic or geographical zone) in advance of such voting so that each voting user equipment device can select suitable tags. The communications preferably include an indication regarding a suitability of one or more of the tags for delivery at the user equipment device. Accordingly, tags may be selected for distribution within a given broadcast area based on a determination as to what tags are most suitable for the current audience.

In accordance with a still further aspect of the present invention, tags are selected at user equipment devices. An associated utility involves: receiving, at a user equipment device, a number of tags and at least one asset; selecting, at the user equipment device, one of the tags for association with the asset; and delivering the selected tag in association with the selected asset at the user equipment device. It will be appreciated that implementing tag selection at the user equipment device allows for finer tag targeting than targeting limited to broadcast network subdivisions, e.g., individualized or household targeting. Consequently, various user classification parameters may be utilized to effect such targeting.

In accordance with another aspect of the present invention, different tags are delivered to users of the same network subdivision on a given bandwidth segment at a given time. Specifically, an associated utility involves: delivering, at a first time, a first combined content segment at a first user equipment device in a first broadcast network subdivision; and delivering, at the first time, a second combined content segment at a second user equipment device in the first broadcast network subdivision. Each of the first and second user equipment devices is associated with a first bandwidth segment at the first time. For example, the first and second user equipment devices may receive the same asset with different tags or different assets with the same tag. The first and second combined content segments may each be inserted into the first bandwidth segment at the respective user equipment devices or one or both of the user equipment devices may switch to a separate bandwidth segment for delivery of the combined content segment and switch back to the first bandwidth segment at the conclusion thereof. Alternatively, in certain network implementations, such as IPTV and switched broadcast systems, operators can send individual streams to each user. In such cases, no switching is necessary at the user equipment device because the network operator can insert individualized assets/tags for each user. Alternatively, tag content can be broadcast or sent to a user group including individuals who are not part of the target group for the tag content. For example, all tag options for given tag delivery spot may be sent to all participating users, together with audience classification information identifying the target audience segment for each item of tag content. The audience classification information can then be used at each user equipment device to select which item(s) of tag content to deliver or store for delivery.

In accordance with a still further aspect of the present invention, tags are targeted based on a user classification independent of network subdivision location. In particular, a number of tags are provided for selective association with assets for delivery at user equipment devices of the broadcast network. A particular tag is selected for association with an asset at a first user equipment device based on a user classification associated with that device. The user classification is substantially independent of a network subdivision location of the first user equipment device. For example, the user classification may relate to demographics, a lifestyle or interests of a current user or may relate to a location parameter independent of network subdivisions. In the case of demographics or other user-dependent information, such information may be inferred, at least in part, based on inputs at the user equipment device, such as a click stream from a remote control.

In accordance with yet another aspect of the present invention, a hybrid tag targeting system is implemented. An associated utility involves making a first selection of a set of tags for delivery to a set of user equipment devices in a network subdivision and making a second selection of a subset of less than all of the set of tags for delivery to a subset of less than all of the set of user equipment devices in the network subdivision. For example, the set of tags may be delivered to all user equipment devices on a given bandwidth segment of the network subdivision. This set of tags may include high quality graphics in the case of a cable television network. Individual user equipment devices may select individual tags for association with a given asset. For example, a user equipment device may add text specifically targeted for that user equipment device. Thus, a trademark, logo or other material may be generated in high quality graphics on a network platform, and text may be added at the user equipment device to identify a local store or outlet. In this manner, significant flexibility is accommodated to target high quality tags and finely targeted tag information.

BRIEF DESCRIPTION OF THE DRAWINGS

For a more complete understanding of the present invention and further advantages thereof, reference is now made to the following detailed description, taken in conjunction with the drawings, in which:

FIG. 17B shows a single asset option list for multiple breaks and channels.

FIG. 28B is an exemplary Graphical User Interface (GUI) of the targeted content interface of FIG. 28A.

FIG. 28C is an alternative GUI of the targeted content interface of FIG. 28A.

FIG. 32 is a state diagram of a location targeting system in accordance with the present invention;

FIGS. 35A-35I depict frames of an ad including an ad tag delivered in accordance with the present invention.

FIG. 38 shows a tag delivery system in accordance with the present invention.

FIGS. 39-43 illustrate alternative implementations of a tag targeting system in accordance with the present invention.

DETAILED DESCRIPTION

Figure 1:
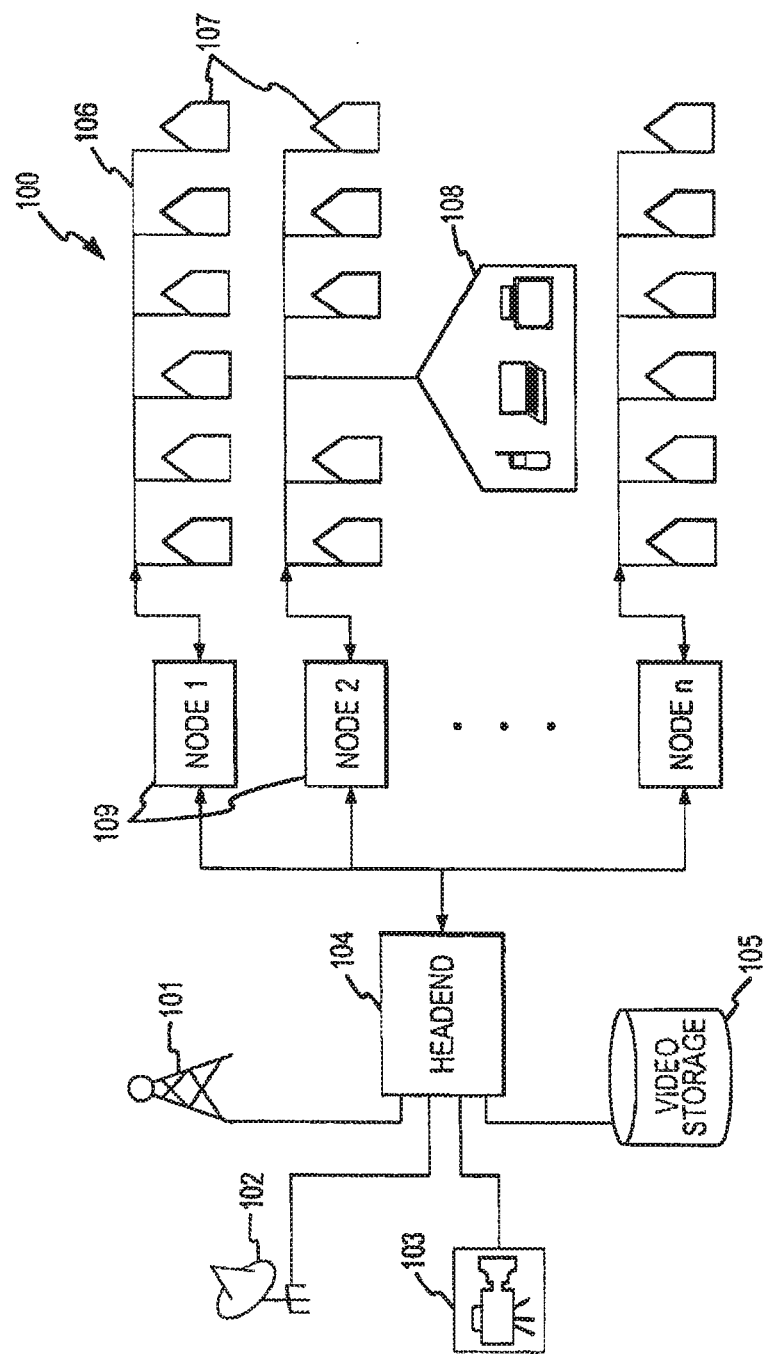
FIG. 1 illustrates major components of a cable television network.

The present invention relates to targeting of tags in communications networks, including broadcast networks. As noted above, the tags are associated with an asset, such as an ad, distributed in the network. The tags can be used to localize, personalize or otherwise differentiate the message conveyed to different network users. Upon delivery, the tags are thus associated with an asset in an asset-tag combination, which may be in any of various forms, e.g., sequential, overlayed, etc. In one implementation, the tag targeting functionality is incorporated into an asset targeting system. Indeed, tags are a type of asset and may be targeted based on similar criteria to other types of assets using similar targeting mechanisms. Thus, an asset targeting system is first described in detail below. Thereafter, considerations specific to tags are described.

It should be appreciated, however, that targeting of tags is not limited to an asset targeting system as described below. For example, in accordance with the present invention, targeting can be accomplished directly from the advertiser to the user equipment device. Specifically, tag options and associated logic may be included in connection with an asset. The user equipment devices may then be equipped to interpret the tag options and logic as to select appropriate tags for delivery. In this manner, participation by network operators can be minimized or substantially eliminated.

The invention has particular application with respect to networks where content is broadcast to network users; that is, the content is made available via the network to multiple users without being specifically addressed to individual user nodes in point-to-point fashion. In this regard, content may be broadcast in a variety of networks including, for example, cable and satellite television networks, satellite radio networks, IP networks used for multicasting content and networks used for podcasts or telephony broadcasts/multicasts. Content may also be broadcast over the airwaves though, as will be understood from the description below, certain aspects of the invention make use of bi-directional communication channels which are not readily available, for example, in connection with conventional airwave based televisions or radios (i.e., such communication would involve supplemental communication systems). Targeting may still be accomplished in terrestrial broadcast networks without supplemental communication systems, based on user equipment device tag selection without, for example, voting and reporting. In various contexts, the content may be consumed in real time or stored for subsequent consumption. Thus, while specific examples are provided below in the context of a cable television network for purposes of illustration, it will be appreciated that the invention is not limited to such contexts but, rather, has application to a variety of networks and transmission modes.

Certain aspects of the invention are also applicable in contexts other than traditional broadcast mode distribution. For example, assets with tags (or just an asset or a tab alone) may be distributed via the internet, an IPTV network or switched broadcast system involving delivery of individually addressed streams to user equipment devices, the facilitating targeting of assets and/or tags as discussed below. In addition, broadcast networks are often used to interactively deliver programming to particular users as in the case of video on demand (VOD) movies or VOD time shifted network programming. Assets and tags may be targeted to users in such contexts in accordance with the present invention. Indeed, time of day may be a relevant factor in targeting assets and tags in connection with time-shifted content.

The targeted assets may include any type of asset that is desired to be targeted to network users. It is noted that such targeted assets are sometimes referred to as "addressable" assets (though, as will be understood from the description below, targeting can be accomplished without addressing in a point-to-point sense). For example, these targeted assets may include advertisements, internal marketing (e.g., information about network promotions, scheduling, upcoming events and user equipment devices, such as IP telephony, cable modems, etc.), public service announcements, weather or emergency information, or programming. The targeted assets may be independent or included in a content stream with other assets such as untargeted network, programming. In the latter case, the targeted assets may be interspersed with untargeted programming (e.g., provided during programming breaks) or may otherwise be incorporated onto or combined with the programming as by being superimposed on a screen portion in the case of video programming. In the description below, specific examples are provided in the context of targeted assets provided during breaks in television programming. While this is an important commercial implementation of the invention, it will be appreciated that the invention has broader application. Thus, references below to "programming" (which is a type of asset), as distinguished from interstitial "assets" such as advertising, are simply for convenience and should not be understood as limiting the types of content that may be targeted or the contexts in which such content may be provided.

The following description is divided into a number of sections. In the Introduction section, the broadcast network and network programming environments are first described. Thereafter, an overview of the targeted asset environment is provided including a discussion of certain shortcomings of the conventional asset delivery paradigm. The succeeding section provides an overview of a targeted asset system in accordance with the present invention highlighting advantages of certain preferred implementations thereof. Finally, the last sections describe individual components of the system in greater detail and provide a detailed disclosure of exemplary implementations with specific reference to location targeting and targeting of tags in a cable television environment, including VOD applications. It will be appreciated that improved location targeting improves the value of tags as location is an important targeting criterion for tags.

I. Introduction

A. Broadcast Networks

The present invention has particular application in the context of networks primarily used to provide broadcast content, herein termed broadcast networks. Such broadcast networks generally involve synchronized distribution of broadcast content to multiple users. However, it will be appreciated that certain broadcast networks are not limited to synchronously pushing content to multiple users but can also be used to deliver content to specific users, including on a user pulled basis. As noted above, examples of broadcast networks include cable television networks, satellite television networks, and satellite radio networks. In addition, audio, video or other content may be broadcast across Internet protocol and telephony networks. In any such networks, it may be desired to insert targeted assets such as advertisements into a broadcast stream. Examples of broadcast networks used to delivery content to specific users include broadcast networks used to deliver on demand content such as VOD and podcasts. The present invention provides a variety of functionality in this regard, as will be discussed in detail below.

For purposes of illustration, the invention is described in some instances below in the context of a cable television network implementation. Some major components of a cable television network 100 are depicted in FIG. 1. In the illustrated network 100, a headend 104 obtains broadcast content from any of a number of sources 101-103. Additionally, broadcast content may be obtained from storage media 105 such as a via a video server. The illustrated sources include an antenna 101, for example, for receiving content via the airwaves, a satellite dish 102 for receiving content via satellite communications, and a fiber link 103 for receiving content directly from studios or other content sources. It will be appreciated that the illustrated sources 101-103 and 105 are provided for purposes of illustration and other sources may be utilized.

The headend 104 processes the received content for transmission to network users. Among other things, the headend 104 may be operative to amplify, convert and otherwise process the broadcast content signals as well as to combine the signals into a common cable for transmission to network users 107 (although graphically depicted as households, as described below, the system of the present invention can be used in implementations where individual users in a household are targeted). It also is not necessary that the target audience be composed households or household members in any sense. For example, the present invention can be used to create on-the-fly customized presentations to students in distributed classrooms, e.g., thus providing examples which are more relevant to each student or group of students within a presentation being broadcast to a wide range of students. The headend 104 also processes signals from users in a variety of contexts as described below. The headend 104 may thus be thought of as the control center or local control center of the cable television network 100.

Typically, there is not a direct fiber link from the headend 104 to the customer premises equipment (CPE) 108. Rather, this connection generally involves a system of feeder cables and drop cables that define a number of system subsections or branches. This distribution network may include a number of nodes 109 or other platforms such as DSLAMs depending on the specific network context and implementation. The signal may be processed at these nodes 109 to insert localized content, filter the locally available channels or otherwise control the content delivered to users in the node area. Moreover, in some networks, the nodes or another intermediate platform such as a DSLAM may have significant intelligence, access to user inputs (e.g., a click stream) and switching/insertion functionality. Accordingly, such platforms can be used to implement a variety of functionality relevant to the present invention as will be understood from the description below. The resulting content within a node area is typically distributed by optical and/or coaxial links 106 to the premises of particular users 107. Finally, the broadcast signal is processed by the CPE 108, which may include a television, data terminal) a digital set top box, DVR or other terminal equipment. It will be appreciated that digital or analog signals may be involved in this regard.

In cable television or other broadcast networks, users employ the network, and network operators derive revenue, based on delivery of desirable content or programming. The stakeholders in this regard include programming providers, asset providers such as advertisers (who may be the same as or different than the programming providers), network operators such as Multiple Systems Operators (MSOs), and users—or viewers in the case of television networks. Programming providers include, for example: networks who provide series and other programming, including on a national or international basis; local affiliates who often provide local or regional programming; studios who create and market content including movies, documentaries and the like; and a variety of other content owners or providers. The content may be provided in real time, time-shifted or through a VOD system.

Asset providers include a wide variety of manufacturers, retailers, service providers and public interest groups interested in, and generally willing to pay for, the opportunity to deliver messages to users on a local, regional, national or international level. As discussed below, such assets include: conventional advertisements; tag content such as ad tags (which may include static graphic overlays, animated graphics files or even real-time video and audio) associated with the advertisements or other content; banners or other content superimposed on or otherwise overlapping programming; product placement; and other advertising mechanisms. In addition, the networks may use insertion spots for internal marketing as discussed above, and the spots may be used for public service announcements or other non-advertising content.

Network operators are generally responsible for delivering content to users and otherwise operating the networks as well as for contracting with the networks and asset providers and billing. Users are the end consumers of the content. Depending, for example, on the nature of the network, users may employ a variety of types of equipment, including televisions, set top boxes, iPOD™ devices, data terminals, satellite delivered video or audio to an automobile, appliances (such as refrigerators) with built-in televisions, etc. For convenience, customer premises equipment (CPEs) or set top boxes (STBs) are referenced in many of the specific examples below.

As described below, all of these stakeholders have an interest in improved delivery of content including targeted asset delivery. For example, users can thereby be exposed to assets that are more likely of interest and can continue to have the costs of programming subsidized or wholly borne by asset providers. Asset providers can benefit from more effective asset delivery and greater return on their investment Network operators and asset providers can benefit from increased value of the network as an asset delivery mechanism and, thus, potentially enhanced revenues. The present invention addresses all of these interests.

It will be noted that it is sometimes unclear that the interests of all of these stakeholders are aligned. For example, it may not be obvious to all users that they benefit by consuming such assets. Indeed, some users may be willing to avoid consuming such assets even with an understanding of the associated costs. Network operators and asset providers may also disagree as to how programming should best be distributed, how asset delivery may be associated with the programming, and how revenues should be shared. As described below, the present invention provides a mechanism for accommodating potentially conflicting interests or for enhancing overall value such that the interests of all stakeholders can be advanced.

Assets can be provided via a variety of distribution modes including real-time broadcast distribution, forward-and-store (as discussed immediately below) and on-demand delivery such as VOD. Real-time broadcast delivery involves synchronous delivery of assets to multiple users such as the conventional paradigm for broadcast radio or television (e.g., airwave, cable or satellite). The forward-and-store mode involves delivery of assets ahead of time to CPEs with adequate storage resources, e.g., a DVR, a DSTB with adequate storage, or data terminal. The asset is stored for later display, for example, as prompted by the user or controlled according to logic resident at the CPE and/or elsewhere in the communications network. The on-demand mode involves individualized delivery of assets from the network to a user, often on a pay-per-view basis. The present invention can be utilized in connection with any of these distribution modes or others. In this regard, important features of the present invention can be implemented using conventional CPEs without requiring substantial storage resources to enhance even real-time broadcast programming, for analog and digital users.

The amount of programming that can be delivered to users is limited by the available programming space. This, in turn, is a function of bandwidth. Thus, for example, cable television networks, satellite television networks, satellite radio networks, and other networks have certain bandwidth limitations. In certain broadcast networks, the available bandwidth may be divided into bandwidth portions that are used to transmit the programming for individual channels or stations. In addition, a portion of the available bandwidth may be utilized for bidirectional messaging, metadata transmissions and other network overhead. Alternately, such bidirectional communication may be accommodated by any appropriate communications channels, including the use of one or more separate communications networks. The noted bandwidth portions may be defined by dedicated segments, e.g., defined by frequency ranges, or may be dynamically configured, for example, in the case of packetized data networks. As will be described below, in one implementation, the present invention uses available (dedicated or opportunistically available) bandwidth for substantially real time transmission of assets, e.g., for targeted asset delivery with respect to a defined asset delivery spot. In this implementation, bidirectional communications may be accommodated by dedicated messaging bandwidth and by encoding messages within bandwidth used for asset delivery. A DOCSIS path or certain TELCO solutions using switched IP may be utilized for bidirectional communications between the headend and CPEs and asset delivery to the CPEs, including real-time asset delivery, in the systems described below. Alternatively, in forward-and-store mode, assets (including tags) may be transmitted ahead of time as bandwidth is available for storage at the CPE, e.g., on a DVR hard drive. For example, highly targeted tag text (including, for example, text targeted to specific locations on a very fine or highly granular basis) may be trickled to CPEs for storage by appropriate CPEs as bandwidth is available. Such transmissions could occur over extended time periods making use of even minimal segments of available bandwidth.

Figure 2:
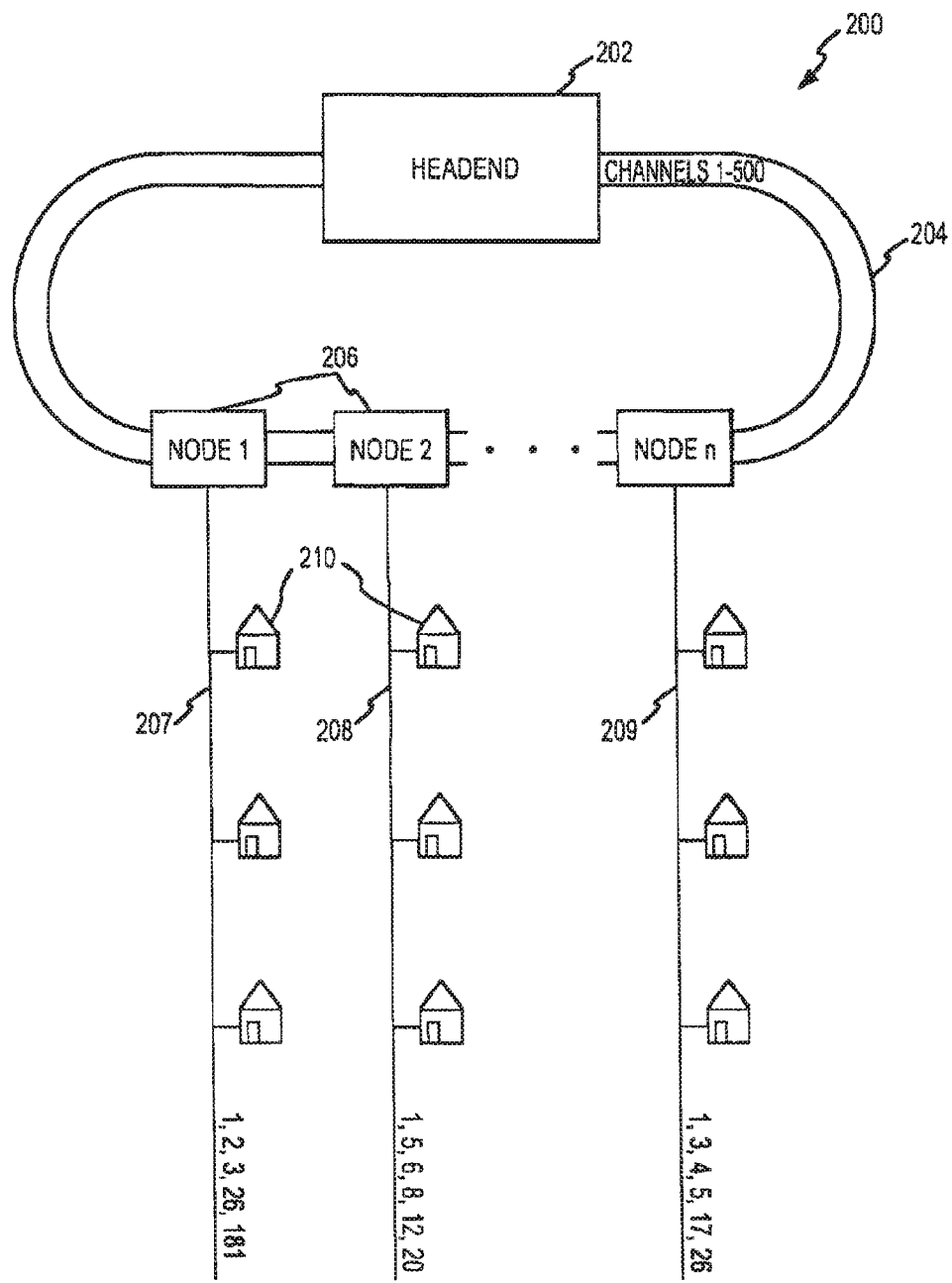
FIG. 2 illustrates bandwidth usage that is dynamically determined on a geographically dependent basis via networks.

It will be appreciated that bandwidth usage may be dynamically determined on a geographically dependent (or network subdivision dependent) basis. An example of this is networks, such as switched digital networks, including node filters as illustrated in FIG. 2. The illustrated network 200 includes a number of nodes 206 associated with a headend 202 via a high bandwidth link 204. The content stream transmitted from the headend 202 via the link 204 may include a large amount of content, for example, hundreds of video channels. Content is delivered from the various nodes 206 to individual CPEs 210 via local links 207-209 which may have a more limited bandwidth. For example, these local links 207-209 may include fiber optic and coaxial cable segments. As shown, communications between the headend 202 and CPEs 210 are bidirectional Due to bandwidth considerations, each of the nodes 206 or group of nodes (Service Group) may include a node switch operative to transmit only a subset of the content from link 204 to the local links 207-209. In order to optimize use of the limited bandwidth, the subset may be different for each of the nodes 206 or Service Groups. For example, a given channel may be transmitted via any one of the local links 207, 208 or 209 only upon request by a CPE 210 on that link. Thus, in the illustrated example, local link 207 transmits video channels 1, 2, 3, 26 and 181; local link 208 transmits video channels 1, 5, 6, 8, 12 and 20; and local link 209 transmits video channels 1, 3, 4, 5, 17 and 26. It will be appreciated that, if links 207-209 formed a Service Group, everyone connected to nodes 206 will receive the same channels.

Such node switches (which are not disposed in the node but are embodied in switched broadcast equipment for each Service Group) thereby provide a, mechanism for optimizing the use of available bandwidth relative to the desires of users. However, such node switches may complicate the delivery of assets or affect the perception of network reach and thus impact the valuation of asset delivery in the context of the conventional asset delivery paradigm. That is, in some cases, a given network may not be immediately available to a user in a specific node or Service Group area such that the user, in fact, cannot be reached for a given asset delivery spot. Perhaps as importantly, the fact that a reduced number of networks are passed to users in specific node areas may impact that perception of network reach and asset delivery value. Node switches also complicate tracking of targeted asset delivery given the dynamic nature of the network. As discussed below, the present invention allows for enhanced asset delivery even in networks implementing node switches. Indeed, the present invention takes advantage of node switches to identify available bandwidth for delivery of asset options.

B. Scheduling

What programming is available on particular channels or other bandwidth segments at particular times is determined by scheduling. Thus, in the context of a broadcast television network, individual programming networks, associated with particular programming channels, will generally develop a programming schedule well into the future, e.g., weeks or months in advance. This programming schedule is generally published to users so that users can find programs of interest. In addition, this programming schedule is used by asset providers to select desired asset delivery spots.

Asset delivery is also scheduled. That is, breaks are typically built into or otherwise provided in programming content. In the case of recorded content, the breaks are predefined. Even in the case of live broadcasts, breaks are built-in. Thus, the number and duration of breaks is typically known in advance, though the exact timing of the spots may vary to some extent. However, this is not always the case. For example, if sporting events go into overtime, the number, duration and timing of breaks may vary dynamically. As discussed below, the system of the present invention can handle real-time delivery of assets for updated breaks.

In connection with regularly scheduled breaks, as discussed below, defined avail windows establish the time period during which certain breaks or spots occur, and a cue tone or cue message signals the beginning of such breaks or spots. In practice, an avail window may be as long as or longer than a program and include all associated breaks. Indeed, avail windows may be several hours long, for example, in cases where audience demographics are not expected to change significantly over large programming blocks. In this regard, an MSO may merge multiple avail windows provided by programming networks.

More specifically, a break may include a series of asset delivery spots and the content of a break may be determined by a number of entities. For example, some asset delivery is distributed on a basis coextensive with network programming, e.g., on a national basis. This asset delivery is conventionally scheduled based on a timed playlist. That is, the insertion of content is centrally controlled to insert assets at defined times. Accordingly, the programming and national asset delivery may be provided by the programming networks as a continuous content stream without cues for asset insertion. For example, prime-time programming on the major networks is often principally provided in this fashion.

In other cases, individual spots within a break are allocated for Regional Operations Center (ROC), affiliate, super headend or local (headend, zone) content. In these cases, a cue tone or message identifies the start of the asset delivery spot or spots (a series of assets in a break may all trigger from one cue). The cue generally occurs a few seconds before the start of the asset delivery insertion opportunity and may occur, for example, during programming or during the break (e.g., during a national ad). The system of the present invention can be implemented at any or all levels of this hierarchy to allow for targeting with respect to national, regional and local assets. In the case of regional or local targeted asset delivery, synchronous asset options (as discussed below) may be inserted into designated bandwidth in response to cues. In the case of national asset delivery, network signaling may be extended to provide signals identifying the start of a national spot or spots, so as to enable the inventive system to insert synchronous national asset options into designated bandwidth. For example, such signaling may be encrypted for use only by the inventive targeted asset system.

Network operators or local network affiliates can generally schedule the non-national assets to be included within defined breaks or spots for each ad-supported channel. Conventionally, this scheduling is finalized ahead of time, typically on a daily or longer basis. The scheduled assets for a given break are then typically inserted at the headend or ROC in response to the cue tone or message in the programming stream. Thus, for example, where a given avail window includes three breaks (each of which may include a series of spots), the scheduled asset(s) for the first break is inserted in response to the first cue, the scheduled asset(s) for the second break is inserted in response to the second cue, and the scheduled asset(s) for the third break is inserted in response to the third cue. If a cue is missed, all subsequent assets within an avail window may be thrown off schedule.

It will be appreciated that such static, daily scheduling can be problematic. For example, the programming schedule can often change due to breaking news, ripple effects from schedule over-runs earlier in the day or the nature of the programming. For example, certain live events such as sporting events are difficult to precisely schedule. In such cases, static asset delivery schedules can result in a mismatch of scheduled asset to the associated programming. For example, when a high value programming event such as a certain sporting event runs over the expected program length, it may sometimes occur that assets intended for another program or valued for a smaller audience may be shown when a higher value or better-tailored asset could have been used if a more dynamic scheduling regime were available. The present invention allows for such dynamic scheduling as will be discussed in more detail below. The invention can also accommodate evolving standards in the field of dynamic scheduling.

C. The Conventional Asset Delivery Paradigm

Conventional broadcast networks may include asset-supported and premium content channels/networks. As noted above, programming content generally comes at a substantial cost. That is, the programming providers expect to be compensated for the programming that they provide which has generally been developed or acquired at significant cost. That compensation may be generated by asset delivery revenues, by tees paid by users for premium channels, or some combination of the two. In some cases, funding may come from another source such as public funding or internal marketing departments.

In the case of asset-supported networks, the conventional paradigm involves time-slot buys. Specifically, asset providers generally identify a particular program or time-slot on a particular network where they desire their assets to be aired. The cost for the airing of the asset depends on a number of factors, but one primary factor is the size of the audience for the programming in connection with which the asset is aired. Thus, the standard pricing model is based on the cost per thousand viewers (CPM), though other factors such as demographics or audience composition are involved as discussed below. The size of the audience is generally determined based on ratings. The most common benchmark for establishing these ratings is the system of Nielsen Media Research Corporation (Nielsen). One technique used by Nielsen involves monitoring the viewing habits of a presumably statistically relevant sampling of the universe of users. Based on an analysis of the sample group, the Nielsen system can estimate what portion of the audience particular programs received and, from this, an estimated audience size for the program can be projected. Thus, the historical performance of the particular program, for example, as estimated by the Nielsen system, may be used to set asset delivery prices for future breaks associated with that program.

Figure 4:
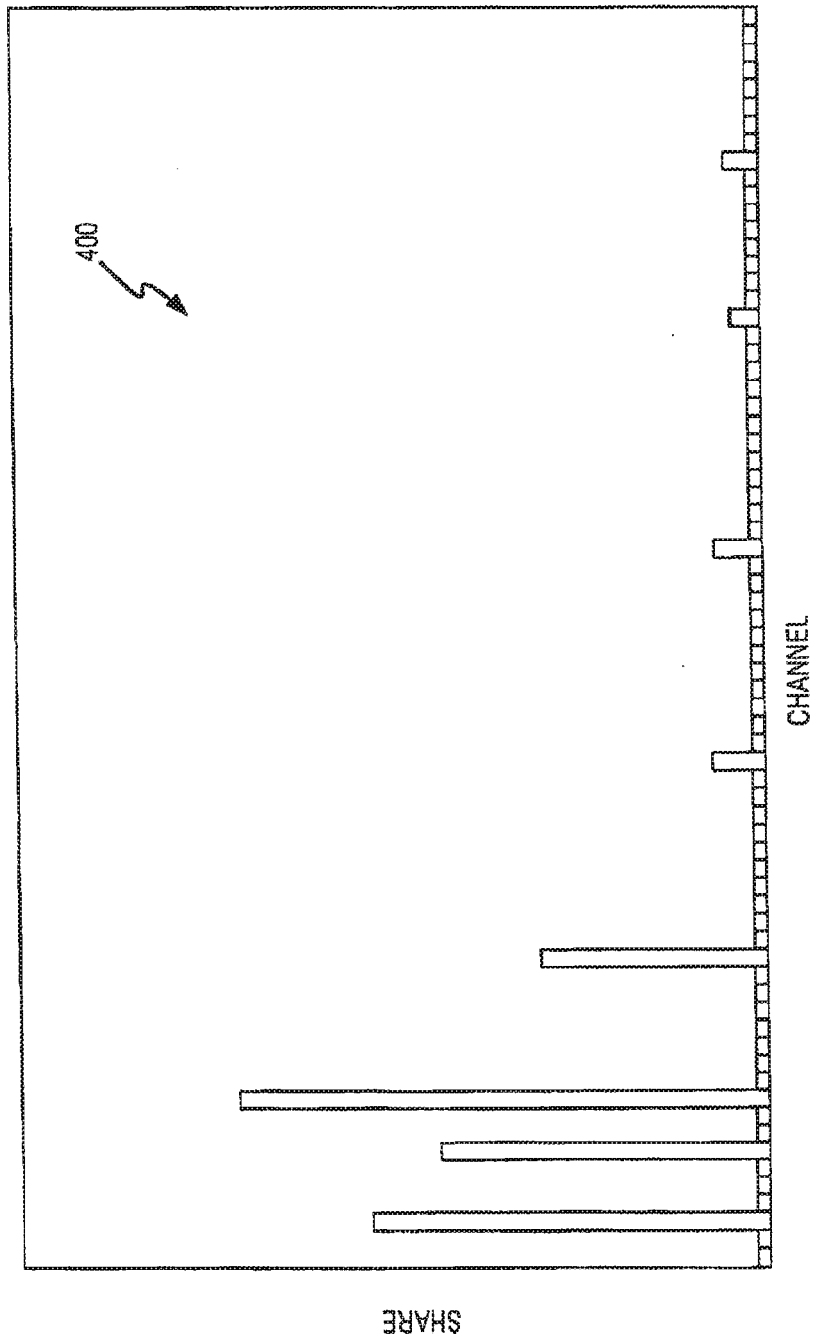
FIG. 4 illustrates an exemplary audience shares of various networks as may be used to set asset delivery prices for future breaks associated with the program.

In practice, this results in a small number of programming networks being responsible for generating a large portion of the overall asset revenues. This is graphically depicted in FIG. 4, which generally illustrates this phenomenon, although it is not based on actual numbers. As shown in FIG. 4, it is often the case that three or four programming networks out of many available programming networks garner very large shares whereas the remaining programming networks have small or negligible share. Indeed, in some cases, many programming networks will have a share that is so small that it is difficult to statistically characterize based on typical Nielsen sampling group sizes. In these cases, substantial asset revenues may be generated in connection with the small number of programming networks having a significant share while very little revenue is generated with respect to the other programming networks. This is true even though the other programming networks, in the aggregate, may have a significant number of users in absolute terms. Thus, the conventional paradigm often fails to generate revenues commensurate with the size of the total viewing audience serviced by the network operator. As discussed below, this is a missed revenue opportunity that can be addressed in accordance with the present invention.

As noted above, the pricing for asset delivery depends on the size of the viewing audience and certain other factors. One of those factors relates to the demographics of interest to the asset provider. In this regard, a given program will generally have a number of different ratings for different demographic categories. That is, the program generally has not only a household rating, which is measured against the universe of all households with televisions, but also a rating for different demographic categories (e.g., males 18-24), measured against the universe of all members of the category who have televisions. Thus, the program may have a rating of 1 (1%) overall and a rating of 2 (2%) for a particular category. Typically, when asset providers buy a time-slot, pricing is based on a rating or ratings for the categories of interest to the asset provider. This results in significant inefficiencies due to poor matching of the audience to the desired demographics.

Figure 3:
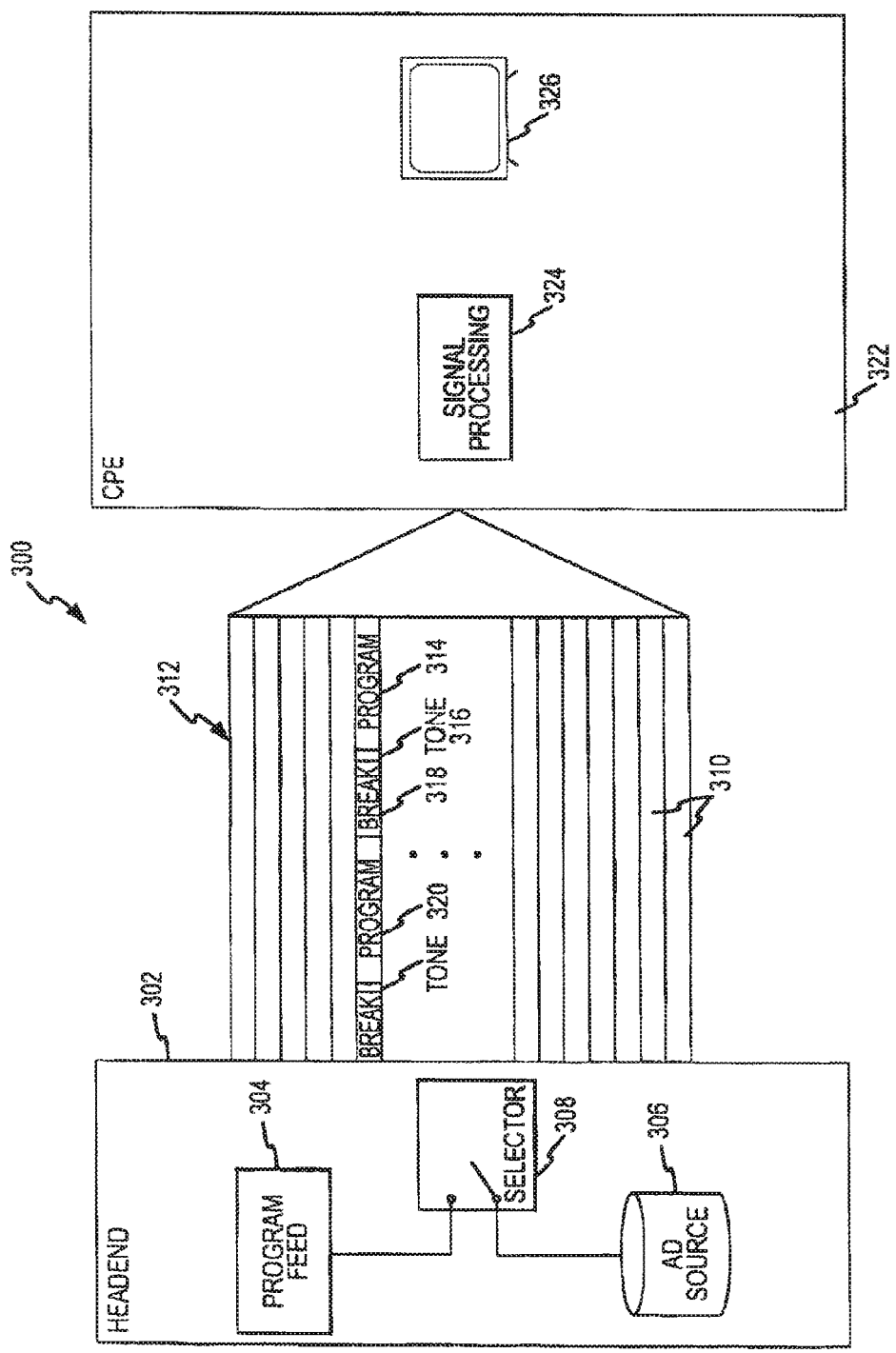
FIG. 3 illustrates asset insertion as accomplished at a headend.
Figure 15:
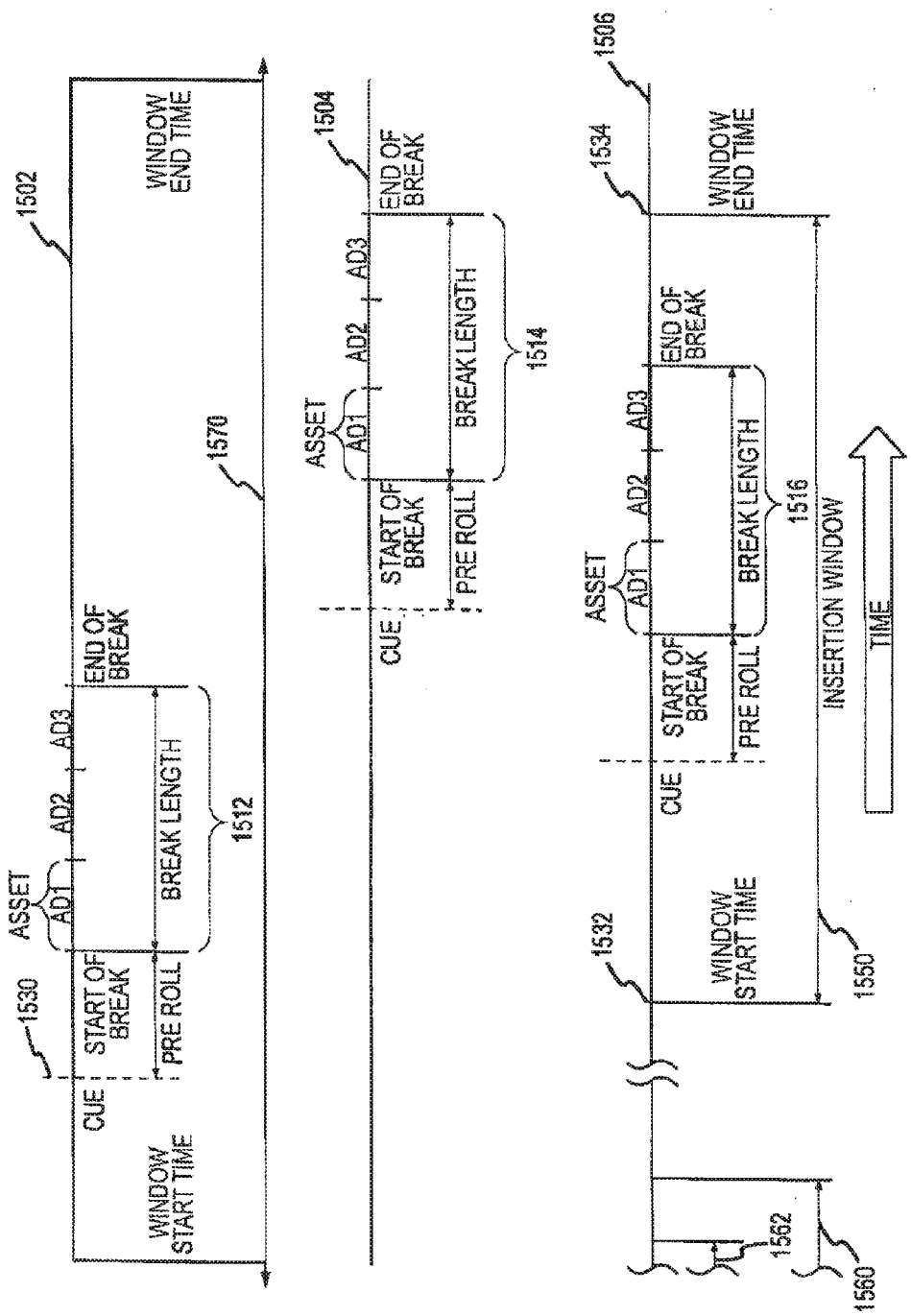
FIG. 15 illustrates exemplary sequences associated with breaks on programming channels.

Conventionally, asset insertion is accomplished at the headend. This is illustrated in FIG. 3. In the illustrated system 300, the headend 302 includes a program feed 304 and an asset source 306. As noted above, the program feed 304 may be associated with a variety of programming sources such as video storage, an antenna, a satellite dish, a VOD server or fiber feed from a studio or the like. The asset source 306 may include a tape library or other storage system for storing pre-recorded assets. A platform associated with the headend 302—in this case, denoted a selector 308—inserts programming from the program feed 304 and assets from the asset source 306 into the video stream of an individual channel 310. This is done for each channel to define the overall content 312 that is distributed to subscribers (or at least to a node filter). Typically, although not necessarily, the selector 308 effectively toggles between the program feed 304 and the asset source 306 such that the programming and assets are inserted in alternating, non-time overlapping fashion. Thus, as shown in FIG. 3, a particular channel may include a time segment 314 of programming followed by a cue tone 316 (which may occur, for example, during a programming segment, or during a time period of an asset provided with the programming stream, just prior to an insertion opportunity) to identify the initiation of a break 318. In response to the tone, the selector 308 is operative to insert assets into the programming stream for that channel. At the conclusion of the break 318, the selector 308 returns to the program feed to insert a further programming segment 314. An example of a timeline in this regard is shown in FIG. 15.

This content 312 or a filtered portion thereof is delivered to CPEs 322. In the illustrated embodiment the CPE 322 is depicted as including a signal processing component 324 and a television set 326. It will be appreciated that these components 324 and 326 may be embodied in a single device and the nature of the functionality may vary. In the case of a digital cable user, the signal processing component 324 may be incorporated into a set top box (STB) for decoding digital signals. Such boxes are typically capable of bi-directional messaging with the headend 302 which will be a significant consideration in relation to functionality described below.

II. System Overview

A. The Targeted Asset Delivery Environment

Against this backdrop described in the context of the conventional asset delivery paradigm, a system embodying the present invention is described below. The inventive system, in the embodiments described below, allows for delivery of targeted assets such as advertising so as to address certain shortcomings or inefficiencies of conventional broadcast networks. Generally, such targeting entails delivering assets to desired groups of individuals or individuals having desired characteristics. These characteristics or audience classification parameters may be defined based on personal information, demographic information, psychographic information, geographic information, or any other information that may be relevant to an asset provider in identifying a target audience. Preferably, such targeting is program independent in recognition that programming is a highly imperfect mechanism for targeting of assets. For example, even if user analysis indicates that a particular program has an audience comprised sixty percent of women, and women comprise the target audience for a particular asset, airing on that program will result in a forty percent mismatch. That is, forty percent of the users potentially reached may not be of interest to the asset provider and pricing may be based only on sixty percent of the total audience. Moreover, ideally, targeted asset delivery would allow for targeting with a range of granularities including very fine granularities. For example, it may be desired to target a group, such as based on a geographical grouping, a household characterization or even an individual user characterization. The present invention accommodates program independent targeting, targeting with a high degree of granularity and targeting based on a variety of different audience classifications.

Figure 5:
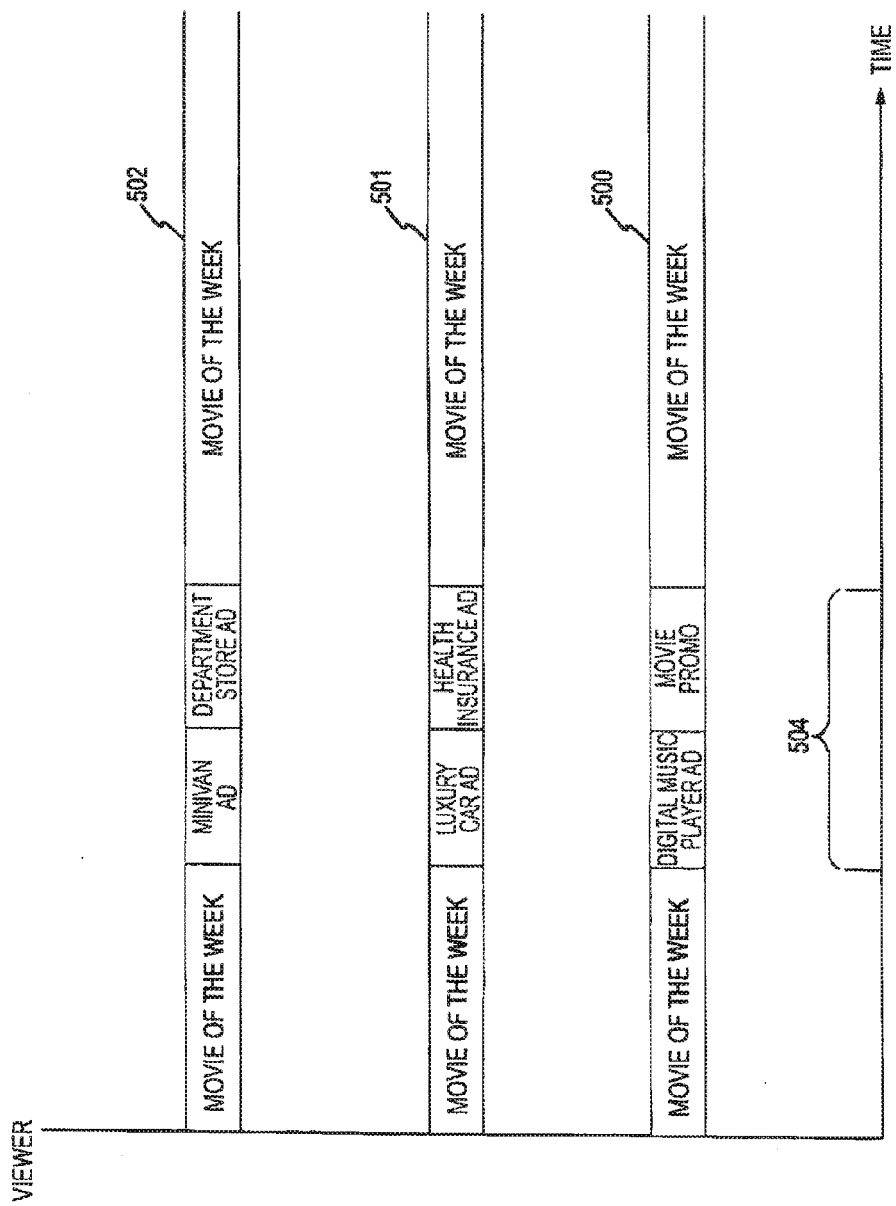
FIG. 5 illustrates delivery of assets to different users watching the same programming channel.
Figure 6:
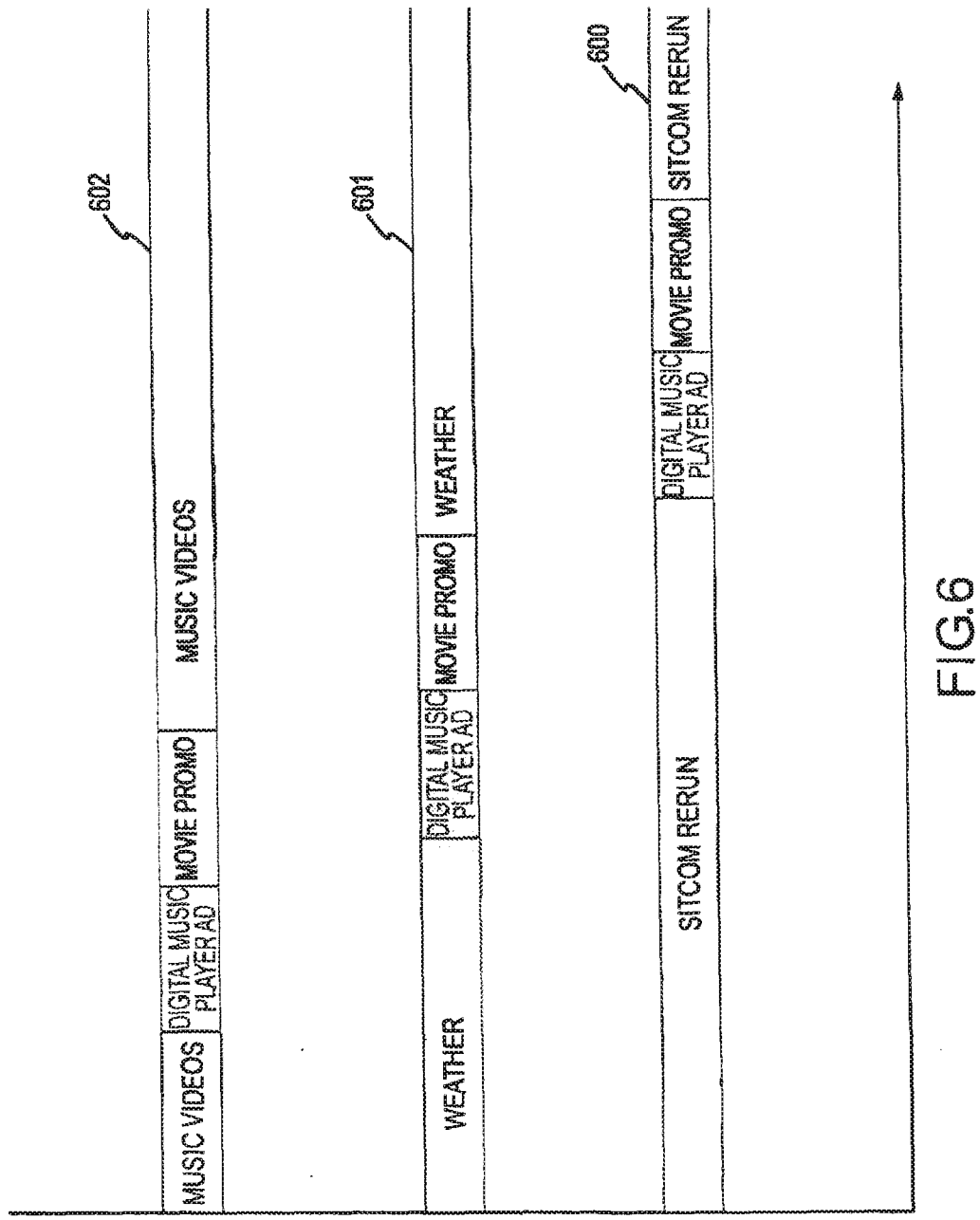
FIG. 6 illustrates audience aggregation across.

FIGS. 5 and 6 illustrate two different contexts of targeted asset delivery supported in accordance with the present invention. Specifically, FIG. 5 illustrates the delivery of different assets, in this case ads, to different users watching the same programming channel, which may be referred to as spot optimization. As shown, three different users 500-502 are depicted as watching the same programming, in this case, denoted "Movie of the Week." At a given break 504, the users 500-502 each receive a different asset package. Specifically, user 500 receives a digital music player ad and a movie promo, user 501 receives a luxury car ad and a health insurance ad, and user 502 receives a minivan ad and a department store ad. Alternately, a single asset provider (e.g., a motor vehicle company) may purchase a spot and then provide different asset options for the spot (e.g., sports car, minivans, pickup trucks, etc.). Similarly, separate advertisers may collectively purchase a spot and then provide ads for their respective products (e.g., where the target audiences of the advertisers are complementary). It will be appreciated that these different asset packages may be targeted to different audience demographics. In this manner, assets are better tailored to particular viewers of a given program who may fall into different demographic groups. Thus, spot optimization refers to the delivery of different assets (by one or multiple asset providers) in a given spot. In this regard, the programming content could be repeated multiple (e.g., three) times as shown, or there could be one copy of the programming content with different sets of assets that can be accessed, for example, by switching to an asset channel.

FIG. 6 illustrates a different context of the present invention, which may be termed audience aggregation. In this case, three different users 600-602 viewing different programs associated with different channels may receive the same asset or asset package. In this case, each of the users 600-602 receives a package including a digital music player ad and a movie promo in connection with breaks associated with their respective channels. Though the users 600-602 are shown as receiving the same asset package for purposes of illustration, it is likely that different users will receive different combinations of assets due to differences in classification parameters. In this manner, users over multiple channels (some or all users of each channel) can be aggregated (relative to a given asset and time window) to define an aggregated audience having significant user numbers matching a targeted audience classification. Among, other things, such audience aggregation allows for the possibility of aggregating users over a number of low share channels to define a significant asset delivery opportunity, perhaps on the order of that associated with one of the high share networks. This can be accomplished, in accordance with the present invention, using existing equipment (i.e., an existing CPE). Such an aggregated audience is graphically illustrated in FIG. 7, though this illustration is not based on actual numbers. Thus, audience aggregation refers to the delivery of the same asset in different spots to define an aggregated audience. These different spots may occur within a time window corresponding to overlapping (conflicting) programs on different channels. In this manner, it is likely that these spots, even if at different times within the window, will not be received by the same users.

Figure 8:
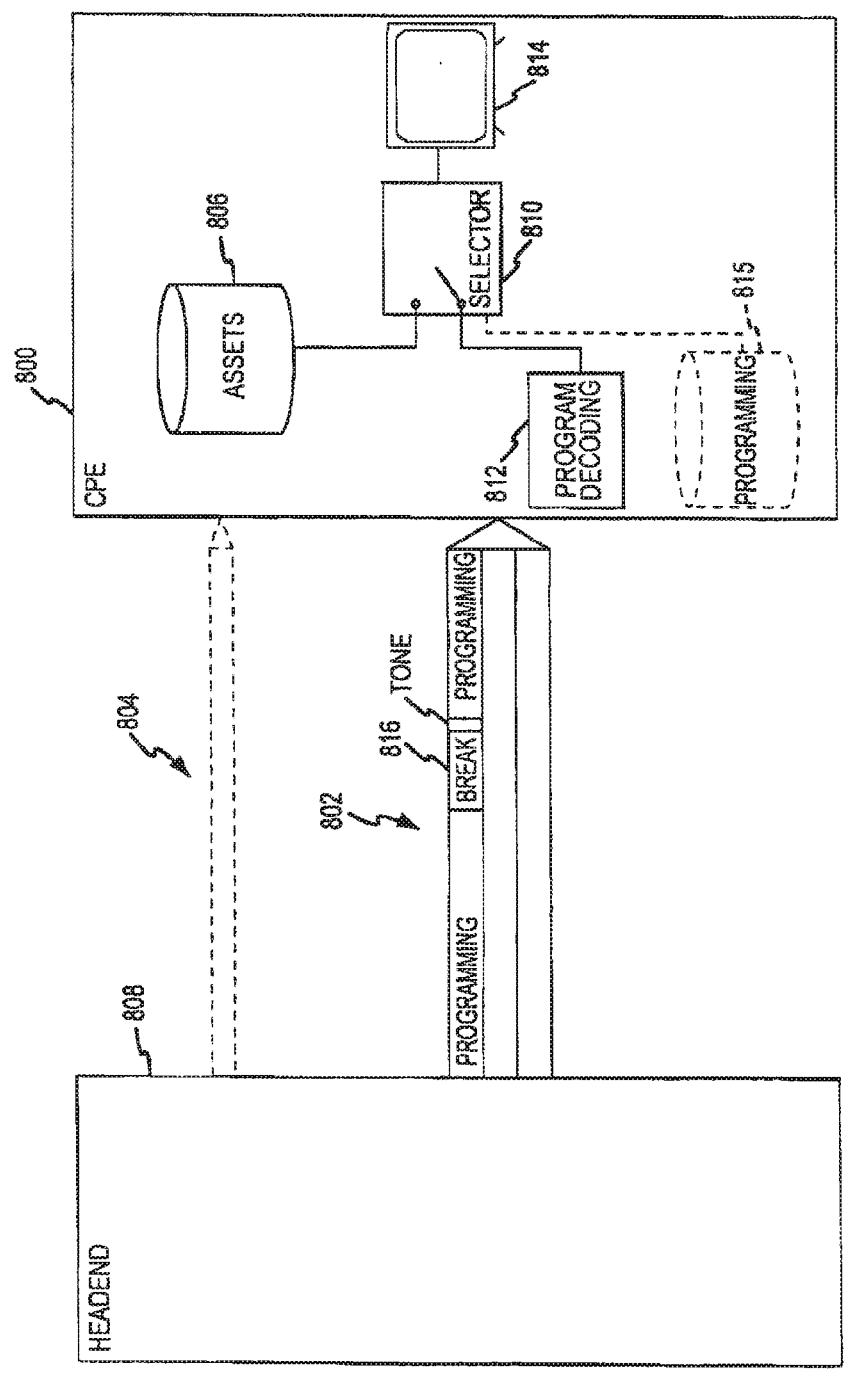
FIG. 8 illustrates targeted asset insertion being implemented at Customer Premises Equipment (CPEs).

Such targeting including both spot optimization and audience aggregation can be implemented using a variety of architectures in accordance with the present invention. Thus, for example, as illustrated in FIG. 8, targeted asset insertion can be implemented at the CPEs. This may involve a forward-and-store functionality. As illustrated in FIG. 8, the CPE 800 receives a programming stream 802 and an asset delivery stream 804 from the headend 808. These streams 802 and 804 may be provided via a common signal link such as a coaxial cable or via separate communications links. For example, the asset delivery stream 804 may be transmitted to the CPE 800 via a designated segment, e.g., a dedicated frequency range, of the available bandwidth or via a programming channel that is opportunistically available for asset delivery, e.g., when it is otherwise off air. The asset delivery stream 804 may be provided on a continuous or intermittent basis and may be provided concurrently with the programming stream 802. In the illustrated example, the programming stream 802 is processed by a program decoding unit, such as an STB, and programming is displayed on television set 814. Alternatively, the programming stream 802 may be stored in programming storage 815 for CPE insertion.

In the illustrated implementation, the asset, together with metadata identifying, for example, any audience classification parameters of the targeted audience, is stored in a designated storage space 806 of the CPE 800. For example, such storage may be available in connection with certain digital video recorder (DVR) units or other set top boxes with adequate storage. A selector 810 is implemented as a processor running logic on the CPE 800. The selector 810 functions analogously to the headend selector described above to identify breaks 816 and insert appropriate assets. In this case, the assets may be selected based on classification parameters of the household or, more preferably, a user within the household. Such information may be stored at the CPE 800 or may be determined based on an analysis of viewing habits such as a click stream from a remote control as will be described in more detail below. Certain aspects of the present invention can be implemented in such a CPE insertion environment.

Figure 9:
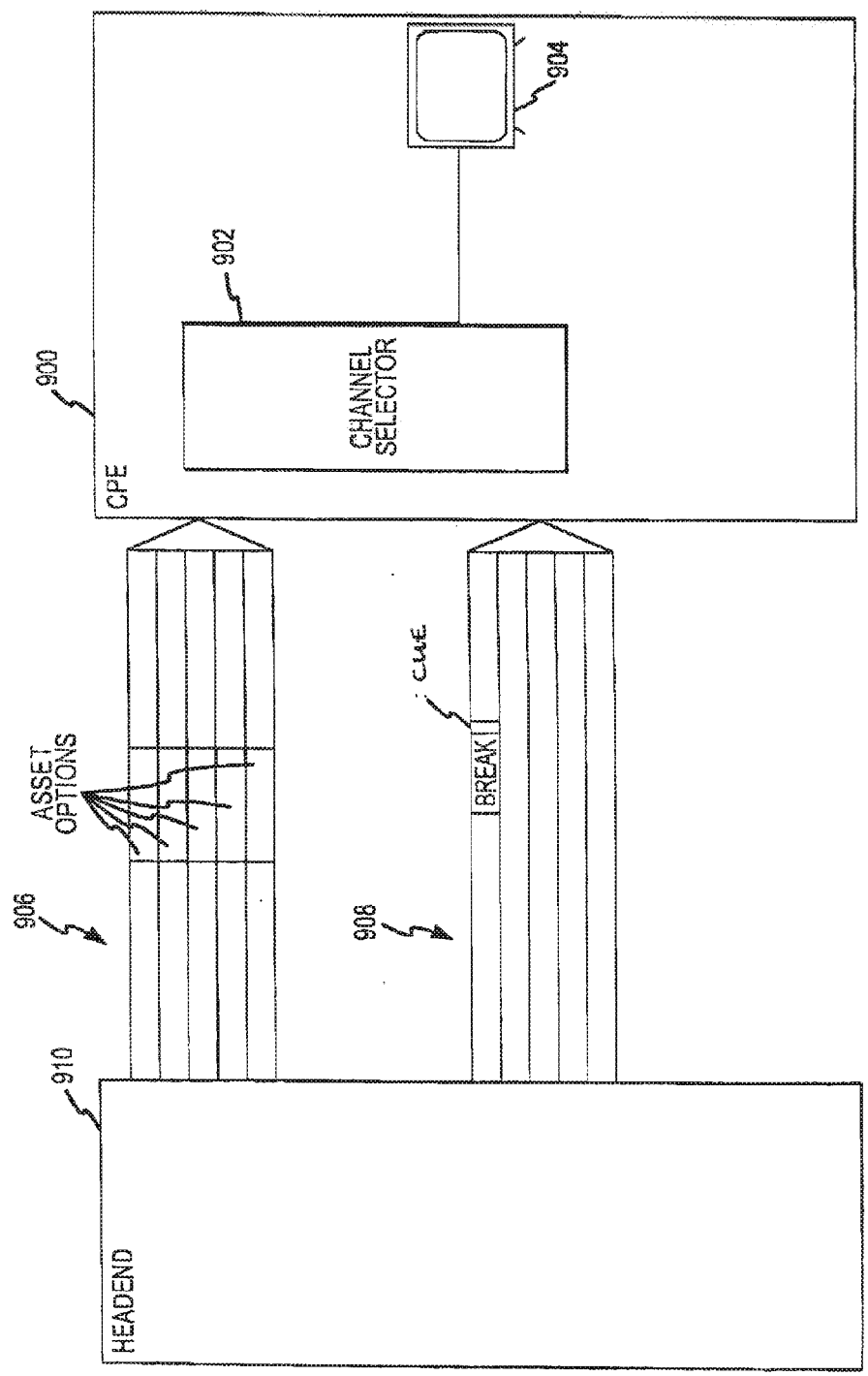
FIG. 9 illustrates asset options being transmitted from a headend on separate asset channels.

In FIG. 9, a different architecture is employed. Specifically, in FIG. 9, asset options are transmitted from headend 910 synchronously with a given break on a given channel for which targeted asset options are supported. The CPE 900 includes a channel selector 902, which is operative to switch to an asset channel associated with a desired asset at the beginning of a break and to return to the programming channel at the end of the break. The channel selector 902 may hop between channels (between asset channels or between an asset channel and the programming channel) during a break to select the most appropriate assets. In this regard, logic resident on the CPE 900 controls such hopping to avoid switching to a channel where an asset is already in progress. As described below, this logic can be readily implemented, as the schedule of assets on each asset channel is known. Preferably, all of this is implemented invisibly from the perspective of the user of set 904. The different options may be provided, at least in part, in connection with asset channels 906 or other bandwidth segments (separate from programming channels 908) dedicated for use in providing such options. In addition, certain asset options may be inserted into the current programming channel 908. Associated functionality is described in detail below. The architecture of FIG. 9 has the advantage of not requiring substantial storage resources at the CPE 900 such that it can be immediately implemented on a wide scale basis using equipment that is already in the field.

As a further alternative, the determination of which asset to show may be made at the headend. For example, an asset may be selected based on voting as described below, and inserted at the headend into the programming channel without options on other asset channels. This would achieve a degree of targeting but without spot optimization opportunities as described above. Still further, options may be provided on other asset channels, but the selection as between those channels may be determined by the headend. For example, information about a household or user (e.g., brand of car owned, magazines subscribed to, etc.) stored on the headend or otherwise accessible from the headend (e.g., a third party database including detailed demographic/purchasing information) may be used to match an asset to a household or user. That information, which may be termed "marketing labels," may be used by the headend to control which asset is selected by the CPE. For example, the CPE may be instructed that it is associated with an "ACME preferred" customer. When an asset is disseminated with ACME preferred metadata, the CPE may be caused to select that asset (at least if that user is currently present, thereby overriding (or significantly factoring with) any other audience classification considerations. However, it will be appreciated that such operation may entail certain concerns relating to sensitive information or may compromise audience classification based targeting in other respects.

A significant opportunity thus exists to better target users whom asset providers may be willing to pay to reach and to better reach hard-to-reach users. However, a number of challenges remain with respect to achieving these objectives including: how to provide asset options within network bandwidth limitations and without requiring substantial storage requirements and new equipment at the user's premises; how to obtain sufficient information for effective targeting while addressing privacy concerns; how to address a variety of business related issues, such as pricing of asset delivery, resulting from availability of asset options and attendant contingent delivery; and how to operate effectively within the context of existing network structure and systems (e.g., across node switches, using existing traffic and billing systems, etc.).

From the foregoing it will be appreciated that various aspects of the invention are applicable in the context of a variety of networks, including broadcast networks. In the following discussion, specific implementations of a targeted asset system are discussed in the context of a cable television network. Though the system enhances viewing for both analog and digital users, certain functionality is conveniently implemented using existing STBs. It will be appreciated that, while these represent particularly advantageous and commercially valuable implementations, the invention is not limited to these specific implementations or network contexts.

B. System Architecture

In one implementation, the system of the present invention involves the transmission of asset options in time alignment or synchronization with other assets on a programming channel, where the asset options are at least partially provided via separate bandwidth segments, e.g. channels at least temporarily dedicated to targeted asset delivery. Although such options may typically be transmitted in alignment with a break in programming, it may be desired to provide options opposite continuing programming (e.g., so that only subscribers in a specified geographic area get a weather announcement, an emergency announcement, election results or other local information while others get uninterrupted programming). Selection as between the available options is implemented at the user's premises, as by an STB in this implementation. In this manner, asset options are made available for better targeting, without the requirement for substantial storage resources or equipment upgrades at the user's premises (e.g., as might be required for a forward-and-store architecture). Indeed, existing STBs can be configured to execute logic for implementing the system described below by downloading and/or preloading appropriate logic.

Because asset options are synchronously transmitted in this implementation, it is desirable to be efficient in identifying available bandwidth and in using that bandwidth. Various functionality for improved bandwidth identification, e.g., identifying bandwidth that is opportunistically available in relation to a node switch, is described later in this discussion. Efficient use of available bandwidth involves both optimizing the duty cycle or asset density of an available bandwidth segment (i.e., how much time, of the time a bandwidth segment is available for use in transmitting asset options, is the segment actually used for transmitting options) and the value of the options transmitted. The former factor is addressed, among other things, by improved scheduling of targeted asset delivery on the asset channels in relation to scheduled breaks of the programming channels.

Figure 10:
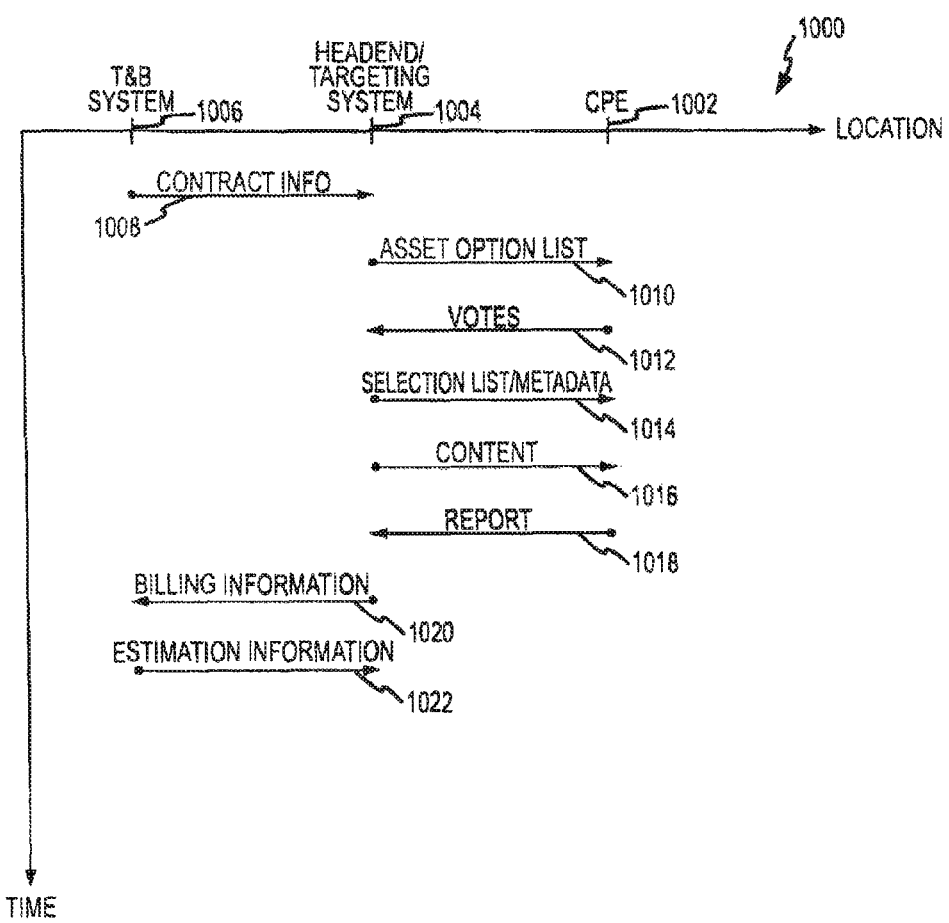
FIG. 10 illustrates a messaging sequence between a CPE, a network platform, and a traffic and billing (T&B) system.

The latter factor is addressed in part by populating the available bandwidth spots with assets that are most desired based on current network conditions. These most desired assets can be determined in a variety of ways including based on conventional ratings. In the specific implementation described below, the most desired assets are determined via a process herein termed voting. FIG. 10 illustrates an associated messaging sequence 1000 in this regard as between a CPE 1002 such as an STB, a network platform for asset insertion such as a headend 1004 and a traffic and billing (T&B) system 1006 used in the illustrated example for obtaining asset delivery orders or contracts and billing for asset delivery. It will be appreciated that the functionality of the T&B system 1006 may be split between multiple systems running on multiple platforms and the T&B system 1006 may be operated by the network operator or may be separately operated.

The illustrated sequence begins by loading contract information 1008 from the T&B system 1006 onto the headend 1004. An interface associated with system 1006 allows asset providers to execute contracts for dissemination of assets based on traditional time-slot buys (for a given program or given time on a given network) or based on a certain audience classification information (e.g., desired demographics, psychographics, geography, and/or audience size). In the latter case, the asset provider or network may identify audience classification information associated with a target audience. The T&B system 1006 uses this information to compile the contract information 1008, which identifies the asset that is to be delivered together with delivery parameters regarding when and to whom, the asset is to be delivered.

The illustrated headend 1004 uses the contract information 1008 together with a schedule of breaks for individual networks to compile an asset option list 1010 on a channel-by-channel and break-by-break basis. That is, the list 1010 lists the universe of asset options that are available for voting purposes for a given break on a given programming channel together with associated metadata identifying the target audience for the asset, e.g., based on audience classification information. The transmitted list 1010 may encompass all supported programming channels and may be transmitted to all participating users, or the list may be limited to one or a subset of the supported channels e.g., based on an input indicating the current channel or the most likely or frequent channels used by a particular user or group of users. The list 1010 is transmitted from the headend 1004 to the CPE 1002 in advance of a break for which options are listed.

Based on the list 1010, the CPE 1002 submits a vote 1012 back to the headend 1004. More specifically, the CPE 1002 first identifies the classification parameters for the current user(s) and perhaps the current channel being watched, identifies the assets that are available for an upcoming break (for the current channel or multiple channels) as well as the target audience for those assets and determines a "fit" of one or more of those asset options to the current classification. In one implementation, each of the assets is attributed a fit score for the user(s), e.g., based on a comparison of the audience classification parameters of the asset to the putative audience classification parameters of the current user(s). This may involve how well an individual user classification parameter matches a corresponding target audience parameter and/or how many of the target audience parameters are matched by the user's classification parameters. Based on these fit scores, the CPE 102 issues the vote 1012 indicating the most appropriate asset(s).

Any suitable information can be used to provide this indication. For example, all scores for all available asset options (for the current channel or multiple channels) may be included in the vote 1012. Alternatively, the vote 1012 may identify a subset of one or more options selected or deselected by the CPE 1002, with or without scoring information indicating a degree of the match and may further include channel information. In one implementation, the headend 1004 instructs CPEs (1002) to return fit scores for the top n asset options for a given spot, where n is dynamically configurable based on any relevant factor such as network traffic levels and size of the audience. Preferably, this voting occurs shortly before the break at issue such that the voting more accurately reflects the current status of network users. In one implementation, votes are only submitted for the programming channel to which the CPE is set, and votes are submitted periodically, e.g., every fifteen minutes.

The headend 1004 compiles votes 1012 from CPEs 1002 to determine a set of selected asset options 1014 for a given break on a supported programming channel. As will be understood from the description below, such votes 1012 may be obtained from all relevant and participating CPEs 1002 (who may be representative of a larger audience including analog or otherwise non-participating users) or a statistical sampling thereof. In addition, the headend 1004 determines the amount of bandwidth, e.g., the number of dedicated asset option channels that are available for transmission of options in support of a given break for a given programming channel.

Based on all of this information, the headend 1004 assembles a flotilla of assets, e.g., the asset options having the highest vote values or the highest weighted vote values where such weighting takes into account value per user or other information beyond classification fit. Such a flotilla may include asset options inserted on the current programming channel as well as on asset channels, though different insertion processes and components may be involved for programming channel and asset channel insertion. It will be appreciated that some assets may be assembled independently or largely independently of voting, for example, certain public service spots or where a certain provider has paid a premium for guaranteed delivery. Also, in spot optimization contexts where a single asset provider buys a spot and then provides multiple asset options for that spot, voting may be unnecessary (though voting may still be used to select the options).

In one implementation, the flotilla is assembled into sets of asset options for each dedicated asset channel, where the time length of each set matches the length of the break, such that channel hopping within a break is unnecessary. Alternatively, the CPE 1002 may navigate between the asset channels to access desired assets within a break (provided that asset starts on the relevant asset channels are synchronized). However, it will be appreciated that the flotilla matrix (where columns include options for a given spot and rows correspond to channels) need not be rectangular. Stated differently, some channels may be used to provide asset options for only a portion of the break, i.e., may be used at the start of the break for one or more spots but are not available for the entire break, or may only be used after one or more spots of a break have aired. A list of the selected assets 1014 and the associated asset channels is then transmitted together with metadata identifying the target audience in the illustrated implementation. It will be appreciated that it may be unnecessary to include the metadata at this step if the CPE 1002 has retained the asset option list 1010. This list 1014 (which includes sets of asset option for each dedicated contact options channel used to support, at least in part, the break at issue is preferably transmitted shortly in advance of transmission of the asset 1016.

The CPE 1002 receives the list of selected asset options 1014 and associated metadata and selects which of the available options to deliver to the user(s). For example, this may involve a comparison of the current audience classification parameter values (which may or may not be the same as those used for purposes of voting) to the metadata associated with each of the asset options. The selected asset option is used to selectively switch the CPE 1002 to the corresponding dedicated asset channel to display the selected asset 1016 at the beginning of the break at issue. One of the asset option sets, for example, the one comprised of the asset receiving the highest number or value of votes, may be inserted into the programming channel so that switching is not required for many users. Assuming that the voting CPEs are at least somewhat representative of the universe of all users, a significant degree of targeting is thereby achieved even for analog or otherwise non-participating users. In this regard, the voters serve as proxies for non-voting users. The CPE 1002 returns to the programming channel at the conclusion of the break.

Preferably, all of this is transparent from the perspective of the user(s), i.e., preferably no user input is required. The system may be designed so that any user input overrides the targeting system. For example, if the user changes channels during a break, the change will be implemented as if the targeting system was not in effect (e.g., a command to advance to the next channel will set the CPE to the channel immediately above the current programming channel, without regard to any options currently available for that channel, regardless of the dedicated asset channel that is currently sourcing the television output).

In this system architecture, as in forward-and-store architectures or any other option where selections between asset options are implemented at the CPE, there will be some uncertainty as to how many users or households received any particular asset option in the absence of reporting. This may be tolerable from a business perspective. In the absence of reporting, the audience size may be estimated based on voting data, conventional ratings analysis and other tools. Indeed, in the conventional asset delivery paradigm, asset providers accept Nielsen rating estimates and demographic information together with market analysis to gauge return on investment. However, this uncertainty is less than optimal in any asset delivery environment and may be particularly problematic in the context of audience aggregation across multiple programming networks, potentially including programming networks that are difficult to measure by conventional means.

The system of the present invention preferably implements a reporting system by which individual CPEs 1002 report back to the headend 1004 what asset or assets were delivered at the CPE 1002 and, optionally, to whom (in terms of audience classification). Additionally, the reports may indicate where (on what programming channel) the asset was delivered and how much (if any) of the asset was consumed. The full click stream may be reported to enable remote analysis thereof e.g., for viewing habits, demographic or other information. Such reports 1018 may be provided by all participating CPEs 1002 or by a statistical sampling thereof. These reports 1018 may be generated on a break-by-break basis, periodically (e.g., every 15 minutes) or may be aggregated prior to transmission to the headend 1004. Reports may be transmitted soon after delivery of the assets at issue or may be accumulated, e.g., for transmission at a time of day where messaging bandwidth is more available. Moreover, such reporting may be coordinated as between the CPEs 1002 so as to spread the messaging load due to reporting.

In any case, the reports 1018 can be used to provide billing information 1020 to the T&B system 1006 for valuing the delivery of the various asset options. For example, the billing information 1020 can be used by the T&B system 1006 to determine how large an audience received each option and how well that audience matched the target audience. For example, as noted above, a fit score may be generated for particular asset options based on a comparison of the audience classification to the target audience. This score may be on any scale, e.g., 1-100. Goodness of fit may be determined based on this raw score or based on characterization of this score such as "excellent," "good," etc. Again, this may depend on how well an individual audience classification parameter of a user matches a corresponding target audience parameter and/or how many of the target audience parameters are matched by the user's audience classification parameters. This information may in turn be provided to the asset provider, at least in an aggregated form. In this manner, the network operator can bill based on guaranteed delivery of targeted messages or scale the billing rate (or increase delivery) based on goodness of fit as well as audience size. The reports (and/or votes) 1018 can also provide a quick and detailed measurement of user distribution over the network that can be used to accurately gauge ratings, share, demographics of audiences and the like. Moreover, this information can be used to provide future audience estimation information 1022, for example, to estimate the total target universe based on audience classification parameters.

It will thus be appreciated that the present invention allows a network operator such as an MSO to sell asset delivery under the conventional asset delivery (time-slot) buy paradigm or under the new commercial impression paradigm or both. For example, a particular MSO may choose to sell asset delivery space for the major networks (or for these networks during prime time) under the old time-slot buy paradigm while using the commercial impression paradigm to aggregate users over multiple low market share networks. Another MSO may choose to retain the basic time-slot buy paradigm while accommodating asset providers who may wish to fill a given slot with multiple options targeted to different demographics. Another MSO may choose to retain the basic time-slot buy paradigm during prime time across all networks while using the targeted impression paradigm to aggregate users at other times of the day. Moreover, an MSO may choose to use targeted advertising for spot optimization in some cases (e.g., on large share networks) and for audience aggregation in other cases (e.g., for lower share networks). The targeted impression paradigm may be used by such MSOs only for this limited purpose.

Figure 12:
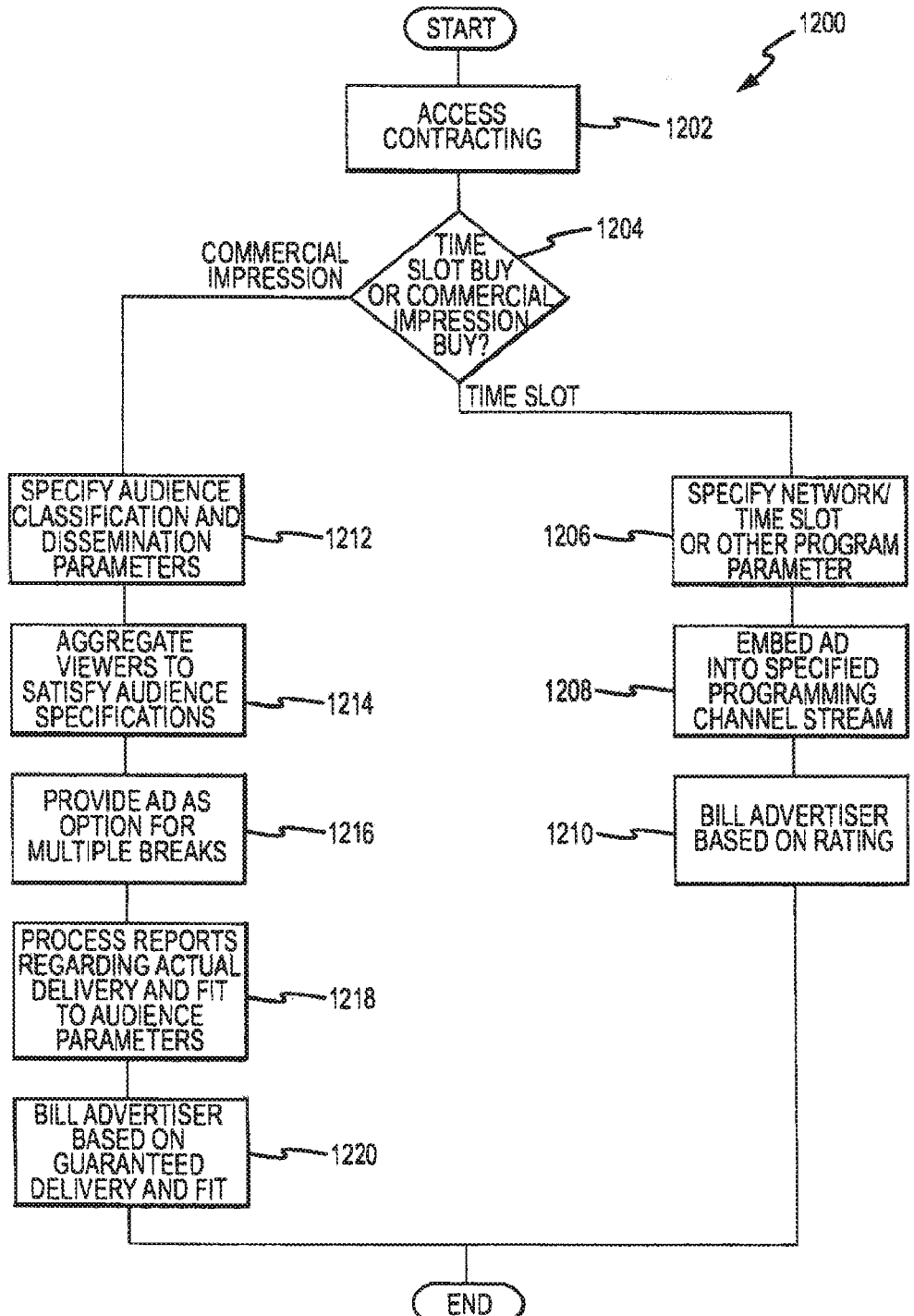
FIG. 12 is a flow chart illustrating a process for implementing time-slot and targeted impression buys.

FIG. 12 is a flow chart illustrating an associated process 1200. An asset provider (or agent thereof) can initiate the illustrated process 1200 by accessing (1202) a contracting platform as will be described below. Alternatively, an asset provider can work with the sales department or other personnel of a system operator or other party who accesses such a platform. As a still further alternative, an automated buying system may be employed to interface with such a platform via a system-to-system interface. This platform may provide a graphical user interface by which an asset provider can design a dissemination strategy and enter into a corresponding contract for dissemination of an asset. The asset provider can then use the interface to select (1204) to execute either a time-slot buy strategy or a targeted impression buy strategy. In the case of a time-slot buy strategy, the asset provider can then use the user interface to specify (1206) a network and time-slot or other program parameter identifying the desired air times and frequency for delivery of the asset. Thus, for example, an asset provider may elect to air the asset in connection with specifically identified programs believed to have an appropriate audience. In addition, the asset provider may specify that the asset is to appear during the first break or during multiple breaks during the program. The asset provider may further specify that the asset is to be, for example, aired during the first spot within the break, the last spot within the break or otherwise designate the specific asset delivery slot.

Once the time-slots for the asset have thus been specified, the MSO causes the asset to be embedded (1208) into the specified programming channel asset stream. The asset is then available to be consumed by all users of the programming channel. The MSO then bills (1210) the asset provider, typically based on associated ratings information. For example, the billing rate may be established in advance based on previous rating information for the program in question, or the best available ratings information for the particular airing of the program may be used to bill the asset provider. It will thus be appreciated that the conventional time-slot buy paradigm is limited to delivery to all users for a particular time-slot on a particular network and does not allow for targeting of particular users of a given network or targeting users distributed over multiple networks in a single buy.

In the case of targeted impression buys, the asset provider can use the user interface as described in more detail below to specify (1212) audience classification and other dissemination parameters. In the case of audience classification parameters, the asset provider may specify the gender, age range, income range, geographical location, lifestyle interest or other information of a targeted audience. The additional dissemination parameters may relate to delivery time, frequency, audience size, or any other information useful to define a target audience. Combinations of parameters may also be specified. For example, an asset provider may specify an audience size of 100,000 in a particular demographic group ad further specify that the asset is not delivered to any user who has already received the asset a predetermined number of times.

Based on this information, the targeted asset system of the present invention is operative to target appropriate users. For example, this may involve targeting only selected users of a major network. Additionally or alternatively, this may involve aggregating (1214) users across multiple networks to satisfy the audience specifications. For example, selected users from multiple programming channels may receive the asset within a designated time period in order to provide an audience of the desired size, where the audience is composed of users matching the desired audience classification. The user interface preferably estimates the target universe based on the audience classification and dissemination parameters such that the asset provider receives an indication of the likely audience size.

The aggregation system may also be used to do time of day buys. For example, an asset provider could specify audience classification parameters for a target audience and further specify a time and channel for airing of the asset. CPEs tuned to that channel can then select the asset based on the voting process as described herein. Also, asset providers may designate audience classification parameters and a run time or time range, but not the programming channel. In this manner, significant flexibility is enabled for designing a dissemination strategy. It is also possible for a network operator to disable some of these strategy options, e.g., for business reasons.

Based on this input information, the targeted asset system of the present invention is operative to provide the asset as an option during one or more time-slots of one or more breaks. In the case of spot optimization, multiple asset options may be disseminated together with information identifying the target audience so that the most appropriate asset can be delivered at individual CPEs. In the case of audience aggregation, the asset may be provided as an option in connection with multiple breaks on multiple programming channels. The system then receives and processes (1218) reports regarding actual delivery of the asset by CPEs and information indicating how well the actual audience fit the classification parameters of the target audience. The asset provider can then be billed (1220) based on guaranteed delivery and goodness of fit based on actual report information. It will thus be appreciated that a new asset delivery paradigm is defined by which assets are targeted to specific users rather than being associated with particular programs. This enables both better targeting of individual users for a given program and improved reach to target users on low-share networks.

From the foregoing, it will be appreciated that various steps in the messaging sequence are directed to matching assets to users based on classification parameters, allowing for goodness of fit determinations based on such matching or otherwise depending on communicating audience classification information across the network. It is preferable to implement such messaging in a manner that is respectful of user privacy concerns and relevant regulatory regimes.

In the illustrated system, this is addressed by implementing the system free from persistent storage of a user profile or other sensitive information including, for example, personally identifiable information (PII). Specifically, it may be desired to protect as sensitive information subject matter extending beyond the established definition of PII. As one example in this regard, it may be desired to protect MAC addresses even though such addresses are not presently considered to be included within the definition of PII in the United States. Similarly, geographical information may be generalized, e.g., from a particular residence location to a block centroid, thereby de-personalizing and anonymizing such information. Generally, any information that may entail privacy concerns or identify network usage information may be considered sensitive information. More particularly, the system learns of current network conditions prior to transmission of asset options via votes that identify assets without any sensitive information. Reports may also be limited to identifying assets that have been delivered (which assets are associated with target audience parameters) or characterization of the fit of audience classification parameters of a user(s) to a target audience definition.

Even if it is desired to associate reports with particular users, e.g., to account for ad skipping as discussed below, such association may be based on an identification code or address not including PII. In any event, identification codes or any other information deemed sensitive can be immediately stripped and discarded or hashed, and audience classification information can be used only in anonymous and aggregated form to address any privacy concerns. With regard to hashing, sensitive information such as a MAC or IP address (which may be included in a designated header field) can be run through a hash function and reattached to the header, for example, to enable anonymous identification of messages from the same origin as may be desired. Moreover, users can be notified of the targeted asset system and allowed to opt in or opt out such that participating users have positively assented to participate.

Figure 11A:
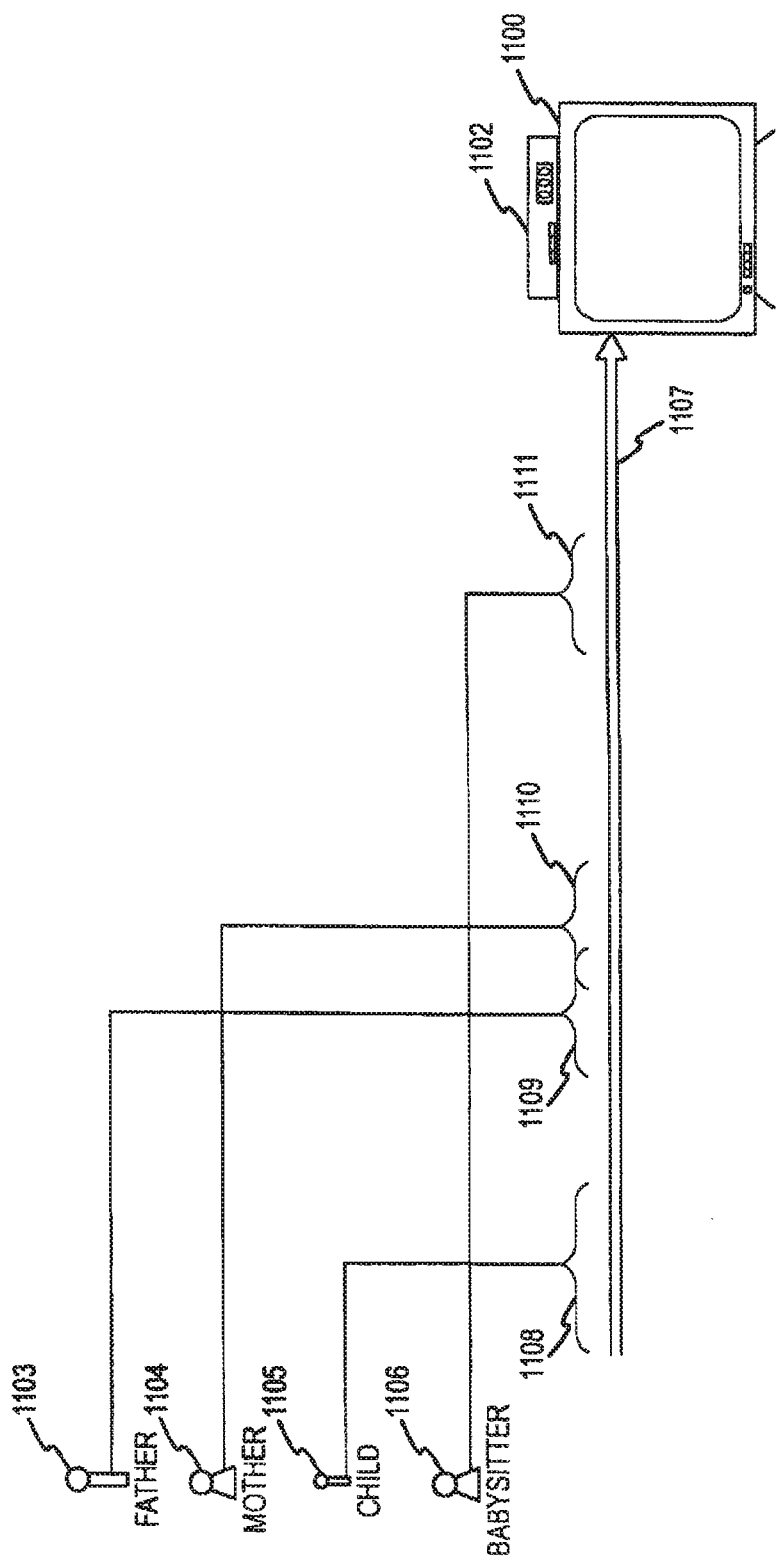
FIG. 11A illustrates an example of CPEs that include a television set and a Digital Set Top Box (DSTB) as used by a plurality of users.

Much of the discussion above has referenced audience classification parameters as relating to individuals as opposed to households. FIG. 11A illustrates a theoretical example of a CPE 1101 including a television set 1100 and an STB 1102 that are associated with multiple users 1103-1106. Arrow 1107 represents a user input stream, such as a click stream from a remote control, over time. A first user 1105, in this case a child, uses the television 1100 during a first time period—for example, in the morning. Second and third users 1103 and 1104 (designated "father" and "mother") use the television during time periods 1109 and 1110, which may be, for example, in the afternoon or evening. A babysitter 1106 uses the television during a night time period in this example.

This illustrates a number of challenges related to targeted asset delivery. First, because there are multiple users 1103-1106, targeting based on household demographics would have limited effectiveness. For example, it may be assumed that the child 1105 and father 1103 in many cases would not be targeted by the same asset providers. Moreover, in some cases, multiple users may watch the same television at the same time as indicated by the overlap of time periods 1109-1100. In addition, in some cases such as illustrated by the babysitter 1106 an unexpected user (from the perspective of the targeted asset system) may use the television set 1100.

These noted difficulties are associated with a number of objectives that are preferably addressed by the targeted asset system of the present invention. First, the system should preferably be operative to distinguish between multiple users of a single set and, in the context of the system described above, vote and report to the network accordingly. Second, the system should preferably react over time to changing conditions such as the transitions from use by father 1103 to use by both father and mother 1103 and 1104 to use by only mother 1104. The system should also preferably have some ability to characterize unexpected users such as the babysitter 1106. In that case, the system may have no other information to go on other than the click stream 1107. The system may also identify time periods where, apparently, no user is present, though the set 1100 may still be on.

Preferably, the system also operates free from persistent storage of any user profile or sensitive information so that no third party has a meaningful opportunity to misappropriate such information or discover the private network usage patterns of any of the users 1103-1106 via the targeted asset system. Privacy concerns can alternatively be addressed by obtaining consent from users. In this matter, sensitive information including PII can be transmitted across the network and persistently stored for use in targeting. This may allow for compiling a detailed user profile, e.g., at the headend. Assets can then be selected based on the user profile and, in certain implementations, addressed to specific CPEs.

In certain implementations, the present invention monitors the click stream over a time window and applies a mathematical model to match a pattern defined by the click stream to predefined audience classification parameters that may relate to demographic or psychographic categories. It will be appreciated that the click stream will indicate programs selected by users, volume and other information that may have some correlation, at least in a statistical sense, to the classification parameters. In addition, factors such as the frequency of channel changes and the length of time that the user lingers on a particular asset may be relevant to determining a value of an audience classification parameter. The system can also identify instances where there is apparently no user present.

In a first implementation, logic associated with the CPE 1101 uses probabilistic modeling, fuzzy logic and/or machine learning to progressively estimate the audience classification parameter values of a current user or users based on the click stream 1107. This process may optionally be supplemental based on stored information (preferably free of sensitive information) concerning the household that may, for example, affect probabilities associated with particular inputs. In this manner, each user input event (which involves one or more items of change of status and/or duration information) can be used to update a current estimate of the audience classification parameters based on associated probability values. The fuzzy logic may involve fuzzy data sets and probabilistic algorithms that accommodate estimations based on inputs of varying and limited predictive value.

In a second implementation, the click stream is modeled as an incomplete or noisy signal that can be processed to obtain audience classification parameter information. More specifically, a series of clicks over time or associated information can be viewed as a time-based signal. This input signal is assumed to reflect a desired signature or pattern that can be correlated to audience classification parameters. However, the signal is assumed to be incomplete or noisy—a common problem in signal processing. Accordingly, filtering techniques are employed to estimate the "true" signal from the input stream and associated algorithms correlate that signal to the desired audience classification information. For example, a nonlinear adaptive filter may be used in this regard.

In either of these noted examples, certain preferred characteristics apply. First, the inputs into the system are primarily a click stream and stored aggregated or statistical data, substantially free of any sensitive information. This addresses privacy concerns as noted above but also provides substantial flexibility to assess new environments such as unexpected users. In addition, the system preferably has a forgetfulness such that recent inputs are more important than older inputs. Either of the noted examples accommodates this objective. It will be appreciated that such forgetfulness allows the system to adapt to change, e.g., from a first user to multiple users to a second user. In addition, such forgetfulness limits the amount of viewing information that is available in the system at any one time, thereby further addressing privacy concerns, and limits the time period during which such information could conceivably be discovered. For example, information may be deleted and settings may be reset to default values periodically, for example, when the STB is unplugged.

Figure 11B:
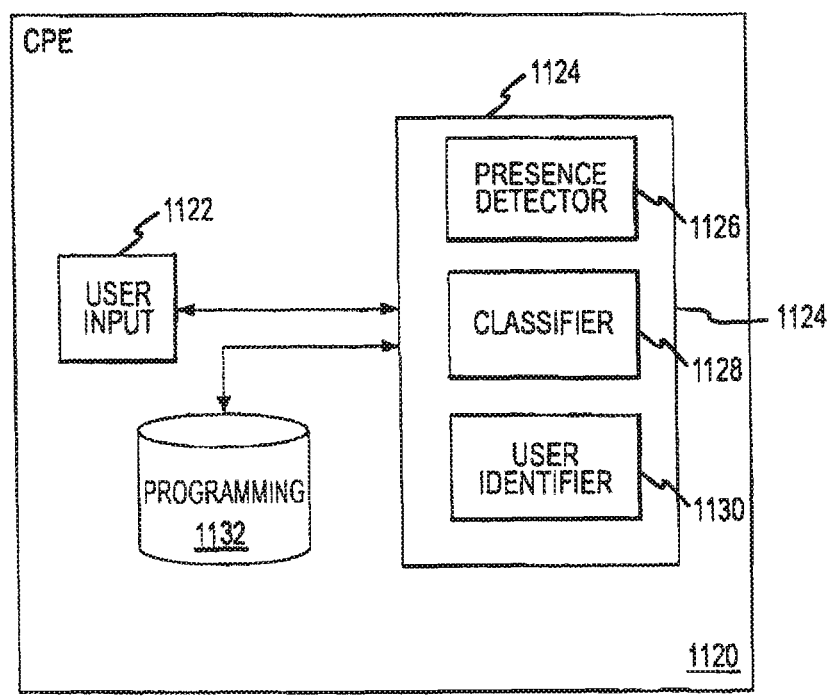
FIG. 11B illustrates a user classifier.

A block diagram of a system implementing such a user classification system is shown in FIG. 11B. The illustrated system is implemented in a CPE 1120 including a user input module 1122 and a classification module 1124. The user input module receives user inputs, e.g., from a remote control or television control buttons, that may indicate channel selections, volume settings and the like. These inputs are used together with programming information (which allows for correlation of channel selections to programming and/or associated audience profiles) for a number of functions. In this regard, the presence detector 1126 determines whether it is likely that a user is present for all or a portion of an asset that is delivered. For example, a long time period without any user inputs may indicate that no user is present and paying attention or a volume setting of zero may indicate that the asset was not effectively delivered. The classifier 1128 develops audience classification parameters for one or more users of a household as discussed above. The user identifier 1130 is operative to estimate which user, of the classified users, is currently present. Together, these modules 1126, 1128 and 1130 provide audience classification information that can be used to vote (or elect not to vote) and/or generate reports (or elect not to generate reports).

Additionally or alternatively, information regarding households or individual users can be obtained from a third party database or by analyzing click stream data to correlate such data to particular attributes of interest to advertisers. In this regard, certain third party databases such as credit agency databases may include detailed demographic or personal information useful for asset targeting. These databases can be used to match households or users to appropriate assets at a central location such as a headend. Marketing labels, as discussed herein, can then be used to cause the desired set top boxes to select and deliver the appropriate assets, which can be transmitted in broadcast mode.

As noted above, one of the audience classifications that may be used for targeting is location. Specifically, an asset provider may wish to target only users within a defined geographic zone (e.g., proximate to a business outlet) or may wish to target different assets to different geographic zones (e.g., targeting different car ads to users having different supposed income levels based on location). Alternatively, an asset provider may wish to use a certain level of "fit" or "goodness of fit" of an audience location classification parameter with other classification parameters to determine the fit of an asset. In certain implementations, the present invention determines the location of a particular CPE and uses the location information to target assets to the particular CPE. It will be appreciated that an indication of the location of a CPE contains information that may be considered sensitive. The present invention also creates, extracts and/or receives the location information in a manner that addresses these privacy concerns. This may also be accomplished by generalizing or otherwise filtering out sensitive information from the location information sent across the network. This may be accomplished by providing filtering or sorting features at the CPE or at the headend. For example, information that may be useful in the reporting process (i.e. to determine the number of successful deliveries within a specified location zone) may be sent upstream with little or no sensitive information included. Additionally, such location information can be generalized so as to not be personally identifiable. For example, all users on a given block or within another geographic zone (such as associated with a zip plus 2 area) may be associated with the same location identifier (e.g., a centroid for the zone).

In one implementation, logic associated with the CPE sends an identifier upstream to the headend where the identifier is cross-referenced against a list of billing addresses. The billing address that matches the identifier is then translated, for example, using GIS information, into a set of coordinates (e.g., Cartesian geographic coordinates) and those coordinates or an associated geographic zone identifier are sent back to the CPE, for storage as part of its location information. Alternatively, a list may be broadcast. In this case, a list including location information for multiple or all network users is broadcast and each CPE selects its own information. Asset providers can also associate target location information with an asset. For example, in connection with a contract interface as specified below, asset providers can define target asset delivery zones. Preferably this can be done via a graphical interface (e.g. displaying a map), and the defined zones can match, to a fine level of granularity, targeted areas of interest without being limited to node areas or other network topology. Moreover, such zones can have complex shapes including discontiguous portions. Preferably the zones can then be expressed in terms that allow for convenient transmission in asset metadata and comparison to user locations e.g., in terms of grid elements or area cells.

In another implementation, individual geographic regions are associated with unique identifiers and new regions can be defined based on the union of existing regions. This can be extended to a granularity identifying individual CPEs at its most fine level. Higher levels including numerous CPEs may be used for voting and reporting to address privacy concerns.

Upon receipt of an asset option list or an asset delivery request (ADR), the CPE parses the ADR and determines whether the location of the CPE is included in the locations targeted by the asset referenced in the ADR. For example, this may involve a point in polygon or other point in area algorithm, a radius analysis, or a comparison to a network of defined grid or cells such as a quadtree data structure. The CPE may then vote for assets to be received based on criteria including whether the location of that particular CPE is targeted by the asset.

After displaying an asset option, the CPE may also use its location information in the reporting process to enhance the delivery data sent upstream. The process by which the CPE uses its location information removes substantially all sensitive information from the location information. For example, the CPE may report that an asset targeted to a particular group of locations was delivered to one of the locations in the group. The CPE in this example would not report the location to which asset was actually delivered. This location targeting functionality is described in detail below.

Similarly, it is often desired to associate tags with asset selections. Such tags are additional information that is superimposed on or appended to such assets. For example, a tag may provide information regarding a local store or other business location at the conclusion of an asset that is distributed on a broader basis. Conventionally, such tags have been appended to ads prior to insertion at the headend and have been limited to coarse targeting. In accordance with the present invention, tags may be targeted to users in particular zones, locations or areas, such as neighborhoods. Tags may also be targeted based on other audience classification parameters such as age, gender, income level, etc. For example, tags at the end of a department store ad may advertise specials on particular items of interest to particular demographics. Specifically, a tag may be included in an asset flotilla and conditionally inserted based on logic contained within the CPE. Thus the tags are separate units that can be targeted like other assets, however, with conditional logic such that they are associated with the corresponding asset.

The present invention may use information relating to the location of a particular CPE 1120 to target a tag to a particular CPE 1120. For example, the CPE 1120 may contain information relating to its location in the form of Cartesian coordinates as discussed above. If an asset indicates that a tag may be delivered with it or instead of it, the CPE 1120 determines whether there is, associated with any of the potential tags, a location criterion that is met by the location information contained in the particular CPE 1120. For example, a tag may include a location criterion defining a particular neighborhood. If the CPE 1120 is located in that neighborhood, the CPE 1101 may choose to deliver the tag, assuming that other criteria necessary for the delivery of the tag are met. Other criteria may include the time available in the given break, other demographic information, and information relating to the national or non-localized asset.

As briefly noted above, targeting may also be implemented based on marketing labels. Specifically, the headend may acquire information or marketing labels regarding a user or household from a variety of sources. These marketing labels may indicate that a user buys expensive cars, is a male 18-24 years old, or other information of potential interest to an asset provider. In some cases, this information may be similar to the audience classification parameters, though it may optionally be static (not varying as television users change) and based on hard data (as opposed to being surmised based on viewing patterns or the like), such as the location of the CPE (e.g., STB). The location of a CPE may be considered an audience classification parameter that, for many CPEs, does not vary with time. In other cases, the marketing labels may be more specific or otherwise different than the audience classification. In any event, the headend may inform the CPE as to what kind of user/household it is in terms of marketing labels. An asset provider can then target an asset based on the marketing labels and the asset will be delivered by CPEs where targeting matches. This can be used in audience aggregation and spot optimization contexts.

Thus, the targeted asset system of the present invention allows for targeting of assets in a broadcast network based on any relevant audience classification, whether determined based on user inputs such as a click stream, based on marketing labels or other information pushed to the customer premises equipment, based on demographic or other information stored or processed at the headend, or based on combinations of the above or other information. In this regard, it is therefore possible to use, in the context of a broadcast network, targeting concepts that have previously been limited to other contexts such as direct mail. For example, such targeting may make use of financial information, previous purchase information, periodical subscription information and the like. Moreover, classification systems developed in other contexts, may be leveraged to enhance the value of targeting achieved in accordance with the present invention.

An overview of the system has thus been provided, including introductory discussions of major components of the system, which provides a system context for understanding the operation of those components. The various components will now be described in greater detail in the following sections. Before specific reference is made to location-based targeting, the major components of the system will be discussed, including measurement and voting, bandwidth optimization, dynamic scheduling, and reporting. Location-based targeting will then be described in relation to these system components. Then exemplary system implementations will be described, including applications of location-based targeting therein.

III. Component Overview

A. Measurement and Voting

As discussed above, in order to provide targeted assets to users of a television network, signals received from at least a portion of the CPEs may be utilized to select asset options for delivery and/or to determine the size and composition of the viewing audience. For example, a network operator may receive signals from all or a sampling of network users. This sampling is preferably both statistically significant (in terms of sampling size) and valid in terms of being sufficiently random to be reliably representative of the universe of all relevant users. In some cases, the network operator may receive signals only from users who have "opted in" or agreed to participate in the targeted asset system, and this group of users may not be statistically significant or relevant. In many cases, however, these signals may indicate channels currently being viewed and/or the audience classification of current users. In this regard, a two-way communication path between a network platform such as a headend and CPEs, such as STBs, of one or more households may be provided over a network interface.

Figure 13:
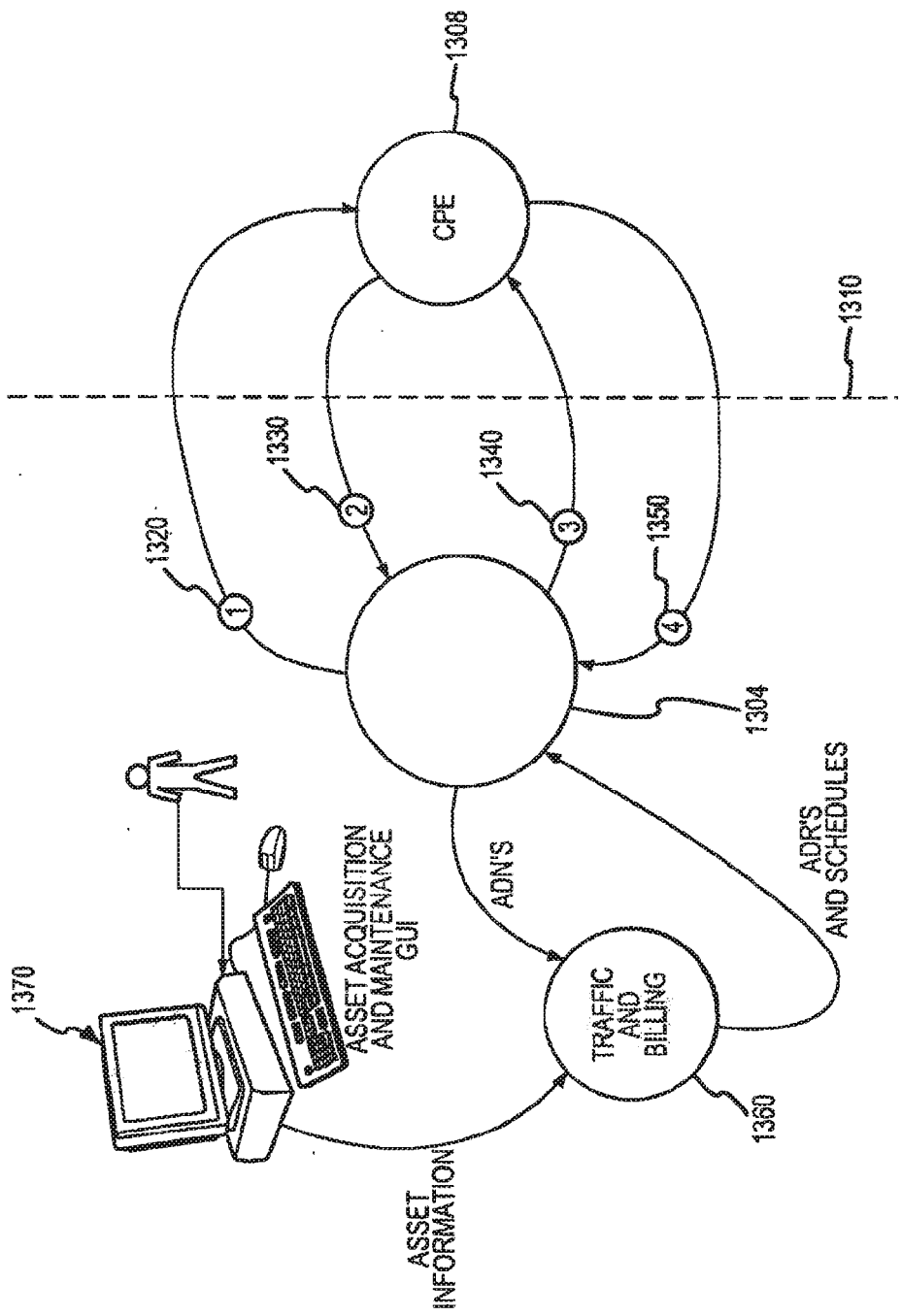
FIG. 13 illustrates communications between a network platform and a CPE.

FIG. 13 illustrates communications between a network platform or platforms 1304 operating a targeted asset system in accordance with the present invention and a CPE 1308. In this regard, the platform 1304 may include various combinations of the components discussed above in relation to FIGS. 1-12. Generally, the platform 1304 includes a headend that is operative to communicate with CPE over a network interface 1310. The CPE 1308 may include a set top box (STB). As will be appreciated, each user in the network may have such an STB or a sub-set (less than all) of the viewers may have such STBs. Some users may have an STB but only use it some of the time, e.g., only when watching HDTV programming. Moreover, some users may have an STB but choose not to participate in the targeted asset system. In any event, at least a portion of the network viewers have a CPE 1308 that is operative to receive signals via the network interface 1310 as well as provide signals to the platform 1304 via the network interface 1310 for purposes of the targeted asset delivery system. Further, the platform 1304 may be in communication with a traffic and billing platform 1360 which may act as an intermediary between asset providers 1370 and the network operator. In this regard, the T&B platform 1360 may receive target audience parameters and other constraints from the asset providers 1370 as well as provide billing information to such asset providers 1370 based on the delivery of such assets. The T&B platform 1360 may also manage the flow of targeted assets.

Generally, signals received from a CPE 1308 are utilized by the present system for at least three separate applications, which in some instances may also be combined. These applications may be termed measurement, voting and reporting. Reporting is described in more detail below. Measurement relates to the use of the signals to identify the audience size and, optionally, the classification composition of the audience. This information assists in estimating the universe of users available for targeting, including an estimate of the size and composition of an audience that may be aggregated over multiple channels (e.g., including low share channels) to form a substantial aggregated audience. Accordingly, a targeted asset may be provided for the aggregated audience to enhance the number of users who receive the asset. Voting involves the use of signals received from CPEs 1308 to provide an asset based on asset indications from the CPEs. In any case, assets may be selected and inserted into one or more transmitted data streams based on signals received from one or more CPEs 1308.

With regard to audience measurement, the two-way communication between the platform 1304 and CPE 1308 allows for gathering information which may indicate, at least implicitly, information regarding audience size and audience classification composition. In this regard, individual CPEs 1308 may periodically or upon request provide a signal to the platform 1304 indicating, for example, that an individual CPE 1308 is active and what channel is currently being displayed by the CPE 1308. This information, which may be provided in connection with voting, reporting on other messages (e.g., messages dedicated to measurement) can be used to infer audience size and composition. Wholly apart from the targeted asset system, such information may be useful to support ratings and share information or for any other audience measurement objective. Such information may also be utilized to tailor transmissions to the CPE 1308 and reduce bandwidth and processing requirements.

Figure 7:
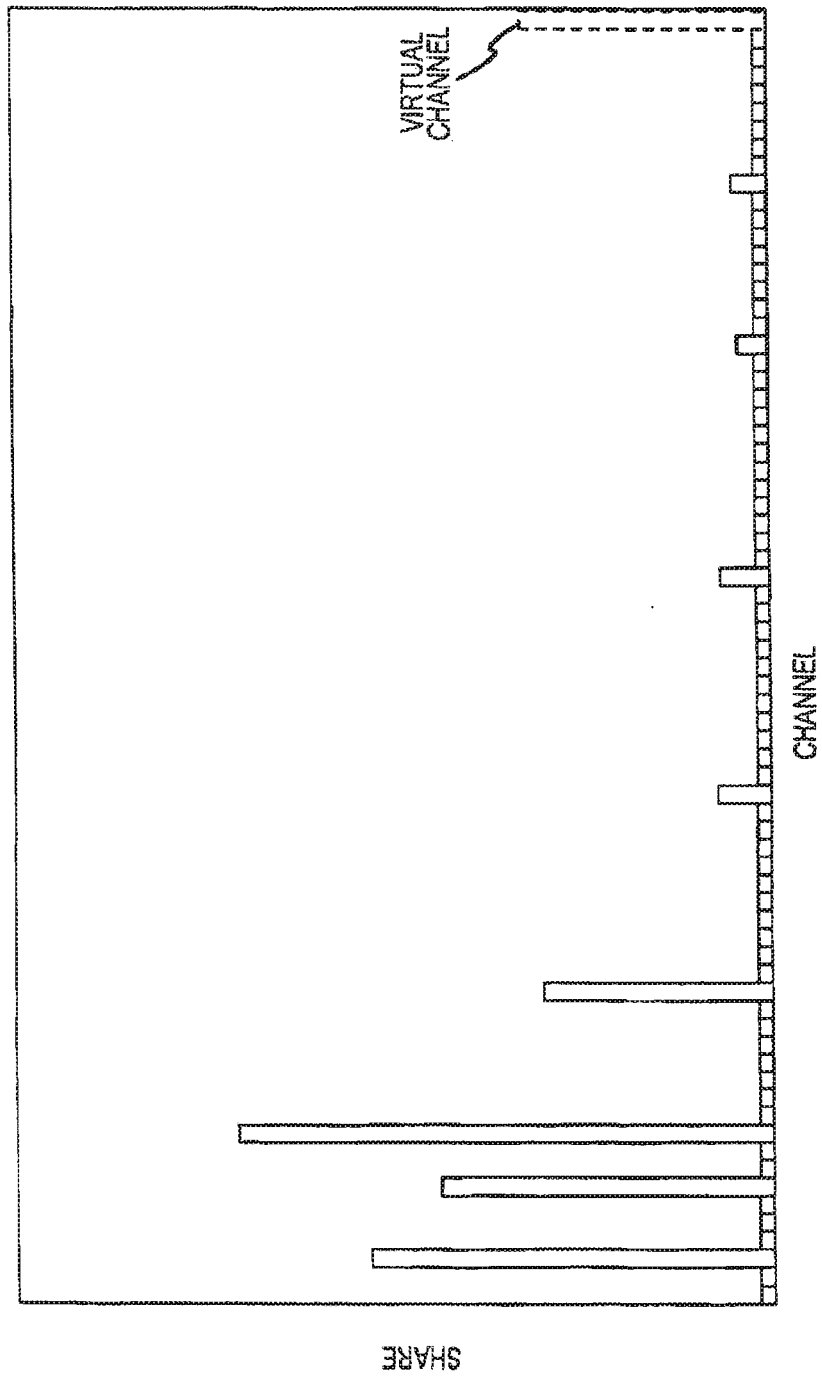
FIG. 7 illustrates a virtual channel in the context of audience aggregation.

Referring briefly to FIG. 7, it is noted that of the available programming channels, four programming channels have the largest individual share of users (e.g., the four major networks). However, there are numerous other users in the network albeit in smaller shares of the total on a channel-by-channel basis. By providing a common set of asset options to the users of two or more of the programming channels having a small market share (or even to users of programming channels with large shares), an aggregated audience may be created. That is, a common asset option or set of asset options may be provided to an aggregated group from multiple programming channels. Once combined, the effective market share of an aggregated audience composed of users from small share channels may approximate the market share of, for example, one of the four major networks.

While the aggregation of the users of multiple programming channels into an aggregated audience allows for providing a common set of asset options to each of the programming channels, it will be appreciated that the asset will generally be provided for each individual programming channel at different times. This is shown in FIG. 15 where two different programming channels (e.g., 1502 and 1504), which may be combined into a virtual channel, have different scheduled breaks 1512, 1514. In this regard, an asset may be delivered on the first channel 1502 prior to when the same asset is delivered on the second channel 1504. However, this common asset may still be provided within a predetermined time window (e.g., between 7 p.m. and 8 p.m.). In this regard, the asset may be delivered to the aggregated market share (or a subset thereof) within defined constraints regarding delivery time. Alternatively, the size of such an aggregated audience may be estimated in advance based on previous reporting, ratings and census data, or any other technique. Thus measurement or voting is not necessary to accomplish targeting, though such detailed asset information is useful. Actual delivery may be verified by subsequent reporting. As will be appreciated, such aggregation allows a network operator to disseminate assets based on the increased market share of the aggregated audience(s) in relation to any one of the subsumed programming channels, as well as allowing an asset provider to more effectively target a current viewing audience.

Figure 14:
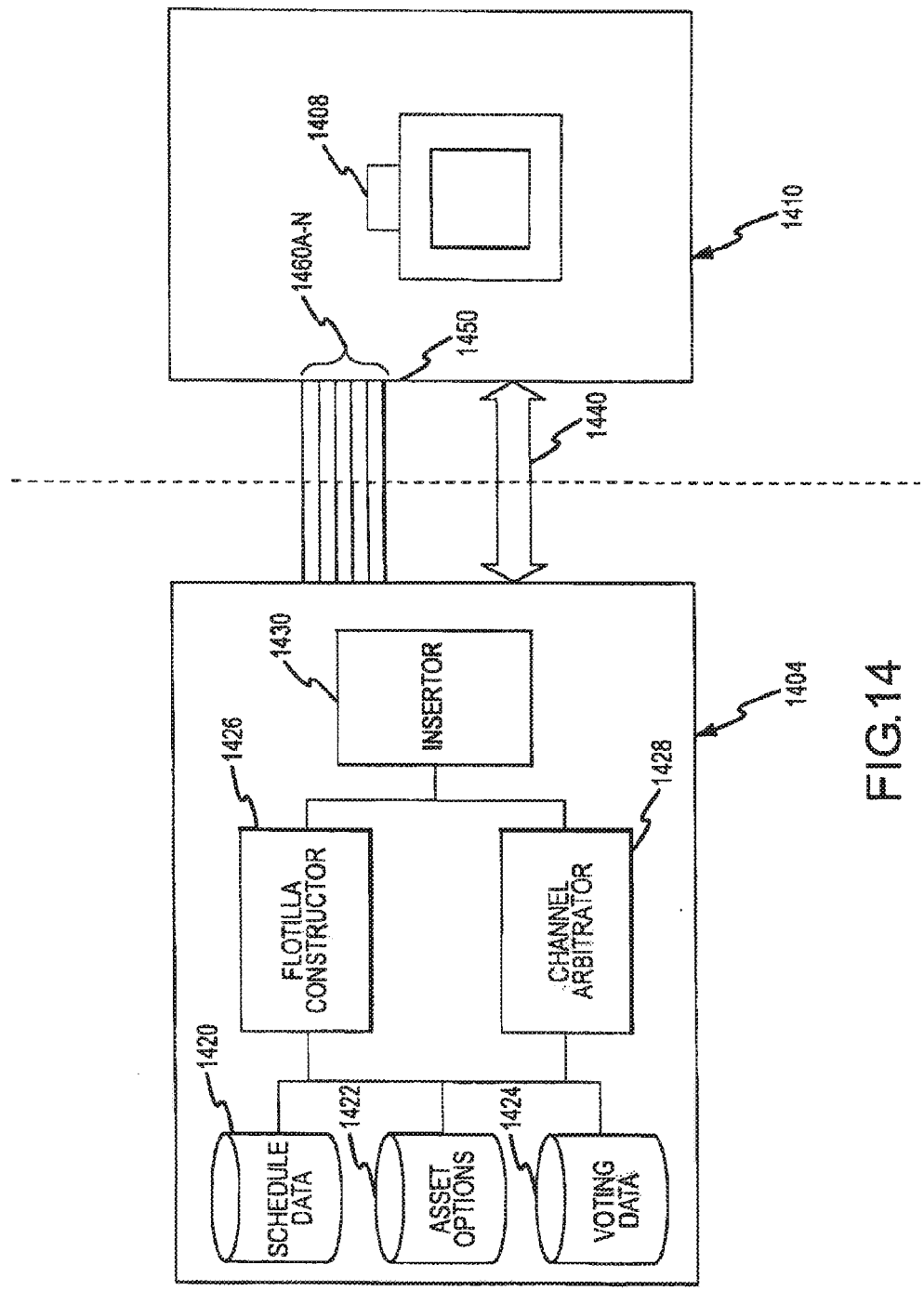
FIG. 14 illustrates an application that is supported by signals from CPEs and provides targeted assets to users of one or more channels within a network.

Another application that is supported by signals from CPEs is the provision of targeted assets to current users of one or more channels within the network, e.g., based on voting. Such an application is illustrated in FIG. 14, where, in one arrangement, signals received from CPEs 1410 (only one shown) may be utilized to select assets (e.g., a break asset and/or programming) for at least one programming channel 1450. In this regard, such assets may be dynamically selected for insertion into the data stream of the programming channel 1450, for example, during a break or other designated time period. In a further arrangement, unused bandwidth of the network is utilized to provide parallel asset streams during a break or designated time period of the targeted channel 1450. In the context of a break, multiple asset channels 1460A-N may be used to provide asset options during a single break, wherein each asset channel 1460A-N may provide options directed to different groups of viewers and/or otherwise carry different assets (e.g., users having similar audience classification parameters may receive different assets due to a desired sequencing of packaged assets as discussed below).

In such an arrangement, the CPE 1410 may be operative to select between alternate asset channels 1460A-N. In addition to targeted audience aggregation, such a system may be desirable to enhance revenues or impact for programming, including large share programming (spot optimization). That is, a single break may be apportioned to two or more different asset providers, or, a single asset provider may provide alternate assets where the alternate assets target different groups of users. Though discussed herein as being directed to providing different break or interstitial assets to different groups of users, it should be noted that the system may also be utilized to provide different programming assets.

An associated asset targeting system implementing a voting process is illustrated in FIG. 14. The asset targeting system of FIG. 14 has a platform 1404, which includes a structure of the network (i.e., upstream from the users/households) that is operative to communicate with CPEs 1410 (only one shown) within the network. The illustrated CPE 1410 includes a signal processing device 1408, which in the present illustration is embodied in an STB. Generally, the platform 1404 is operative to communicate with the CPE 1410 via a network interface 1440. In order to provide parallel asset channels 1460A-N during a break of a programming channel, e.g., channel 1450, the platform 1404 is in communication with one or more of the following components: a schedule database 1420, an available asset option database 1422, voting database 1424, a flotilla constructor 1426, a channel arbitrator 1428, and an inserter 1430. Of note, the listed components 1420-1430 do not have to be located at a common network location. That is, the various components of the platform 1404 may be distributed over separate locations within the network and may be interconnected by any appropriate communication interfaces.

Generally, the schedule database 1420 includes information regarding the timing of breaks for one or more programming channels, the asset option database 1422 includes available asset metadata identifying the asset and targeted audience classification parameters, and the voting database 1424 includes voting information obtained from one or more CPEs for use in targeting assets. The actual assets are generally included in separate storage (not shown). The flotilla constructor 1426 is utilized to populate a break of a programming channel and/or asset channels 1460A-N with selected assets. The channel arbitrator 1428 is utilized to arbitrate the use of limited bandwidth (e.g., available asset channels 1460A-N) when a conflict arises between breaks of two or more supported programming channels. Finally, the inserter 1430 is utilized to insert selected assets or targeted assets into an asset stream (e.g., of a programming channel 1450 and/or one or more asset channels 1460A-N) prior to transmitting the stream across the network interface 1440. As will be discussed herein, the system is operative to provide asset channels 1460A-N to support asset options for breaks of multiple programming channels within the network.

In order to provide asset channels 1460A-N for one or more programming channels, the timing of the breaks on the relevant programming channels is determined. For instance, FIG. 15 illustrates three programming channels that may be provided by the network operator to a household via a network interface. As will be appreciated, many more channels may also be provided. The channels 1502, 1504 and 1506 comprise three programming streams for which targeted assets are provided. Users may switch between each of these channels 1502, 1504 and 1506 (and generally many more) to select between programming options. Each channel 1502, 1504 and 1506 includes a break 1512, 1514 and 1516, respectively, during the programming period shown. During breaks 1512-1516 one or more asset spots are typically available. That is, a sequence of shorter assets may be used to fill the 90-second break. For example, two, three or four spots may be defined on a single channel for a single break. It will be appreciated that 90 seconds is used as an example and other break lengths are possible and likely. Different numbers of spots may be provided for the same break on different channels and a different number of channels may be used for different portions of the break.

In order to provide notice of upcoming breaks or insertion opportunities within a break, programming streams often include a cue tone signal 1530 (or a cue message in digital networks) a predetermined time before the beginning of each break or insertion opportunity. These cue tone signals 1530 have historically been utilized to allow local asset providers to insert localized assets into a network feed. Further, various channels may provide window start times and window end times during which one or more breaks will occur. These start and end times define an avail window. Again, this information has historically been provided to allow local asset providers to insert local assets into a broadcast stream. This information may also be utilized by the targeted asset system to determine when a break will occur during programming. Accordingly, the system may be operative to monitor programming channels, e.g., 1502, 1504 and 1506, for cue tone signals 1530 as well as obtain and store information regarding window start and end times (e.g., in the schedule database 1420). The available window information may be received from the T&B system and may be manually entered.

Due to the limited bandwidth available for providing targeted asset delivery, it may be desirable to identify one or more characteristics associated with each programming channel 1502, 1504 and 1506 when determining which channel(s) should receive targeted asset delivery for conflicting breaks or how available bandwidth should be apportioned among the conflicting programming channels. In this regard, it will be noted that breaks on different channels are often at least partially overlapping. For instance, the break 1514 of channel 1504 partially overlaps the break 1516 on channel 1506. Accordingly, it may be desirable to arbitrate the limited resources available for targeted asset delivery between the two channels 1504 and 1506.

For instance, the arbitrator 1428 (See FIG. 14) may determine that the first channel 1506 does not currently have enough users to warrant use of any available bandwidth to provide targeted asset delivery. Alternatively, the available bandwidth may be split between the first and second channels 1504, 1506 such that targeting asset delivery may be provided for each break 1514, 1516. As a further alternative, the available asset channels may be split between supporting the first and second channels 1504, 1506, for example, in proportion to their respective audience sizes. It is noted that it may be possible to use a given asset channel in support of only a portion of a break, for example, in connection with partially overlapping breaks, though this involves certain practical difficulties related to scheduling and flotilla construction. This may also require knowledge of the underlying break structure, e.g., to ensure that the viewer is not returned to the second half of a sixty-second asset. This information will generally not be available to the CPE. Also, different numbers of asset channels may be available at different time periods of a break. Signals received from CPEs, e.g. recent or historical signals, may be utilized for arbitration purposes. Further, it will be appreciated that in some instances one or more channels may include aligned breaks. For instance, channels having a common ownership entity (e.g., ESPN and ABC) may have aligned breaks for certain programming. Accordingly, bandwidth for targeted asset delivery for these common channels may be shared.

Referring again to FIG. 14, the use of signals from the CPE 1410 may allow for providing assets that are tailored to current users or otherwise providing different assets to different groups of users. In this regard, an asset that has targeting parameters that match the classification parameters of the greatest number or value of users may be provided within the broadcast stream of a supported programming channel 1450 during a break. It is noted that the most appropriate asset may thereby be provided to analog or otherwise nonparticipating users (assuming the voters are representative of the relevant user universe), yielding a degree of targeting even for them. Moreover, some targeting benefit can be achieved for a large number of programming channels, even channels that may not be supported by asset channels with respect to a given break.

Alternatively or additionally, different assets may be provided on the asset channels 1460A-N during the break of a programming channel. During a break where asset channels 1460A-N are available, a CPE 1410 of a particular household may, based on a determination implemented at the CPE 1410, switch to one of the asset channels 1460A-N that contains appropriate assets. Accordingly, such assets of the asset channel 1460A-N may be displayed during the break. During the break, the CPE 1410 may stay on one asset channel 1460A-N (in the case of a break with multiple spots in sequence) or may navigate through the break selecting the most appropriate assets. After the break, the CPE 1410 may switch back to the original programming channel (if necessary). This switching may occur seamlessly from the point of view of a user. In this regard, different assets may be provided to different users during the same break. As will be appreciated, this allows asset providers to target different groups during the same break. Further it allows for a network operator to market a single spot to two different asset providers on an apportioned basis (or allow a single asset provider to fill a single spot with multiple asset options). Each asset provider may, for example, thereby pay for an audience that better matches its target.

Figure 16A:
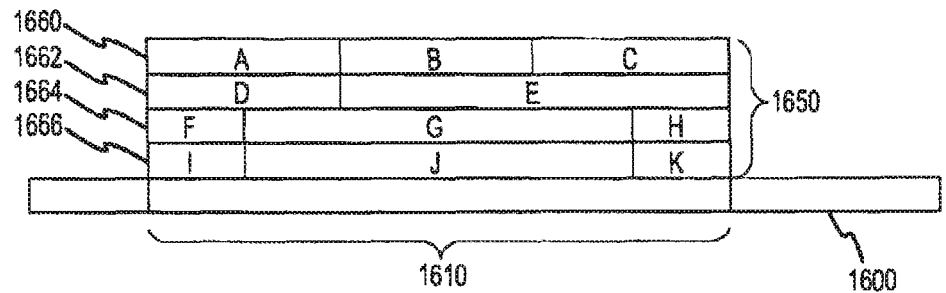
FIG. 16A illustrates the use of asset channels for providing assets during a break of a programming channel.

The number of asset channels available for targeted asset delivery may be limited by the available bandwidth (e.g., unused channels) of a given network operator. As discussed below, the system may make use of channels that are opportunistically available, e.g., channels that are used for VOD at night may be available to support asset options during the day, or unused bandwidth within a node switch area may be used for this purpose. FIG. 16A illustrates the use of four asset channels 1601-1604 for providing assets during a break 1610 of a programming channel 1600. As shown, on each asset channel 1601-1604, the break 1610 may be separated into one or more asset slots that may have different durations. However, in the case of FIG. 16A, the start and end times of the asset sets A-C, D-E, F-H and I-K carried by the asset channels 1601-1604 are aligned with the start and end times of the break 1610. Each of the asset channels 1601-1604 may carry an asset that is targeted to a specific audience classification of the users of the programming channel 1600 or the users of additional programming channels having a break aligned with the break 1610 of the programming channel 1600.

Figure 16B:
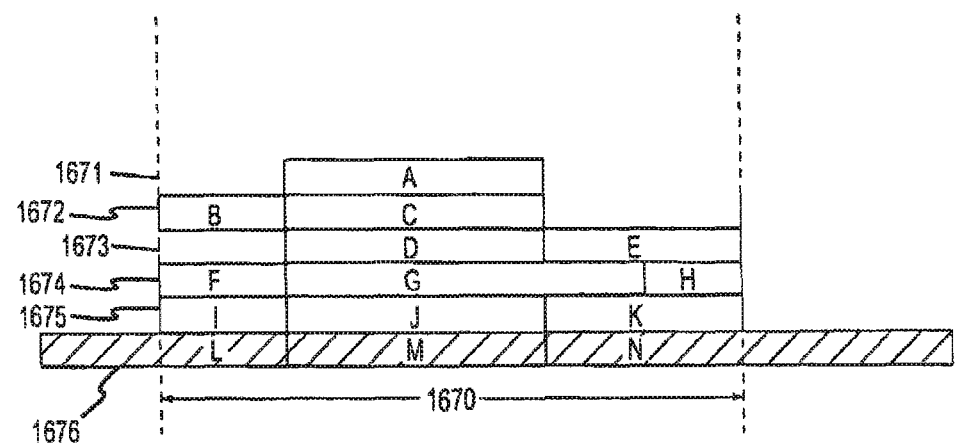
FIG. 16B illustrates an exemplary asset flotilla.

It should be noted that flotillas need not be rectangular as shown in FIG. 16A. That is, due to conflicts between breaks or the intermittent availability of certain asset channels as discussed above, the total number of asset channels used to support a given programming channel may change during a break. This is illustrated in FIG. 16B. As shown, assets A-N are provided during a break 1670 on asset channels 1671-1675 and the supported programming channel, 1676. In this case, channels 1674 and 1675 (as well as programming channel 1676) provide assets throughout the break 1670. Channel 1673 does not provide assets until sometime after the break begins. Channel 1672 provides assets from the beginning of the break, but ceases to provide assets prior to the end of the break 1670. Channel 1671 starts providing assets after the start of the break 1670 and ceases providing assets prior to the end of the break 1670. It will be appreciated that complex flotilla shapes may be implemented.

Referring again to FIG. 16A, each asset channel 1601-11604 includes a different combination of assets A-K that may be targeted to different viewers of the channel 1600 during a given break 1610. Collectively, the assets A-K carried by the asset channels 1601-1604 define a flotilla 1650 that includes assets that may be targeted to different groups of users. The most appropriate assets for a given user may be on different ones of the channels 1601-1604 at different times during the break 1610. These can be delivered to the user by channel hopping during the break with due consideration given to the fact that spots on different channels 1601-1604 may not have the same start and end times. I-low the various spots in the flotilla 1650 are populated with assets is described in more detail below.

The four asset channels 1601-1604 may be utilized to provide multiple asset options for different programming channels. For instance referring to FIG. 15, programming channels 1502 and 1506 have temporally distinct breaks 1512 and 1516. Accordingly, the system may provide a first four-channel asset flotilla having a first set of assets during the first break 1512 for the first channel 1502. Likewise a second four-channel asset flotilla having a second set of assets may be provided during the second break 1516 for the second channel 1506. In this regard, use of the bandwidth available for asset channels may be shared between programming channels 1502 and 1506. In cases where breaks overlap (e.g., breaks 1514 and 1516), one channel may be selected for targeted asset delivery, or, the available bandwidth for the asset channels may be split between the conflicting breaks. For example, each programming channel may be supported by a two-channel asset flotilla or one programming channel may be supported by three asset channels and the other programming channel supported by only one asset channel, for example, due to relative audience sizes or asset delivery values. Arbitration of available bandwidth between conflicting channels is handled by the channel arbitrator 1428, as will be more fully discussed herein.

Selection of assets to fill a break of a programming channel, or to fill the available spots within each asset channel of a flotilla may be based on votes of users of the programming channel. That is, assets may be selected by the flotilla constructor 1426 (See FIG. 14) in response to signals received from CPEs 1410 within the network. As shown in FIG. 13, the process of selecting and providing targeted assets based on signals from CPEs includes four general steps. Initially, the platform 1304 provides (1320) an asset option list of proposed assets to the CPEs 1308 in the network. This may be based on asset provider contracts and associated ADRs. Next, each CPE 1308 votes (1330) on the most appropriate asset or assets from the asset option list. That is each CPE 1308 provides a signal to the network 1304 that indicates the best matching asset(s) for the particular CPE 1308 based on a comparison of target information to audience classification information. Based on the votes (1330) from one or more CPEs 1308, the platform 1304 selects targeted assets from the available assets and generates (1340) an asset view list and an asset flotilla, which is provided to each voting CPE 1308. For example, the asset view list many indicate channels where assets are available and provide associated audience classification information (if necessary) to assist in asset selection. Each CPE 1308 may then receive the view list and flotilla.

The process by which the votes are used to populate the various asset spots in a flotilla may involve a number of considerations. Referring again to FIG. 16A, the flotilla defines a matrix of assets illustrated as including a horizontal time axis and a vertical axis of asset channels. In the simple case where all the assets correspond to spots of the same length (e.g., all 30 second spots and the same number of asset channels are used throughout the break) the matrix would define a neat arrangement of rows and columns. The flotilla constructor would then be operative, among other things, to map assets to row and column addresses of the matrix, for example, based on their vote rankings.

Some of the considerations that may be involved in this regard include the following. First, the programming channel 1600 itself may be populated with an asset sequence determined based on voting and may be treated as part of the flotilla. The assets inserted into the programming channel will be delivered to analog and otherwise nonparticipating users, as well as to participating users whose CPEs select that asset sequence, and may therefore be expected to constitute the largest user segment of the flotilla. Accordingly, assets with higher vote rankings may be inserted on the programming channel 1600.

In addition in the case of breaks including more than two spots, first and last spots may be deemed more valuable by asset providers than middle spots. Accordingly, higher vote ranking assets may be favored for first and last spots, resulting in population of the matrix more on a column-by column basis as a function of votes rather than on a row-by-row basis. However, and somewhat by contrast, it may be desired to time stagger the highest vote ranking assets, for example, so that a given user may have the opportunity to view both the top voted asset and the second-most voted asset.

The process of populating the flotilla matrix may also take into account demographics determined independent of the voting process. Thus, as noted above, if twelve spots are included in the flotilla, the spots may be apportioned to reflect, for example, the demographic composition of the program audience—e.g., two-thirds female and one-third male, or two-thirds female 18-34 years old and one-third female 34 and over—or the weighted average of the program audience (e.g., resulting in a disproportionate channel allocation for audience segments or assets deemed to have an exceptionally high or low per user value). Such information may be based, for example, on conventional ratings information.

Moreover, this flotilla population process may take into account system limitations. For example, if the system is implemented without the ability to navigate between or a preference against navigating between different channels during a given break, or if it is desired to minimize hops during a break, then the flotilla may be constructed so that a given channel has assets intended for a consistent audience classification throughout a break. That is, votes may be tabulated on a classification dependent basis and then corresponding rows may be populated based on the votes. Additionally, in connection with packaged assets having a desired sequencing, such sequencing may be considered in flotilla construction.

The flotilla construction process may also take into account the desirability of effectively navigating through an entire break, which may entail multiple channel hops. For example, it has been noted asset options may be included on the programming channel as well as on asset channels. However, the underlying structure of the assets interleaved into the programming content is generally not known. Accordingly, either information regarding such underlying structure can be provided through appropriate signaling or returns to the programming channel during a break can be precluded so as to avoid switching to an asset in progress.

It is also desirable that each customer premises equipment device be able to navigate across a break selecting assets that are appropriate for the current user. For example, a flotilla may include a number of columns correspondent to a sequence of asset spots for a break. If one column included all assets directed to children, non-children users would be left without an appropriate asset option for that spot. Thus, options for avoiding such situations include making sure that a widely targeted asset is available in each column or time period, or that the union of the subsets defined by the targeting constraints for each asset in a column or time period represents the largest possible subset of the universe of users. Of course, this may conflict with other flotilla construction goals and an optimal solution may need to be arbitrated. In addition, where an issue arises as to which assets to include in a flotilla, the identity of the relevant asset providers may be considered (e.g., a larger volume asset provider or an asset provider who has paid for a higher level of service may be given preference).

It will be appreciated that a variety of factors may be reflected in an algorithm for using the vote information to populate a flotilla. For example, Gantt chart logic or other conditional scheduling logic may be implemented in this regard.

Alternatively, asset options may be provided via a forward-and-store architecture in the case of CPEs with substantial storage resources, e.g., DVRs. In this regard, an asset may be inserted into a designated bandwidth segment and downloaded via the network interface to the storage of the CPE. Accordingly, the CPE may then selectively insert the asset from the storage into a subsequent break. Further, in this architecture, the assets of the stored options and associated metadata may include an expiration time. Assets may be discarded (e.g., deleted) upon expiration regardless of whether they have been delivered. In this architecture, it will be appreciated that the transmission of assets does not have a real-time component, so the available bandwidth may vary during transmission. Moreover, a thirty second asset may be transmitted in five seconds or over thirty minutes. The available assets may be broadcast to all CPEs with individual CPEs only storing appropriate assets. In addition, due to storage limitations, a CPE may delete an asset of interest and re-record it later.

In contrast, in the asset channel architecture, the flotilla is transmitted in synchronization with the associated break and requires little or no storage at the CPE. In either case, once an asset from the storage or flotilla is displayed, each CPE 1308 may provide (1350) an asset delivery notification (ADN) to the network platform 1304 indicating that the particular asset was delivered. The platform 1304 may then provide aggregated or compiled information regarding the total number of users that received a given asset. The information may be analyzed internally by a network operator or, perhaps, provided to asset providers. Accordingly, individual asset providers may be billed in accordance with how many users received a given asset. Each of these steps 1320-1350 is more fully discussed herein.

As noted, signals from the individual CPEs 1308 may be utilized for targeted asset system purposes. However, it will be appreciated that while it is possible to receive vote signals from each CPE 1308 in a network, such full network 'polling' may result in large bandwidth requirements. In one alternate implementation, statistical sampling is utilized to reduce the bandwidth requirements between the network 1304 and the CPEs 1308. As will be appreciated, sampling of a statistically significant and relevant portion of the CPEs 1308 will provide a useful representation of the channels currently being used as well as a useful representation of the most appropriate assets for the users using those channels.

In order to provide statistical sampling for the network, a sub-set of less than all of the CPEs 1304 may provide signals to the network platform 1304. For instance, in a first arrangement, each CPE 1308 may include a random number generator. Periodically, such a random number generator may generate an output. If this output meets a predetermined criteria (e.g., a number ending with 5), the CPE 1308 may provide a signal to the network 1304 in relation to an option list. Alternatively, the platform 1304 may be operative to randomly select a subset of CPEs 1308 to receive a request for information. In any case, it is preferable that the subset of CPEs 1308 be large enough in comparison to the total number of CPEs 1308 to provide a statistically accurate overview of current network conditions. However, where a fully representative sampling is not available, attendant uncertainties can be addressed through business rules, e.g., providing a reduced price or greater dissemination to account for the uncertainty.

In addition to statistically sampling the active CPEs 1304 for information relating to the present audience and the present audience characteristics, the CPEs 1304 may use bandwidth, e.g., in an opportunistic manner, to transmit information. Information from CPEs 1304 may be transmitted when bandwidth is available, or otherwise during opportunistic times. The information so transmitted may include information that is not time varying such as information relating to the locations of CPEs. The information transmitted may also include time-varying information such as characteristics (other than location) of a viewer presently watching a television attached to a CPE.

Referring again to FIG. 14, as noted, a network operator initially provides an asset option list (the same as list 1010 of FIG. 10) to at least the CPEs within the network that will vote on assets from the list. Generally, the asset option list includes a list of available assets for one or more upcoming breaks. In this regard, it will be appreciated that a platform 1404 within the network, see FIG. 14, may be operative to obtain schedule information for all programming channels that have been identified to be supported by targeted assets. The platform 1404 may then use the schedule information to communicate with CPEs 1410 over the network interface 1440 prior to a break. In particular, the platform 1404 may be operative to provide the asset option list to CPEs 1410, for example, periodically.

Figure 17A:
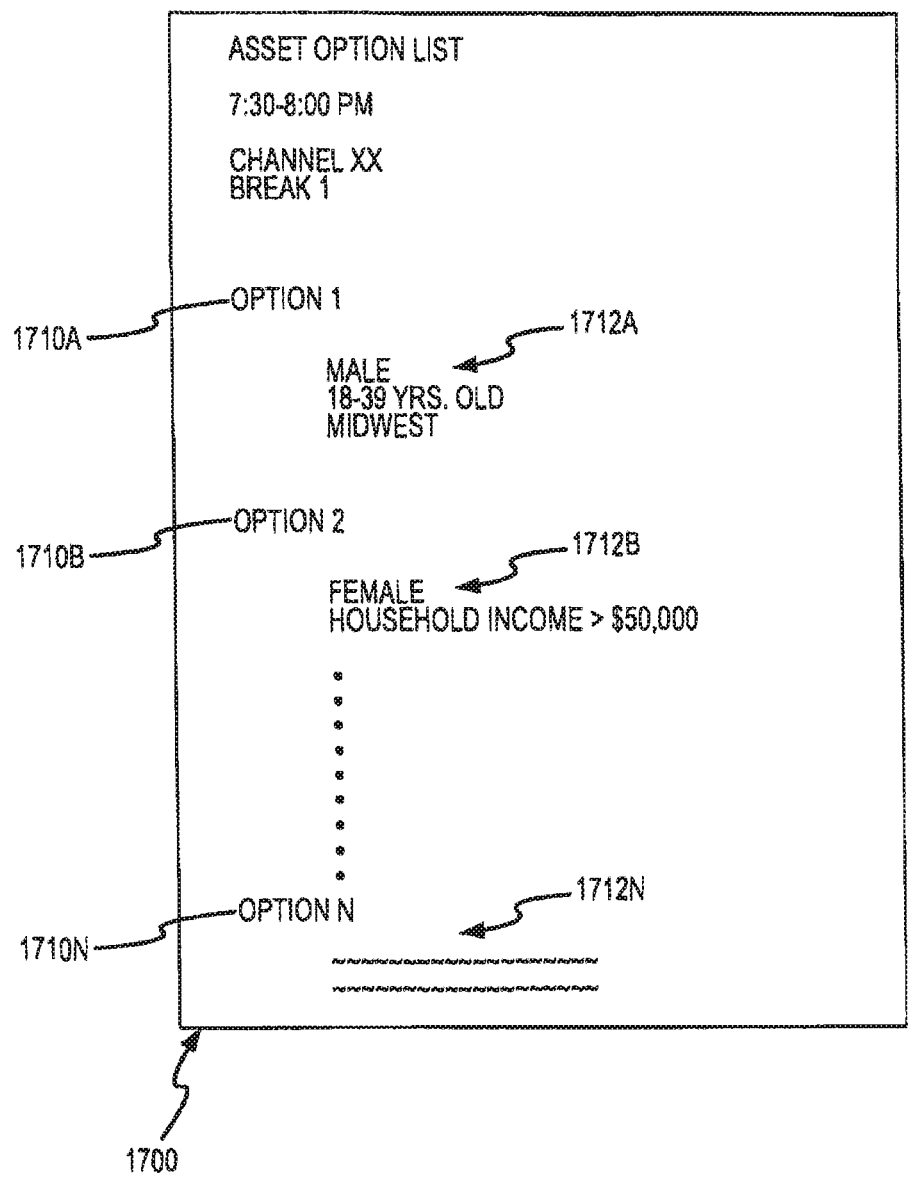
FIG. 17A shows an asset option list for a per break/per channel basis.

FIGS. 17A-17B illustrate exemplary asset option lists 1700. Specifically, FIG. 17A shows assets listed on a per break, per channel basis. FIG. 17B shows assets listed for multiple breaks (specifying audience classification parameters and, optionally, channels including aggregated audiences who may be associated with an identifier in the channels column) in a single list. Each asset option 1710A-N in the list 1700 of FIG. 17A is available for viewing during a subsequent break. In this regard, an asset provider may have requested that each such asset option 1710A-N be made available for a particular time window and/or for a particular channel (i.e., which may include an aggregated audience). Furthermore, the asset option list 1700 may include one or more constraints 1712A-N for each available asset option 1710A-N. Such constraints 1712A-N may include, without limitation, audience classification parameter information such as the desired age range, gender, geographic location and/or household income of the target audience for each asset 1710A-N. Once the list 1700A-N of asset options is sent to a CPE 1410, the CPE 1410 reviews the asset options and votes on the suitability of providing those asset options to a current user of the CPE 1410. In the case of FIG. 17B, CPEs may vote with respect to all asset options matching the current programming channel or another channel deemed relevant.

Figure 18:
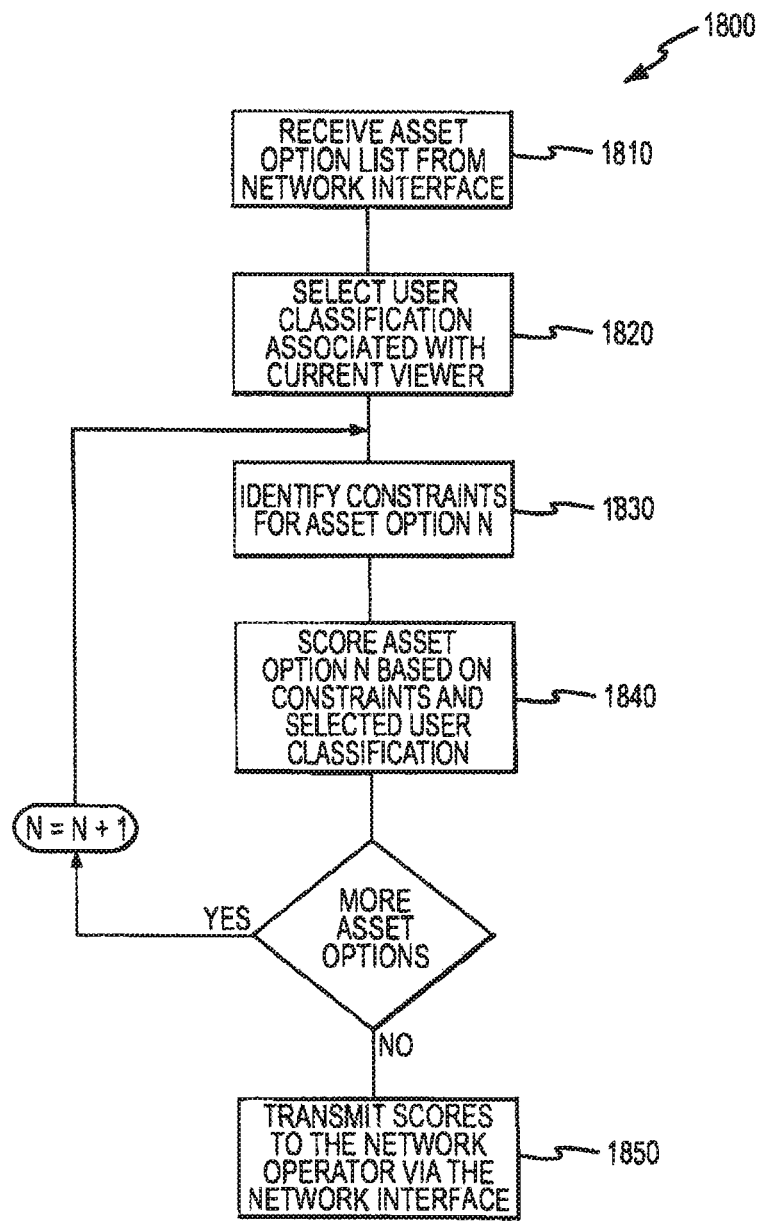
FIG. 18 illustrates a process in which CPEs may vote with respect to asset options for a programming channel.

This process is illustrated in FIG. 18. As shown, the CPE initially receives (1810) an asset option list corresponding to the assets that are available for at least one upcoming break. The CPE then selects (1820) current classification information, which includes putative information associated with one or more users of the household. The CPE then identifies (1830) constraints for a first asset within the list and scores (1840) the asset according to the suitability of the asset for insertion at a subsequent break. In general, the asset options are scored (1840) based on the constraints of the asset as well as the audience classification information. For instance, an asset having an age constraint (at least for the age parameter) specifying users between the ages of 50 and 60 may be scored low or not at all (at least for the age parameter) in relation to an audience classification indicating a current viewer is between the ages of 18 and 39. In one arrangement, the more closely the asset targeting constraints (which may be expressed in terms of audience classification parameters) and the audience classification information for a user match, the higher the score for that asset. Likewise, the greater the divergence between the targeting constraints and the audience classification information, the lower the score for that asset. In another arrangement, a simple positive (i.e., matching targeting constraints and audience classification) or negative (i.e., mismatch of targeting constraints and audience classification) may be provided.

A determination is then made as to whether there are additional assets for scoring. If so, the identification (1830) and scoring (1840) steps are repeated for each asset. Once each relevant asset within the asset option list has been scored (1840), the scores are transmitted (1850) to the network operator via the network interface. For example, the CPE may be instructed to return scores for the top N assets for a given break or spot, where N is dynamically configurable. By returning scores to the network operator rather than providing audience classification information for a particular user, information regarding a current network audience is gathered without exposing sensitive information to the network.

Generally, scores from the individual CPEs are tallied to form a composite score. The composite score indicates the degree to which, independent of a specific user, a particular asset would be suitable for viewing by a current audience during a subsequent break. In this regard, a network controller may rank the assets according to their composite scores for subsequent insertion during a break.

A number of factors in addition to vote scores may be relevant in this regard. First, CPEs may express a negative preference or exclusion. For example, in connection with a child user, certain subject matter may be excluded. This may be implemented by having the asset provider, a network operator or another party such as a regulatory entity enter an "adult only" or similar constraint in connection with the asset metadata. An appropriate field may be provided in connection with a GUI of a contract placement platform as described below. In this manner, offensive asset delivery can be reduced or avoided for sensitive users. Asset providers or networks (to the extent that laws or regulations allow) may also define exclusions. Thus, an asset provider may indicate that an asset should or should not be run in connection with certain types of programs (e.g., that it should not be run in connection with a "G" rated program). As a further example, a political candidate may enter an exclusion to avoid airing assets on a news network or other network perceived to have a conflicting political base or agenda (or the network may exclude assets from that candidate). Commodity codes may also be used in this regard. Thus, assets may be associated with commodity codes relating to the subject matter of the asset. These codes may be used by asset providers, network operators or others to avoid undesired association (e.g., successive ads for competitive products). Similarly, networks having a religious affiliation may exclude assets deemed repugnant. Many more examples may be envisioned in this regard. Moreover, negative preferences or exclusions may be specific to users or households and may be implemented at the CPE. For example, parental control or idiosyncratic concerns may be addressed in this manner. It will thus be appreciated that exclusions or negative preferences may be entered by a variety of entities via a variety of interfaces and may be reflected in asset metadata, voting metadata, selection algorithms or other places.

An additional factor that may be considered in relation to voting and asset selection relates to the concepts of asset frequency and progress. Frequency defines the number of times that an asset provider desires an asset to be shown at a given CPE (or, in the present context, to a particular user) during a given time period (may be a week, a month, during a whole campaign or other period). Progress measures how well a given CPE (or user) is doing in achieving this target. These factors may be used in voting and asset selection. For example, if inadequate progress has been made to date by a user for a specific asset, that user's CPE will be more likely to vote for the asset at issue and to select it if available. Moreover, these factors may be considered at the headend. For example, if a large number of users are behind in terms of progress, that asset may be inserted in a flotilla regardless of voting and may be designated for obligatory delivery by at least the appropriate users.

More specifically, the flotilla constructor 1426 (See FIG. 14) may create a view list and/or populate a flotilla for a subsequent break. As shown in FIG. 16A, the flotilla includes multiple slots A-K, e.g., of varying length, in flotilla 1650. In one arrangement, the entire flotilla 1650 may be populated with assets based on the overall vote scores of the assets. For instance, the assets from the asset option list having the highest scores may be selected. The combined length of any sequence of assets selected for a given asset channel will match the length of the break 1610. Alternatively, each asset channel may be populated with assets based on their scores as well as one or more demographic constraints.

For instance, during a major sporting event it may be anticipated (or verified from vote information) that a majority of the expected users of the relevant programming channel are males. Accordingly, three of the asset channels 1601-1604 may be populated with assets targeted to males. Alternatively, a designated proportion of the overall spots A-K may be dedicated to assets targeted to males, or voting may simply be allowed to proceed, presumably resulting in a large proportion of the inserted assets being male targeted assets (though it may be desired to reserve some spots for minority classification users). In this regard, the highest scoring assets directed to male viewers may be selected. Further, the three asset channels 1601-1603 (or individual spots) may be directed to sub-groups of male viewer (e.g., based on age and/or income). In contrast, the fourth asset channel 1604 (or a set of spots) may be populated with assets directed towards female viewers to provide asset delivery to a previously non-represented portion of the audience or all spots may be allocated based on voting, which may or may not apportion the spots as described. As will be appreciated, assets may be selected for the fourth asset channel 1604 to include, for example, the highest scoring assets from the asset option list that have a constraint indicating that the asset is targeted towards females. Once the flotilla is populated, the CPE of each household may select a particular asset channel for viewing during the break or may switch between assets contained on different asset channels within the flotilla based on audience classification information of the current user of the CPE.

It will be appreciated that other considerations may be involved in flotilla construction. For example, asset providers often desire to place assets in the first or the last spot within a break (hence, breaks are often 60 seconds long so as to include only first and last 30 second spots). Moreover, asset providers may require a particular asset sequencing or pay a premium for a certain placement regardless of voting rank. Accordingly, significant care may be required in populating a flotilla with respect to rank or other factors.

To enable the CPE to switch to a designated asset channel for a break (or, for certain implementations, between asset options within the flotilla during a break) metadata may be provided in connection with each asset channel(s) and/or programming channel(s). As will be appreciated, each individual asset channel is a portion of an asset stream having a predetermined bandwidth. These asset channels may be further broken into in-band and out-of-band portions. Generally, the in-band portion of the signal supports the delivery of an asset stream (e.g., video). Triggers may be transmitted via the out-of-band portion of a channel. Further, such out-of-band portions of the bandwidth may be utilized for the delivery of the asset option list as well as a return path for use in collecting votes and reporting information from the CPE. More generally, it will be appreciated that in the various cases referenced herein where messaging occurs between the CPE and a network platform, any appropriate messaging channels may be used including separate IP or telephony channels.

The metadata for particular assets may be included in the out-of-band portion of an associated asset channel and may be in the form of text messages. For instance, these text messages may be DCII text messages/headers that are multiplexed into the out-of-band portion of each asset channel. In this regard, the CPE may review the metadata of each asset channel to identify which asset channel contains asset most closely aligned with an audience classification of a current user.

Based on the metadata, the CPE may select individual assets or asset sets depending on the implementation. Thus, in certain implementations, the CPE may select an asset for the first time-slot of a break that best corresponds to the audience classification of the current user. This process may be repeated for each time-slot within a break. Alternatively, an asset flotilla may include a single metadata set for each asset channel and the CPE, may simply select one asset channel for an entire break.

Figure 19:
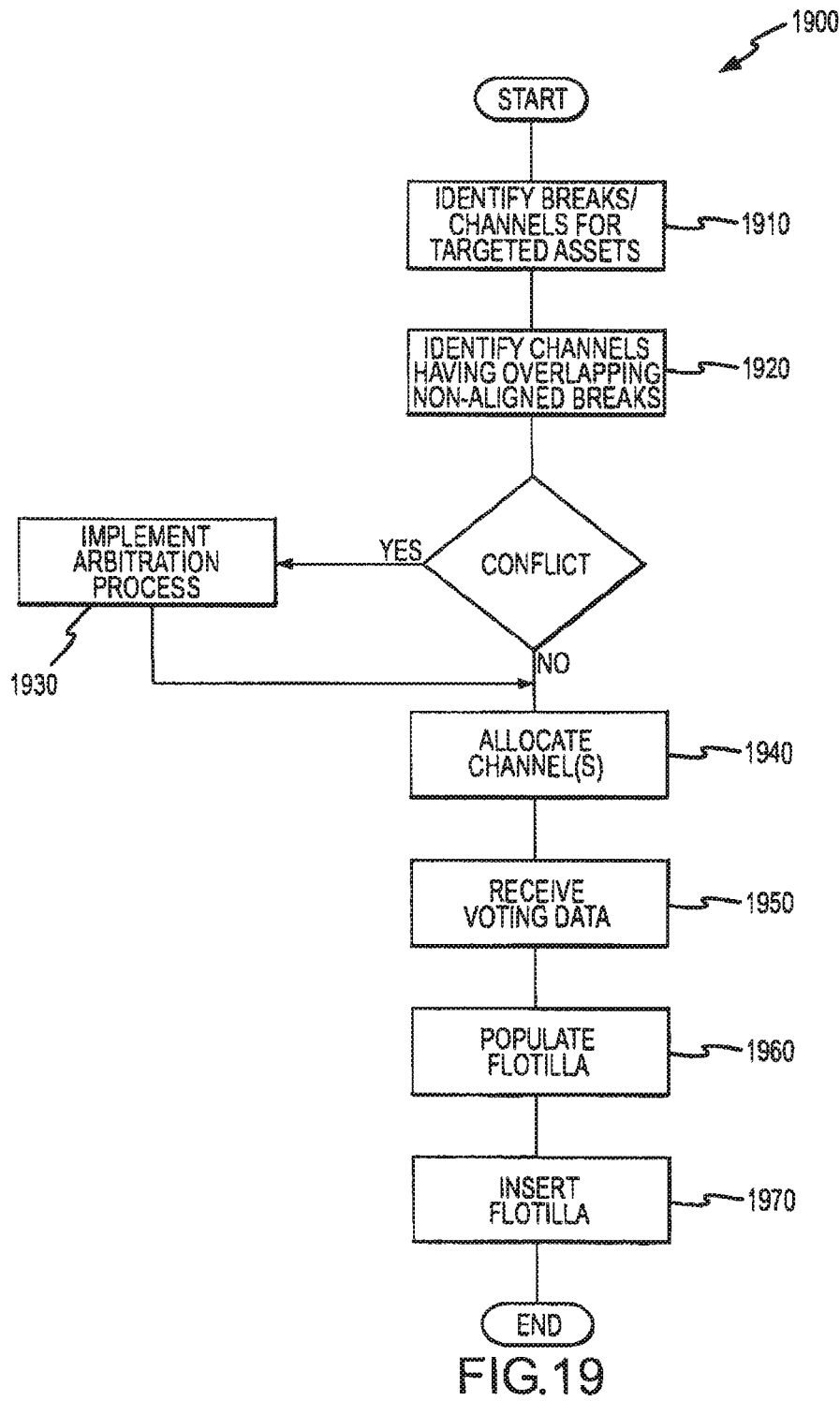
FIG. 19 illustrates a process of selecting assets for insertion into one or more asset channels.

Referring to FIGS. 14 and 19, the process of selecting assets for insertion into one or more asset channels is described. Initially, the platform 1404 identifies (1910) breaks in channels that are targeted for asset delivery. In this regard, the platform 1404 may access the schedule database 1420, which includes scheduling data for programming channels, to identify upcoming breaks. Further, the process may include identifying (1920) overlapping breaks of programming channels. If there is a conflict between two breaks identified for targeted assets, an arbitration process may be implemented (1930) by the arbitrator 1428. If no conflict exists, asset channels may be allocated (1940) to provide multiple asset options for an upcoming break. Accordingly, voting data may then be received (1950), for example from the voting data database 1424 (which stores data compiled from received votes), for an upcoming time period that includes the upcoming break.

Based on the voting data, the platform 1404 may access the asset options database 1422 to populate (1960) the asset channels that form the flotilla with assets for the upcoming break. Once the flotilla is populated (1960), it may be broadcast in synchronization with a break for which targeted asset delivery is provided. In this regard, the method may include inserting (1970) the flotilla into allocated asset channels and, perhaps, in the programming channel. As will be appreciated this step may include providing metadata in connection with the programming channel, asset channels or other bandwidth such that a CPE is aware that asset channels having alternate assets are available and can select therefrom. For example, metadata on the programming channel may indicate to the CPE which asset channels are available such that the CPE may monitor the available asset channels and select assets based on the audience classification of a current user and the asset channel metadata.

Figure 20:
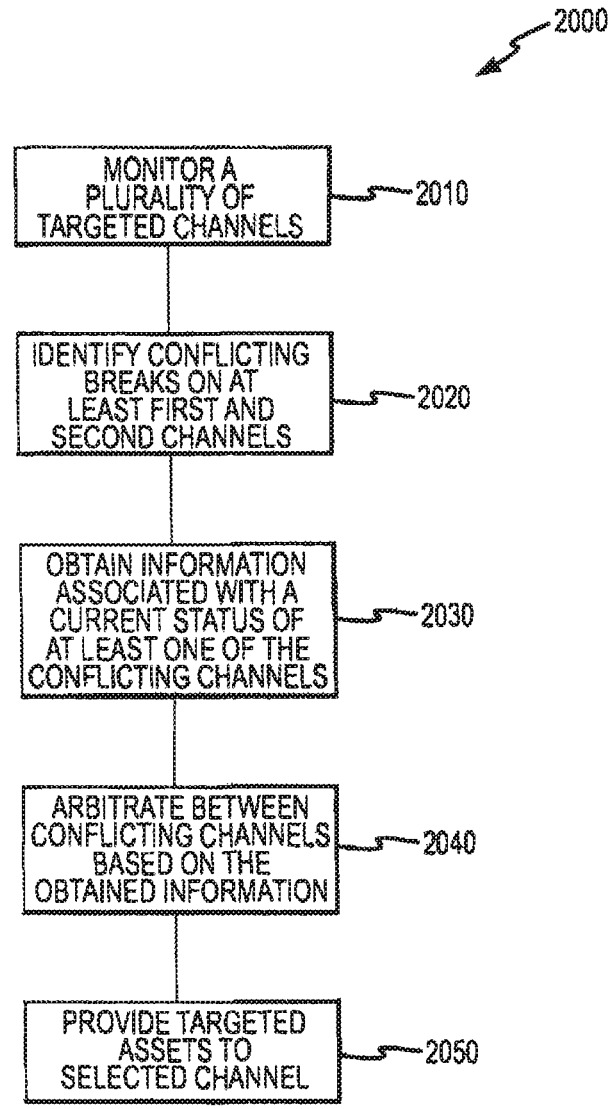
FIG. 20 illustrates an arbitration process wherein two or more programming channels have conflicting breaks.

Referring to FIG. 20, an arbitration process 2000 is illustrated. As noted above, in some instances two programming channels identified for targeted assets may have conflicting breaks. For instance, referring briefly to FIG. 15 it is noted that channels 1504 and 1506 have conflicting (i.e., non-aligned and overlapping) breaks 1514 and 1516. It should be noted that the exact timing of breaks cannot be determined with great precision and such timing is generally not known until a cue occurs. As discussed below, this timing can be estimated based on historical data to obtain a statistical probability function identifying when breaks will occur. Accordingly, in cases where limited bandwidth is available for providing targeted asset delivery, it may be desirable to arbitrate between channels apparently having conflicting breaks. This may allow, for example, asset providers to target one or more demographic groups that are better represented by one of the conflicting channels, to target the channel having a greater number of users or to proportionally allocate the bandwidth based on such factors. In this regard, the process may include monitoring (2010) a plurality of programming channels for which targeted asset delivery is provided and identifying (2020) a first upcoming break on the first channel and a second upcoming break on the second channel, where the first and second upcoming breaks are only partially overlapping.

In the illustrated implementation, information associated with a current status of at least one, and more preferably both, of the first and second channels is obtained (2030). This information is utilized to arbitrate (2040) between the first and second channels in order to provide targeted asset delivery for at least one of the channels. For instance, the information may include information associated with a size of a current audience for one or both of the first and second channels. It may also include audience classification information. In this regard, it may be desirable to arbitrate (2040) between the first and second channel based on audience size; that is, to provide targeted asset delivery only or mostly for the channel having a larger viewing audience. Alternatively or additionally, audience classification information for the current users of the first and/or second channels may be obtained (it will often be desired to maximize revenues and, in this regard, an asset with a smaller target audience but a higher CPM may be selected for a given spot over an asset with a larger audience but lower CPM). As a further example, alternate flotillas may be constructed for a break based on voting and then the highest revenue flotilla may be inserted. Audience classification information may be inferred, for example, from the votes of CPEs of the first and second channels in responding to recently sent asset options lists. Likewise, arbitration (2040) may be made based on a desired audience classification parameter (e.g., high income individuals) irrespective of the overall size of the viewing audiences of the first and second channels. In this regard, the channel having a greater percentage or number of users of a desired classification may be selected. For example, an asset for a certain luxury car may have more value if delivered to a small audience, provided that that audience includes more prospective buyers. In this regard it is noted that flotilla optimization may involve maximizing factors other than vote scores, e.g., asset delivery revenues. Similarly, the criteria utilized for arbitration (2040) may be selected by asset providers. Once a channel is selected based on the arbitration (2040), targeted asset delivery may be provided (2050) to the selected channel. Of course, both channels may be supported with smaller flotillas.

B. Bandwidth Optimization

Bandwidth available for transmission of asset options is generally limited. Accordingly, the asset targeting system can be enhanced by optimizing the use of each asset channel and identifying additional bandwidth for exploitation. With regard to optimizing the use of each asset channel, scheduling information such as start times and end times for breaks may be obtained for each programming channel. That is, networks may define avail windows and this information may be accessed for use by the targeted asset delivery system. This information may be utilized to determine approximately when one or more breaks will occur on a given programming channel. Accordingly, such information may be utilized for targeting and arbitration purposes. For instance, referring to FIG. 15, it will be noted that channel 1506 includes separate avail windows 1550 and 1560 that correspond to two separate breaks 1516, 1562. However, in some instances a particular channel may not provide separate avail window information for separate breaks. For instance, for channel 1502, an avail window 1570 extends over the entire length of a programming period of the channel 1502. In these cases, multiple breaks may be defined within a single window. Thus, the first break may be indicated by a first cue tone (or message) for a window, a second break may be indicated by a second cue tone within a window, etc. It will be appreciated that, if a cue tone is missed in the conventional avail window context, the assets of all subsequent breaks may be affected.

Figure 21:
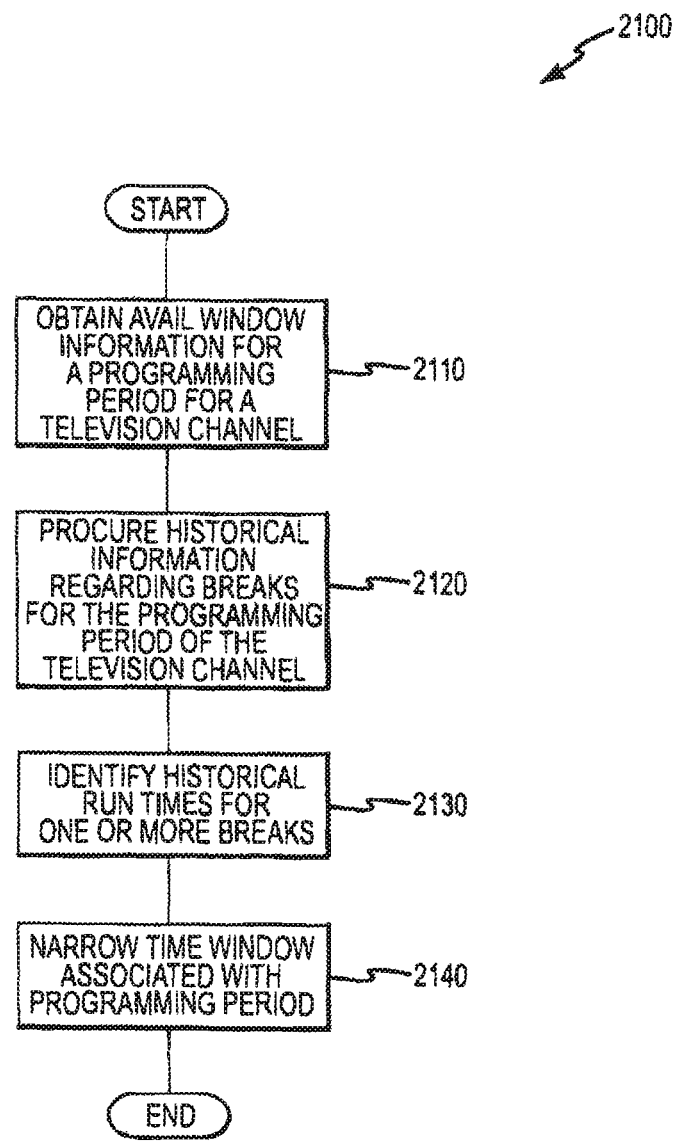
FIG. 21 illustrates a process of shortening network provided avail window information for a programming period of at least a first programming channel.

As avail window information does not correspond directly to break start and end times, information about the avail windows 1550, 1560 and 1570 may not alone allow for identifying when breaks will occur and/or if breaks on different channels will be overlapping. Accordingly, a process is provided for narrowing avail windows such that available bandwidth for targeted asset delivery may be more effectively utilized and/or allocated. Referring to FIG. 21, the process (2100) begins by obtaining (2110) network provided avail window information for a programming period of at least a first programming channel. The avail window information identifies at least a first time period during which one break occurs. More generally, avail window information may be obtained (2110) for a plurality of channels (e.g., channels 1502, 1504 and 1506). Once the network provided window information is obtained (2110), historical information associated with the programming period of the programming channel(s) is procured (2120). For example, the system, of the present invention may gather actual break times and statistically process this information. The historical information is analyzed to identify (2130) historical run times for one or more breaks of the programming period for the programming channel(s). In this regard, the system may begin with only the available window information or with baseline estimates of break times (which may be wrong). In either case, the system can then learn break times by monitoring breaks on channels of interest. The system may be seeded with some historical information.

For instance, it may be determined that for a specified 30 minute programming period of a sitcom, that a first break may start between four and six minutes after the hour or half-hour and end between six and eight minutes after the hour or half-hour. Likewise, the beginning and ending times of other breaks during the programming may be determined. Based on the historical information, the avail windows for a given channel may be narrowed (2140) to better correspond with historic break start times and end times. For instance, an average start time for a break may be at five minutes after the hour, however, the start time may vary between four and six minutes. Accordingly, the avail window start time may be set at three and a half minutes after the hour to provide a buffer period. An end time for the avail window may likewise be set to extend beyond an expected/historic end time for the break. In this regard, a single avail window (e.g., avail window 1570 of channel 1502) may be shortened to correspond more closely with a break (e.g., break 1512) and/or broken into temporally separate time periods that correspond with separate breaks. As noted above, probability functions can be generated to describe when breaks will occur, and the best allocation of available bandwidth can be based on these probabilities. In some cases, breaks will not occur when expected and, therefore, unexpected conflicts may arise. It is expected that arbitration processes can be implemented with little lead time in these cases. In any event, if asset channels are unavailable, targeted assets will still be available on the programming channel.

As will be appreciated, by narrowing the windows on two or more programming channels, it may be determined that breaks of those channels are non-overlapping. This may allow for providing targeted asset delivery using all available asset channels for both programming channels. Alternatively, it may be determined that breaks of first and second channels are partially overlapping and that arbitration between the channels is required. In any case, once the asset windows are narrowed, the system may limit monitoring for each programming channel to the narrowed avail time windows. Narrowing the avail windows improves use of the available bandwidth. In this manner, asset options can be enhanced by a process of asset bandwidth multiplexing. Thus, a given asset channel may support asset options for a first programming channel at a first time, for a second programming channel at a second time, and so on. This multiplexing is enhanced by narrowing the avail windows on a statistical basis as discussed above.

Figure 16C:
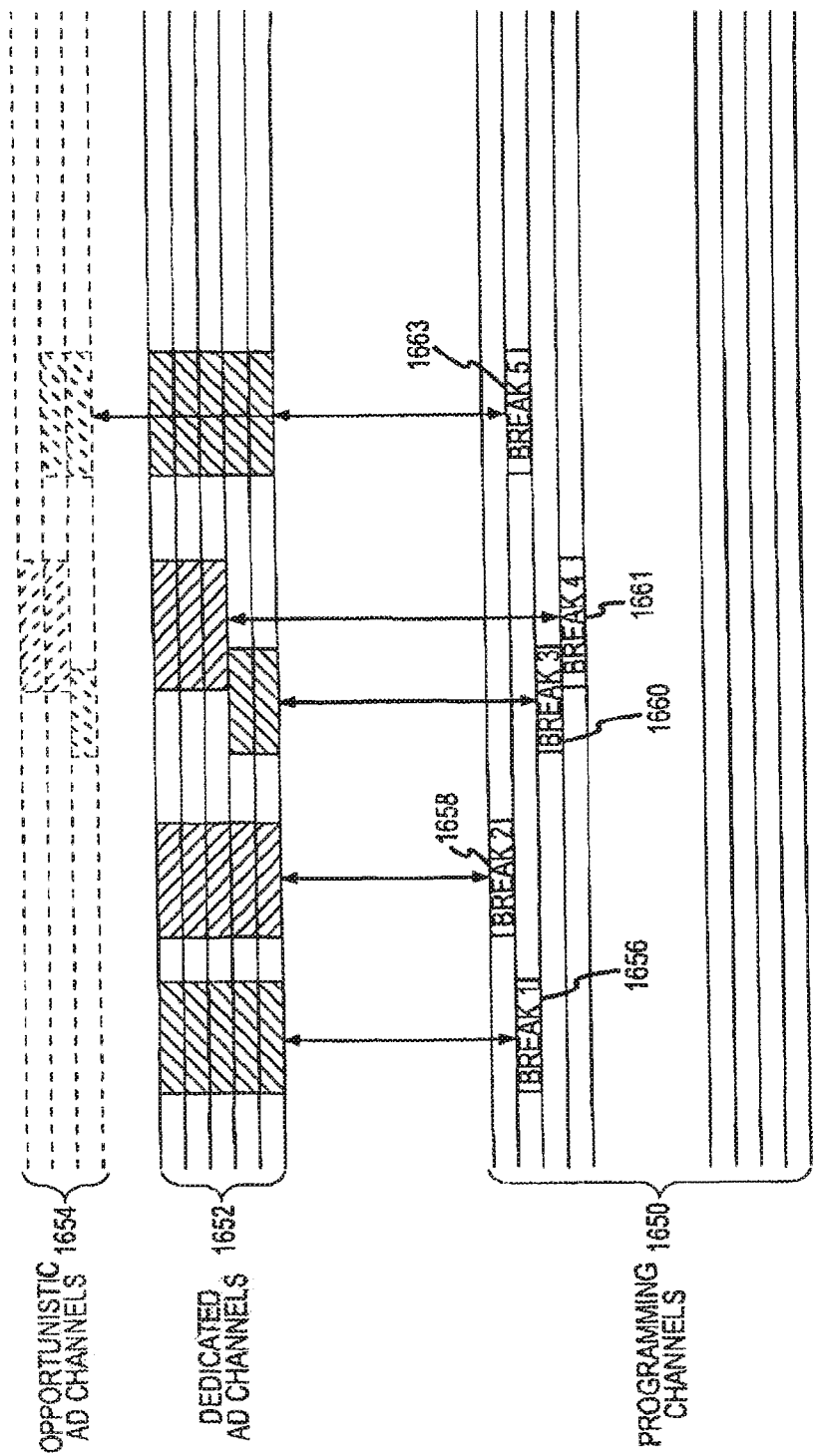
FIG. 16C illustrates improved asset options via an increase in available bandwidth

Asset options can be further improved by increasing the available bandwidth. This is illustrated in FIG. 16C. The network bandwidth includes programming channel bandwidth 1650 which may be divided into a number of programming channels, dedicated asset channel bandwidth 1652 which, as described above may include a number of channels that are dedicated to delivery of asset options, and opportunistic asset channel bandwidth 1654 which includes channels that, although not dedicated to delivering asset options, may be available for this purpose from time to time. The system of the present invention is operative to identify and exploit the opportunistic asset channels. For example, certain channels in a cable television network may be used at certain times to deliver video on demand content. When these channels are not being used to deliver video on demand content, they may be exploited by the present invention to provide additional asset options. Similarly, as discussed above, networks often include node switches that utilize available bandwidth to deliver programming channels only upon demand by users within the node area. In these cases, where the node area users have not demanded programming channels that fully utilized the available bandwidth, channels may be opportunistically available for transmission of asset options.

In FIG. 16C, the dedicated asset channel bandwidth 1652 is illustrated as including five dedicated asset channels. In addition, for the illustrated time period, the network is shown as including opportunistic asset channel bandwidth 1654 including four additional opportunistic asset channels. The illustrated breaks of 1656, 1658, 1660, 1661 and 1663 illustrate a variety of ways in which the bandwidth 1652 and 1654 may be utilized. Thus, breaks 1656 and 1658 occur at non-overlapping times. Accordingly, each break 1656 or 1658 can be supported by all of the dedicated asset channels and, in this case, do not utilize the opportunistically available asset channels 1654 (though the opportunistic asset channels may be utilized to support a broader array of targeting options). Breaks 1660 and 1661 overlap and thus present a conflict with regard to scheduling of the dedicated asset channels 1652. In the illustrated example, the dedicated asset channels are apportioned as between breaks 1660 and 1661, for example, in proportion to the size of the audience on those channels. Alternatively, the available asset options may be supplemented by using the opportunistic asset channel 1654 as indicated in phantom. Finally, for break 1663, all of the dedicated asset channels 1652 and some of the opportunistic asset channels 1654 are utilized to support an increased range of asset options in support of the break 1663.

C. Dynamic Scheduling

Figure 22:
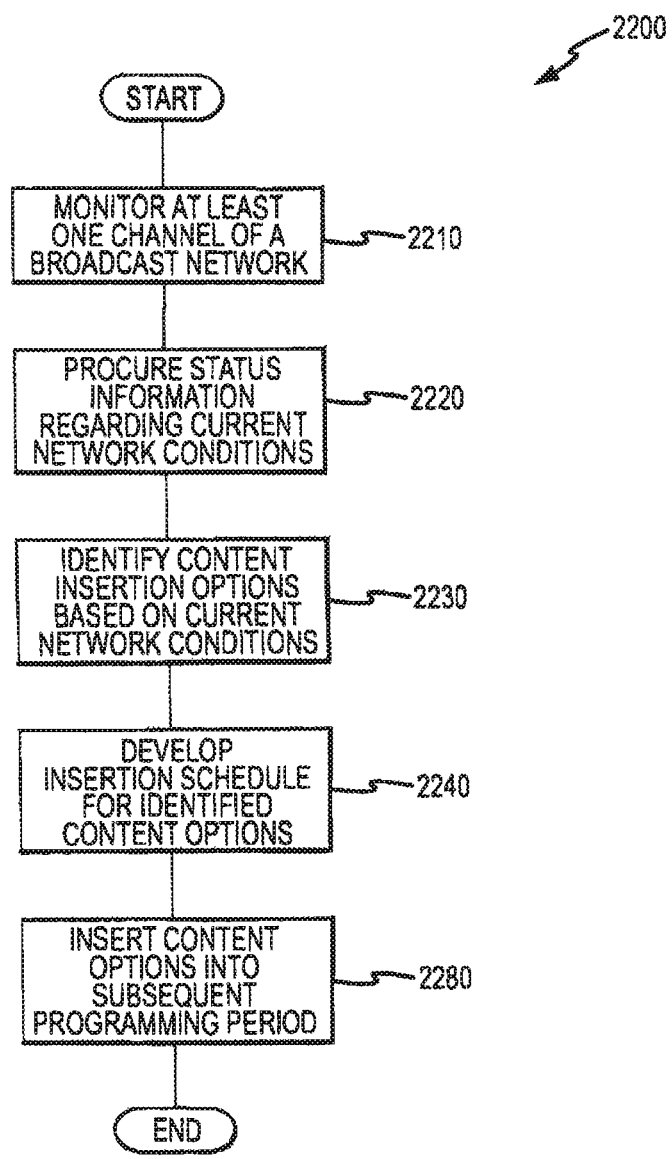
FIG. 22 illustrates a process directed to dynamic insertion of assets with respect to a break of a television programming.

As noted above, the system allows for dynamically inserting assets in support of one or more programming channels based on current network conditions. That is, assets may be selected for programming channels in view of current network conditions as opposed to being selected ahead of time based on expected network conditions. A process 2200 directed to dynamic insertion of assets with respect to a break of a television programming is illustrated in FIG. 22. As shown, the process begins by monitoring 2210 a programming channel, for example, to determine a current program or current audience size. It will be appreciated that a number of programming channels may be monitored. In any case, status information regarding a current status of at least one programming channel is procured (2220). Such procurement may include the receipt of signals from one or more CPEs (e.g., STBs) within the broadcast network. In this regard, such status information may be received in substantially real-time or at least within a time period that corresponds closely with the break for which targeted assets are provided. The status information may include, without limitation, the current programs, the size of the current audience for one or more programming channels, audience classification information regarding the audience of a current programming channel, and/or the geographic composition of an audience of a current programming channel and, of course, votes with regard to classification including geography. Such information is preferably acquired, if at all, with due care to address privacy concerns. Based on such current status information, asset insertion options may be identified (2230) for an upcoming programming period of one or more programming channels. For instance, asset options may be selected based on current network conditions. In one arrangement, an asset insertion schedule for a subsequent programming period may be developed (2240) based on the current network conditions. By way of example, an asset flotilla for a subsequent break may be populated with assets based on current network conditions. Accordingly, the selected assets may be inserted (2250) into the subsequent break.

Such a process may ensure that high value air time is populated with appropriate assets. For instance, where current network conditions may indicate that an audience is larger than expected for a current programming period, higher value assets may be utilized to populate breaks. Such conditions may exist when, for example, programming with high asset delivery value and a large expected audience extends beyond a predetermined programming period into a subsequent programming period with low asset delivery value (e.g., a sporting event goes into overtime). Previously, assets directed to the subsequent low value programming period might be aired to the larger than expected viewing audience based on their pre-scheduled delivery times resulting in reduced revenue opportunities. The present system allows for dynamic (e.g., just-in-time) asset scheduling or, at least, overriding pre-scheduled delivery based on changing network conditions.

D. Reporting

It would be possible to implement the targeted asset system of the present invention without receiving reports from CPEs indicating which assets, from among the asset options, were delivered to the user(s). That is, although there would be considerable uncertainty as to what assets were delivered to whom, assets could be priced based on what can be inferred regarding current network conditions due to the voting process. Such pricing may be improved in certain respects in relation to ratings or share-based pricing under the conventional asset delivery paradigm. Alternatively, pricing may be based entirely on demographic rating information such as Nielsen data together with a record of asset insertion to build an estimate of the number of users who received an asset. For example, this may work in connection with programming channels that have good rating information.

However, in connection with the CPE selection model of the present invention, it is desirable to obtain report information concerning actual delivery of assets. That is, because the asset selection occurs at the CPE (in either a forward-and-store or synchronized transmission architecture) improved certainty regarding the size and audience classification values for actual delivery of assets can be enhanced by way of a reporting process. As described below, the present invention provides an appropriate reporting process in this regard and provides a mechanism for using such report information to enable billing based on guaranteed delivery and/or a goodness of fit of the actual audience to the target audience. In addition to improving the quality of billing information and information available for analysis of asset effectiveness and return on investment, this reporting information provides for near real time (in some reporting implementations) audience measurement with a high degree of accuracy. In this regard, the reporting may be preferred over voting as a measurement tool because reports provide a positive, after-the-fact indication of actual audience size. Accordingly, such information may allow for improved ratings and share data. For example, such data may be licensed to networks or ratings measurement entities.

Figure 23A:
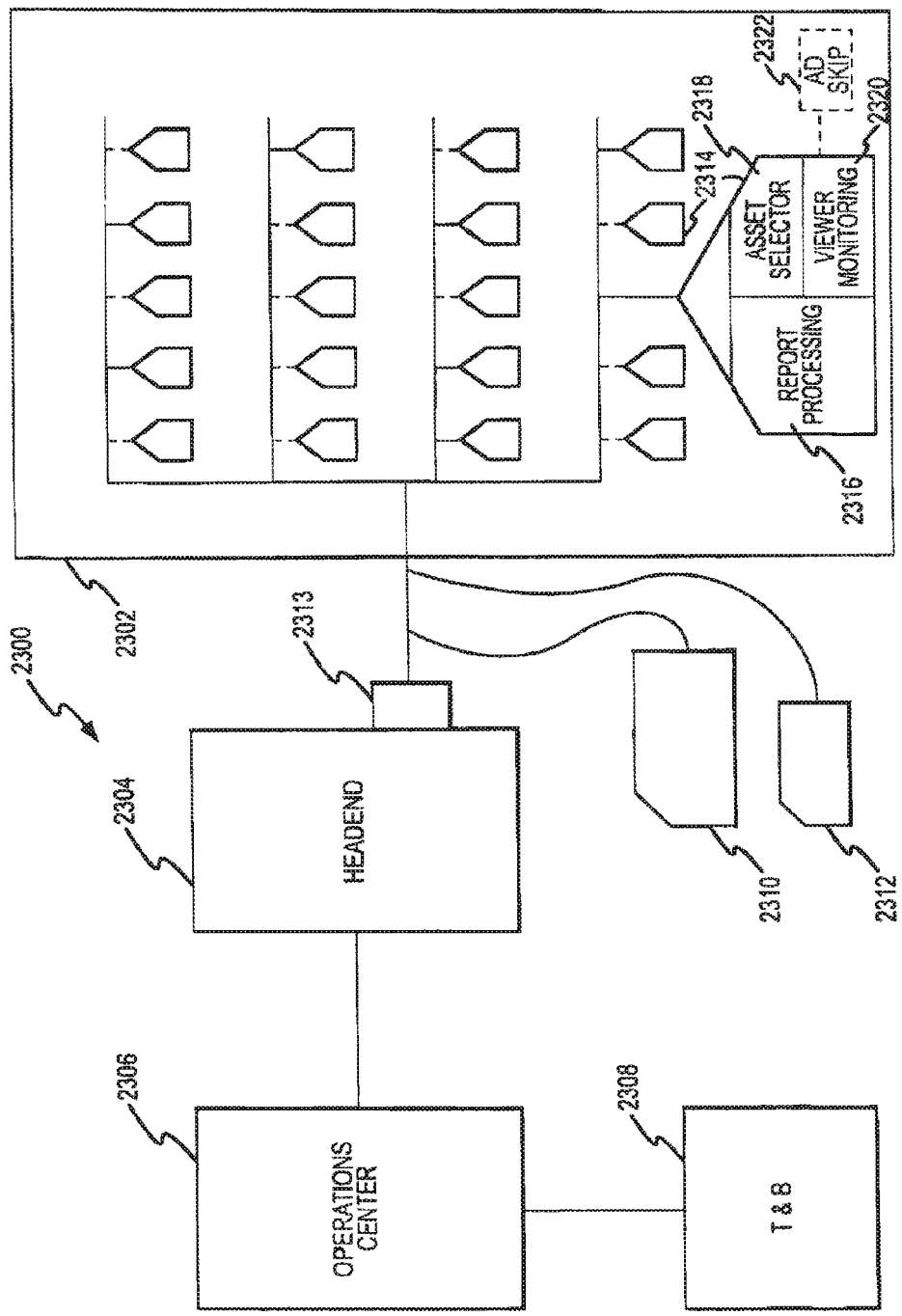
FIG. 23A illustrates a reporting system.

FIG. 23A illustrates a reporting system 2300 in accordance with the present invention. The reporting system 2300 is operative to allow at least some users of a participating user group, generally identified by reference numeral 2302, to report actual asset delivery. In the illustrated implementation, such report information is transmitted to a network platform such as a headend 2304. The report information may be further processed by an operations center 2306 and a traffic and billing system 2308.

More specifically, report information is generated by individual CPEs 2314 each of which includes a report processing module 2316, an asset selector module 2818 and a user monitoring module 2320. The user monitoring module 2320 monitors inputs from a current user and analyzes the inputs to determine putative audience classification parameter values for the user. Thus, for example, module 2320 may analyze a click stream from a remote control together with information useful for matching a pattern of that click stream to probable audience classification parameter values.

These classification parameters may then be used by the asset selector module 2318 to select an asset or asset sequence from available asset options. Thus, as described above, multiple asset sequences may be available on the programming channel and separate asset channels. Metadata disseminated with or in advance of these assets may identify a target audience for the assets in terms of audience classification parameter values. Accordingly, the module 2318 can select an asset from the available options for delivery to the user (s) by matching putative audience classification parameter values of the user to target audience classification parameter values of the asset options. Once an appropriate asset option has been identified, delivery is executed by switching to the corresponding asset channel (or remaining on the programming channel) as appropriate.

The report processing module 2316 is operative to report to the headend 23104 information regarding assets actually delivered and in some implementations, certain audience classification parameter values of the user (s) to whom the asset was delivered. Accordingly, in such implementations, the report processing module 2316 receives asset delivery information from module 2318 and putative audience classification parameter information for the user (s) from the user monitoring module 2320. This information is used to populate various fields of a report file. In other implementations, audience classification information is not included in the report. However, it may be presumed that the asset was delivered to a user or users matching the target parameters. Moreover, such a presumption may be supported by a goodness of fit parameter included in the report. Thus, audience classification information may be inferred even where the report is devoid of sensitive information.

In a preferred implementation of the present invention, the reporting system 2300 may operate in a standard mode or an exposed mode. In the standard mode, the transmitted report file 2312 is substantially free of any sensitive information. Thus, for example, the file 2312 may identify the assets actually delivered, on what channel and, optionally, goodness of fit measures as described above. The file 2312 may also include an identification code for the user at least in its header field. This identification code and any other information that may be deemed sensitive from a privacy perspective may be deleted or hashed as an early step in report processing. In the illustrated implementation, a sanitizing module 2313 deletes or hashes such information before further processing at the headend 2304. Additionally, in the standard mode, the report information may be anonymized and aggregated by module 2313 prior to further processing, for example, for purposes of publishing audience size and demographics or estimating the target universe for future broadcasts.

In the exposed mode, a report file 2310 may include more information including sensitive information. For example, information such as name, age, gender, income and the like for a user may be included in the file 2310. In this regard, various levels of exposed mode may be defined corresponding to various levels of allowed potentially sensitive information. This information may be useful, for example, for comparison with estimated values to monitor system performance and to diagnose errors. This information also allows for demonstration that targeting works. It will be appreciated that operation in the exposed mode may be limited to a small number of users who have consented to inclusion of potentially sensitive information in report files. In this regard, there may be individual control of participation in exposed mode operation (and at what level of exposed mode) at the CPE level.

The report files pass through the headend 2304 and are processed by an operations center 2306. The operations center 2306 is operative to perform a number of functions including processing report information for submission to billing and diagnostic functions as noted above. The operations center 2306 then forwards the processed report information to the traffic and billing system 2308. The traffic and billing system 2308 uses the processed report information to provide measurement information to asset providers with respect to delivered assets, to assign appropriate billing values for delivered assets, and to estimate the target universe in connection with developing new asset delivery contracts.

In order to reduce the bandwidth requirements associated with reporting, a statistical reporting process may be implemented similar to the statistical voting process described above. In particular, rather than having all CPEs report delivery with respect to all breaks, it may be desirable to obtain reports from a statistical sampling of the audience 2302. For example, the CPE of each user may include a random number generator to generate a number in connection with each reporting opportunity. Associated logic may be configured such that the CPE will only transmit a report file when certain numbers are generated, e.g., numbers ending with the digit "5". Alternatively, the CPE may generate reports only upon interrogation by the headend 2304 or the headend 2304 may be configured to interrogate only a sampling of the audience 2302. Such statistical reporting is graphically depicted in FIG. 23 where users selected to report with respect to a given reporting opportunity are associated with solid line links and deselected users are associated with a broken line links. Moreover, reporting may be batched such that all reports for a time period, e.g., 24 hours or seven days, may be collected in a single report transmission. Such transmissions may be timed, for example, to coincide with low messaging traffic time periods of the network. Also, the reports from different CPE's may be spread over time as described below.

The reporting system 2300 may optionally be configured to implement asset skip functionality. In certain cases, it may be possible for users to skip assets as by fast forwarding through the asset delivery time period. In these cases, the asset provider suffers a diminution of return on its investment. Specifically, as noted above, a programming asset is provided at considerable cost. In the case of asset supported networks, this cost is subsidized in whole or in part by asset delivery revenues. That is, asset providers pay for the opportunity to deliver commercial impressions to users. In the context of the system of the present invention, the cost of these assets can be readily translated into a cost per consumer per asset. That is, because the number of targeted impressions is known from the reporting information, and the cost per asset is known from the contact information, a cost per user per asset can be directly calculated. When a user skips an asset, the value to the asset provider is diminished by this amount.

In the illustrated system 2300, asset skipping events can be detected and this information can be reported. The injured asset provider can then be compensated for this diminution in value and/or the user can be billed to compensate for such asset skipping. For example, in the latter regard, programming assets can be delivered at a discount to users who agree to accept delivery of assets. In VOD or DVR contexts, other users can skip those assets. This facilitates asset delivery support in certain contexts that have previously been limited, as a practical matter, to pay-per-view. For example, movies or near-term (e.g., next day) re-runs of network programming provided via a forward-and-store architecture may be asset supported as asset providers will have reasonable assurance that their assets have been delivered.

Figure 23B:
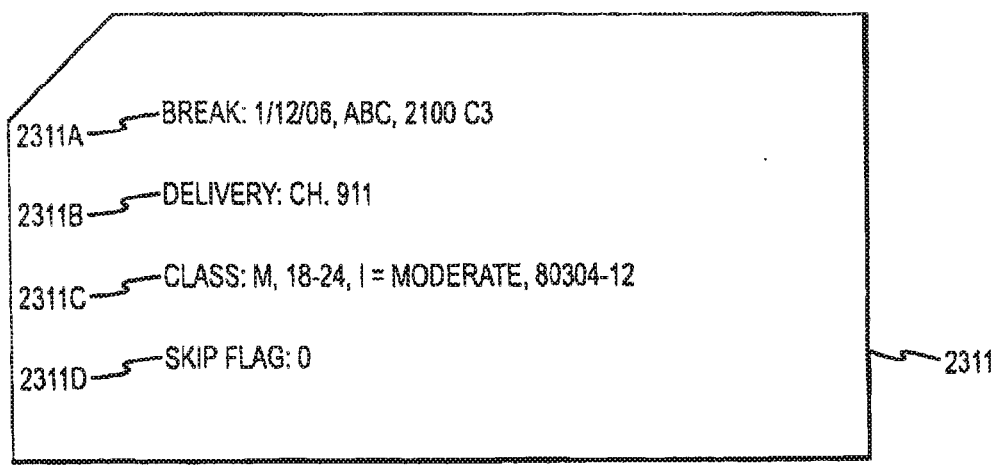
FIG. 23B illustrates information that may be included in a report file.

In this regard, the illustrated system 2300 optionally includes an asset skip module 2322. The asset skip module 2322 is operative to identify asset skip events (fill or partial) and to report this information to the network. For example, asset skip events may be identified based on monitoring a click stream from a remote control or otherwise monitoring the video stream delivered to the user. As shown in FIG. 23B, appropriate information may be included in this regard in a report file 2311. For purposes of illustration, the file 2311 includes four types of report information 2311A-D. 2311A identifies the break or spot at issue. Field 2311B indicates the asset Option that was selected by the CPE. For example, the selected asset may be identified by reference to an associated asset channel. This information is useful to identify the injured asset provider so that the asset provider may optionally be compensated for the asset skip. Field 2311C identifies certain audience classification parameter values for the user, which may be included, for example, in exposed mode operation. Finally, field 2311D includes a skip flag to indicate whether or not the asset was skipped. This field 2311D allows for compensating asset providers and appropriately billing users in relation to asset skipping.

Figure 24:
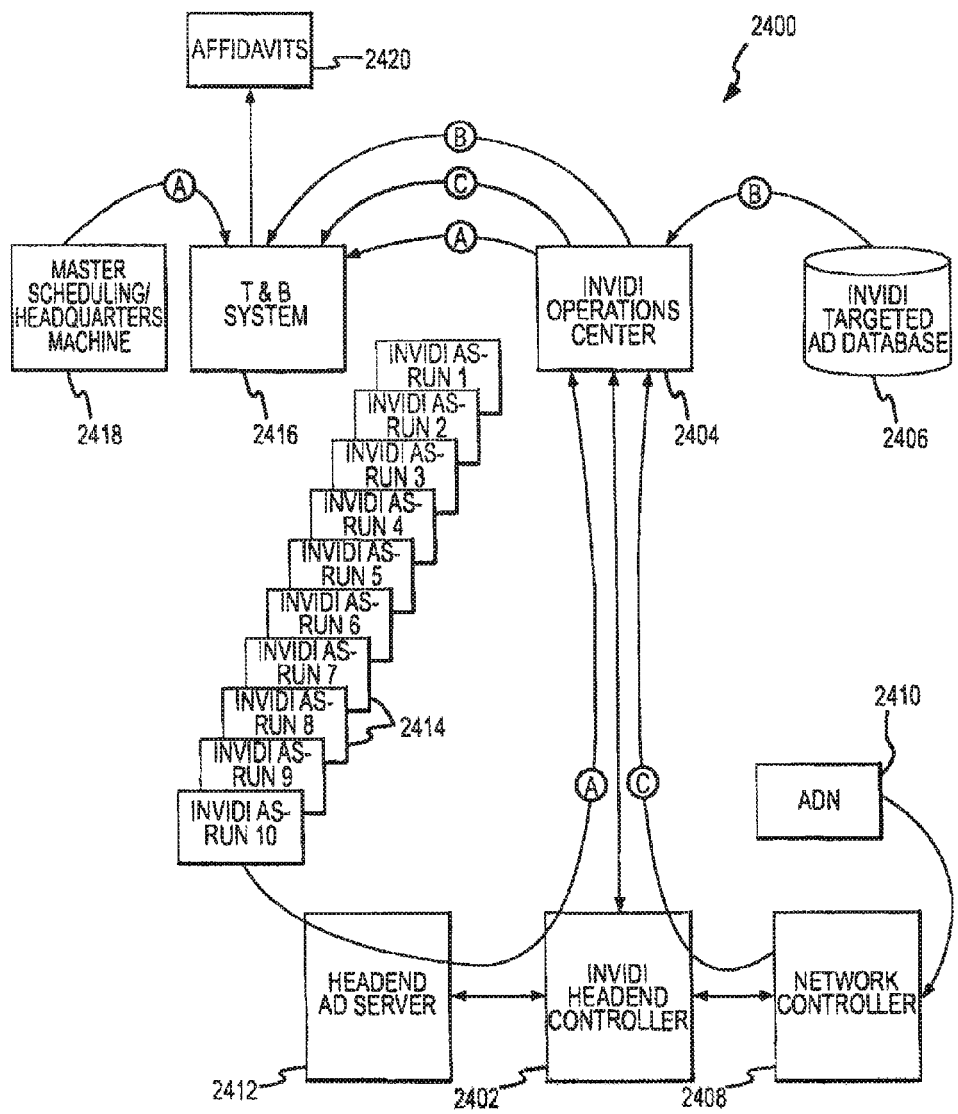
FIG. 24 illustrates various network components of a reporting system and their connections to other functional components of the overall targeted billing system.

FIG. 24 illustrates the various network components of a reporting system 2400, as well as their connection to other functional components of the overall targeted billing system. The illustrated system includes a headend controller 2402, an operations center 2404 and a T&B system 2416. In conventional networks without targeted asset delivery, the traffic and billing system generally serves a number of functions. Among these, a trafficking function involves order entry and assigning assets to spots. In this regard, an asset delivery schedule is built such that the headend knows to insert a particular asset upon receiving an identified cue. Another function relates to billing. When the headend inserts an asset, it generates an as run log. These as run logs are used by the traffic and billing system to generate affidavits verifying delivery of the assets for purposes of billing. In the case of conventional networks, this is a straightforward process because the headend knows what was inserted and therefore what was delivered. Moreover, conventional networks do not directly measure delivery.

In the case of a targeted asset delivery system in accordance with the present invention, this is somewhat more complicated. Order entry involves audience aggregation, spot optimization and other concepts as described herein. An interface for facilitating this process is described in detail below. With regard to billing, it is desired to provide the T&B system 2416 with information analogous to the conventional as run logs (plus report information), but delivery information originates from the CPEs. Moreover, knowledge of what asset was delivered in connection with what programming channel generally requires: 1) a report from the CPE indicating what asset channel was employed for what spot; 2) what asset was inserted on that asset channel for that spot; and 3) what programming channel that asset channel was associated with for that spot.

The illustrated headend controller 2402 generates as-run logs 2414 for all asset channels identifying the targeted assets that have been transmitted via the asset channels. Thus, in step A of the illustrated system 2400, the as-run logs 2414 from the headend controller 2402 are processed by the operations center 2404. This processing provides a network based accounting for use by the T&B system 2416 of all targeted assets that were inserted by the asset server 2412 on the asset channels in step B, virtual channels are correlated to programming channels based on information from the targeted asset database 2406. In step C of the illustrated system 2400, report information is processed. Specifically, an Asset Delivery Notification (ADN) 2410 including report information is obtained in connection with each asset delivery by the CPEs or a representative sampling thereof. This information identifies at least the spot or break and the asset or asset channel selected. As noted above, all digital set top boxes can be configured to either return or not return ADNs.

The as run logs 2414 together with the ADNs 2410 and targeted asset database information provide a clear picture of what targeted assets were played with respect to each programming channel and how many digital set top boxes actually delivered the assets. This information can be used to generate affidavits 2420 verifying actual asset delivery. As discussed in more detail below, this enables a new asset delivery paradigm involving a guaranteed delivery of targeted impressions.

Figure 25:
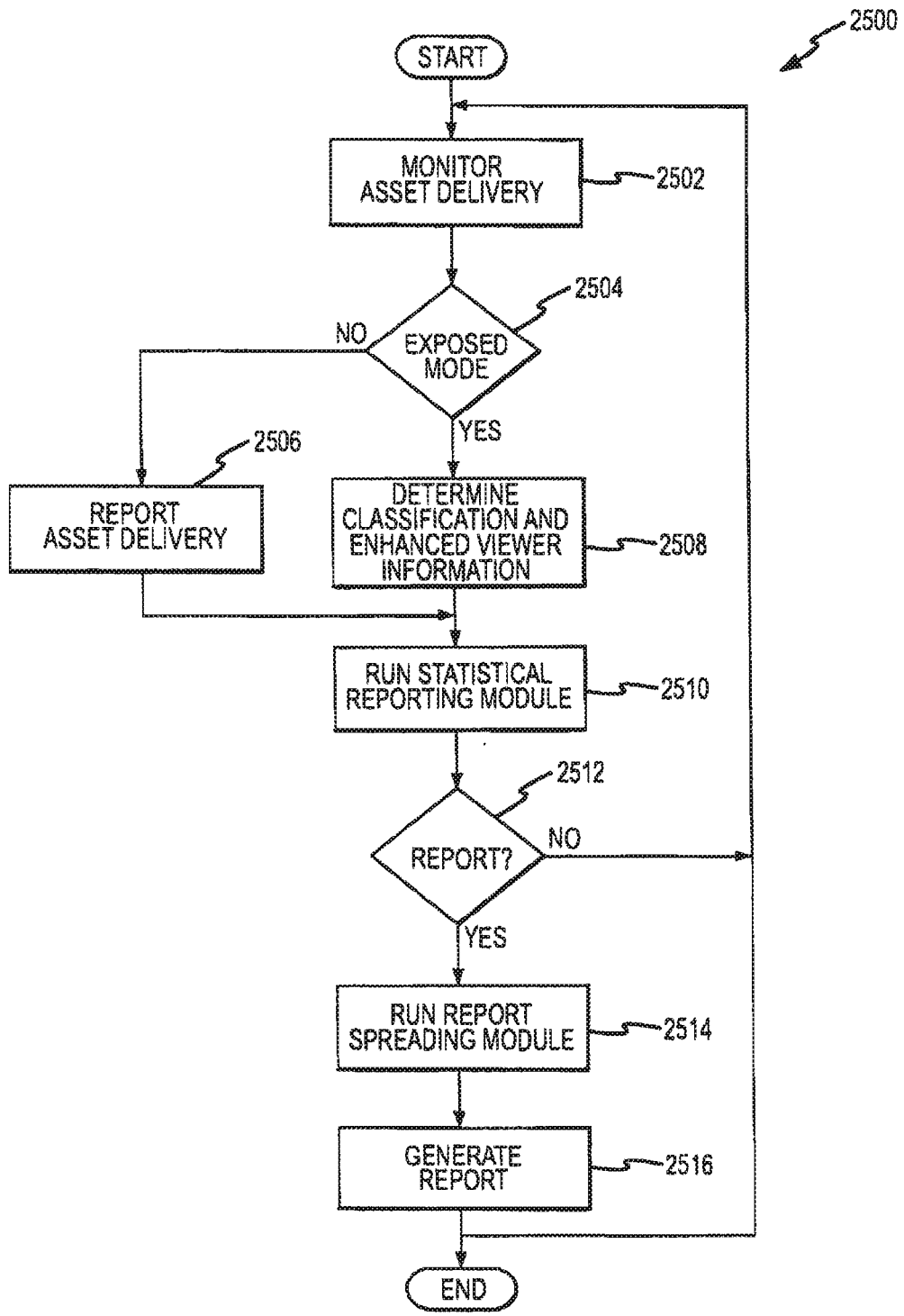
FIG. 25 illustrates a customer premises side process for implementing reporting functionality.

FIG. 25 generally illustrates a customer premises side process 2500 for implementing the reporting functionality. The illustrated process 2500 is initiated by monitoring (2502) asset delivery. That is, the CPE monitors the channels selected in connection with a given break for purposes of reporting asset delivery. A determination is then made (2504) as to whether the CPE will operate in the standard mode or the exposed mode and, in the latter case, what level of exposed mode, e.g., fully exposed or partially exposed. As noted above, exposed mode operation will generally be limited to users who have specifically assented to such operation. For operation in the standard mode, the CPE reports (2506) asset delivery and, perhaps, a goodness of fit measure free from any sensitive information. In the exposed mode, the CPE determines (2508) a greater level of information for reporting to the network. Such information may include sensitive information regarding the user. In either case, the CPE may run (2510) a statistical reporting module so as to make a determination (2512) as to whether to generate a report. Such statistical reporting reduces the bandwidth requirements associated with reporting. If no report is to be generated, the system returns to monitoring (2502) asset delivery.

On the other hand, where a report is to be delivered, a report spreading module may be run (2514). The report spreading module is operative to insure that reports from all reporting CPE are not generated at the same time. Thus, for example, the report spreading module may determine a particular time delay in connection with reporting delivery for a particular break. This time delay may be predefined and may be different for different CPEs. Alternatively, the delay may be variable and may be determined, for example, based on the output of a random member generator. As a still further alternative, reports may be stored up for delivery at a time of day (e.g., during the night) when bandwidth is expected to be more available. In that case, different CPEs may still report at different times. Reports may be stored for a longer period prior to transmission. Reports are then generated (2516) and transmitted as determined by the report spreading module. The system then continues monitoring (2502) asset delivery.

Figure 26:
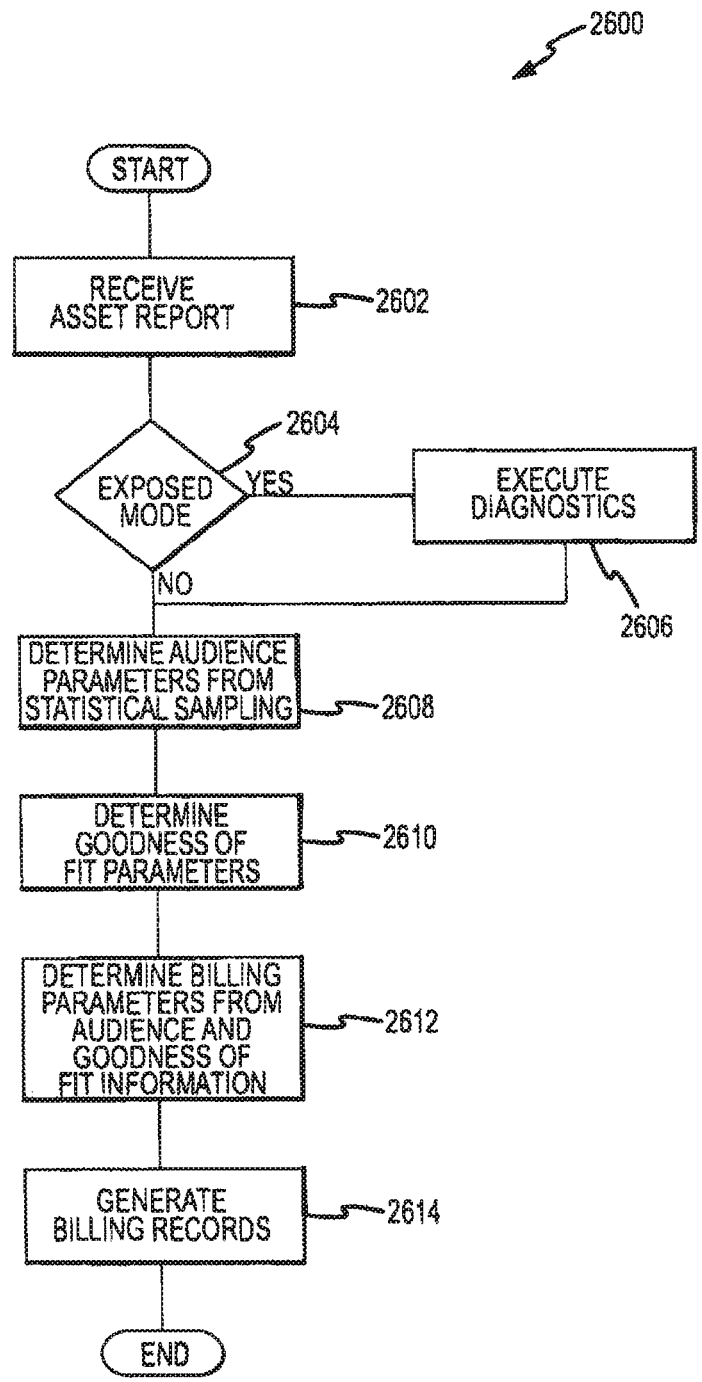
FIG. 26 illustrates a network side process in connection with the reporting functionality.

FIG. 26 illustrates a network side process 2600 in connection with the reporting functionality. The illustrated process 2600 is initiated by receiving (2602) asset reports indicating actual asset delivery. As noted above, the reports may include an identification code and other information deemed sensitive from a privacy perspective. Such information may be deleted or hashed as an early step in report processing. In addition, a determination is made (2604) whether the reports reflect standard mode or exposed mode operation. For example, a field may be included in the reports to identify exposed mode or standard mode operation, or the content of the various reporting fields may be analyzed to determine whether they reflect standard mode or exposed mode operation. In the case of standard mode reports, the report information may be anonymized and aggregated prior to further processing. Exposed mode reports may be used to execute (2606) certain diagnostics. For example, actual user identification information included in the exposed mode report may be compared to putative audience classification parameter values (indicated by asset selection) to examine the accuracy of the user identification logic. Alternatively, in the exposed mode, the report may simply include an identifier that can be used to access information regarding a user or household stored at the headend in the case of statistical reporting, both the standard mode and the exposed mode records may be used to determine (2608) audience parameters. As discussed above, in order to reduce bandwidth requirements associated with reporting, less than all CPEs, for example, a statistical sampling thereof, may provide reports. Accordingly, a statistical model may be used to determine the audience size and the size of various audience segments based on the report data.

Billing parameters and goodness of fit information may then be determined (2612) based on the report information. The billing parameters will generally include information regarding the size of the audience to whom an asset was delivered. The goodness of fit information relates to how well the actual audience matched the target audience of the asset provider. In this regard, a premium may be extracted where the fit is good or a discount or credit may be applied, or over delivery may be provided where the fit was not as good. Based on this information, the T&B system can then generate billing records (2614). It will be appreciated that such billing reflects guaranteed delivery of targeted impressions with compensation for less than optimal delivery.

As noted above, a platform and associated graphical user interface may be provided for receiving asset contract information. As will be described in more detail below, asset providers can use this interface to specify, targeting information such as geographic information, demographic information, run-time information, run frequency information, run sequence information and other information that defines asset delivery constraints. Similarly, constraint information may be provided from other sources. This contract information may also include certain pricing information including pricing parameters related to goodness of fit. Moreover, in accordance with the present invention, report information can be utilized as described above for purposes of traffic and billing. All of this requires a degree of integration between the T&B system, which may be a conventional product developed in the context of the conventional asset delivery paradigm, and the targeted asset delivery system of the present invention, which allows for implementation of a novel asset delivery paradigm.

Among other things, this integration requires appropriate configuration of the T&B system, appropriate configuration of the targeted asset delivery system, and a definition of an appropriate messaging protocol and messaging fields for transfer of information between the T&B system and the targeted asset delivery system. With respect to the T&B system, the system may be configured to recognize new fields of traffic and billing data related to targeted asset delivery. These fields may be associated with: the use of reporting data, as contrasted to ratings or share data, to determine billing values; the use of goodness of fit parameters to determine billing parameters; and the use of report information in estimating the target universe for subsequent broadcasts. Accordingly, the T&B system is configured to recognize a variety of fields in this regard and execute associated logic for calculating billing parameters in accordance with asset delivery contracts.

The targeted asset system receives a variety of asset contract information via a defined graphical user interface. This asset contract information may set various constraints related to the target audience, goodness of fit parameters and the like. In addition, the graphical user interface may be operative to project, in substantially real time, an estimated target universe associated with the defined contract parameters. Consequently, integration of the targeted asset delivery system with the T&B system may involve configuring the targeted asset delivery system such that inputs entered via the graphical user interface are mapped to the appropriate fields recognized by the targeted asset delivery system. In addition, such integration may involve recognizing report information forwarded from the targeted asset delivery system for use in estimating the target universe. Generally, the T & B system is modified to included logic in this regard for using the information from the targeted asset delivery system to project a target universe as a function of various contract information entered by the asset provider via graphical user interface.

In addition, the interface between the targeted asset system and the T&B system may be expanded in relation to conventional interfaces to accommodate the targeted asset delivery functionality as set forth above. That is, because billing is based on a targeted impressions, additional asset delivery report information is required by the T&B system to compute billing parameters. Similarly, information from the targeted asset system is required to inform the T&B system in estimating a target universe. Moreover, contract information defining targeting constraints is passed from the T&B system to the targeted asset system. Accordingly, a variety of fields are defined for transmission between the systems as described above. These fields are accommodated by expanding the messaging interface between the systems. In addition, an appropriate messaging protocol is defined for accommodating this expanded messaging asset.

Figure 27:
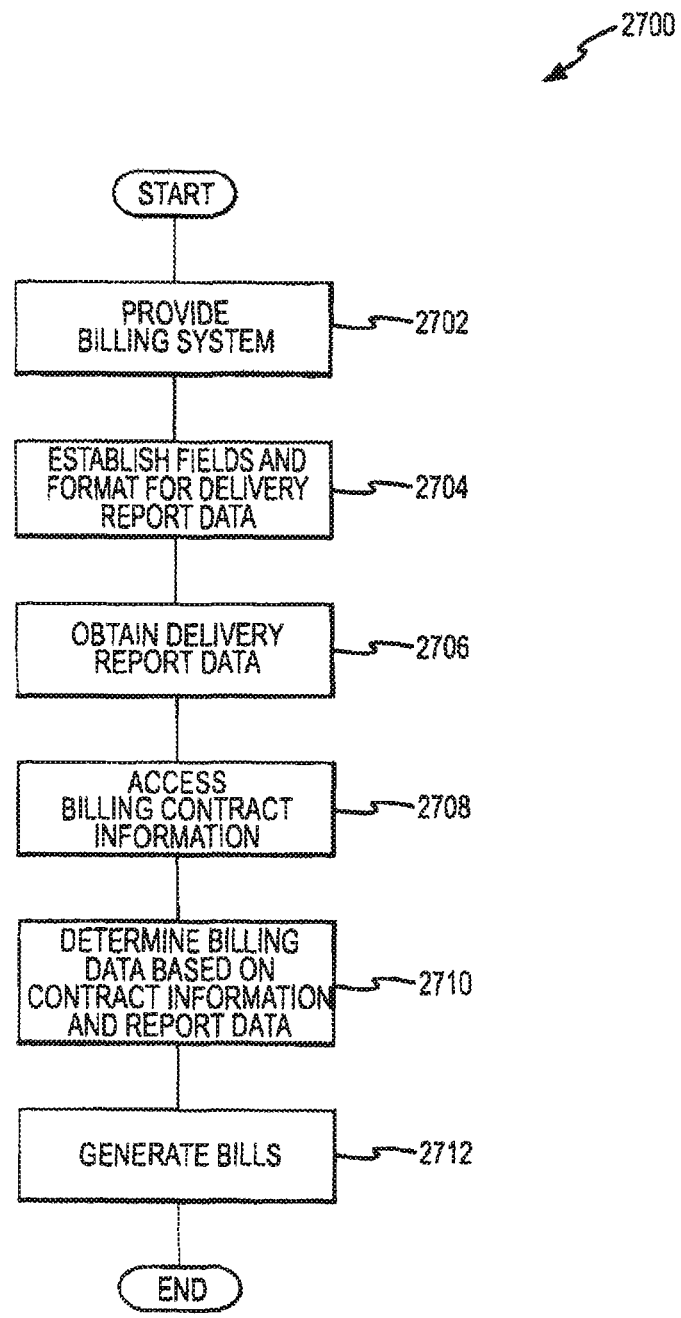
FIG. 27 illustrates a process for interfacing a targeted asset system with a T&B system.

FIG. 27 illustrates a process 2700 for interfacing the systems in this regard. The illustrated process 2700 is initiated by providing (2702) a T&B system. As noted above, the starting point for providing the T&B system may involve using a conventional T&B system developed in the context of the conventional time-slot buy asset delivery paradigm. Fields and a format for receipt of report data may then be established (2704) and integrated into the T&B system. In addition, certain fields and formats may be provided for exporting information from the T&B system to the targeted asset delivery system, for example, for use in targeting assets. In operation, contract information including targeting constraints for particular assets is exported (2705) from the T&B system to the targeted asset delivery system. Assets are delivered in accordance with the constraints as described above. Delivery report data is then obtained (2706) by the T&B system. This report data may be transmitted from CPEs and processed by an operations center prior to delivery to the T&B system as described above. In addition, the T&B system accesses (2708) contract information relating to a relevant asset delivery contract. This information may specify certain billing parameters as a function of audience size and goodness of fit information. The T&B system is then operative to determine (2710) billing data based on the contract information and the report data and to generate (2712) appropriate bills.

An overview of the system has thus been provided to assist in understanding the location targeting functionality set forth below. Additional details of the system are set forth in U.S. patent application Ser. No. 11/331,835, entitled "Targeted Impression Model for Broadcast Network Asset Delivery," which is incorporated herein by reference.

IV. Location Targeting

As referenced above, assets may be advantageously targeted to specific locations, so users in those locations may receive assets specifically meant to be received and consumed in those locations. In the past, node level switching was available to direct assets such as ads or other programming to particular nodes in the cable network. Node level switching is an example of geographical targeting based on network topology because the placement of nodes in a network is part of the topology of that network. Switching at the node or headend is useful for coarse geographical targeting or targeting a geographical region that corresponds with an area covered by a particular network element such as a node or a headend. In addition, multiple nodes may accept a particular asset so combinations of network topology defined areas may be targeted as well Such targeting may be based on location alone or in combination with other classification parameters as discussed above.

However, in accordance with the present invention, location targeting can be implemented independent of network topology, for example, using user equipment device selection, delivery and reporting processes as discussed above. By way of overview, location targeting is accomplished by using location criteria for an asset like other targeting criteria discussed above. That is, an asset provider specifies a target location zone using a targeting interface just as the asset provider would specify a target demographic group or the like. Based on these targeting criteria, including the location criteria, an asset list may be distributed to some or all CPEs, which, in turn, submit votes. Based on the votes, flotillas of assets may be constructed and inserted into available bandwidth (e.g., asset channels and/or the current programming channel), and the location of such assets may be identified by metadata transmissions. Individual CPEs can then deliver appropriate assets (e.g., based on targeting criteria, including location criteria) and some or all of the CPEs may generate reports regarding assets actually delivered as described above.

It will be appreciated that variations of this process may be used, especially in the case of location targeting. For example, in some cases, location may be the only criterion used for targeting. This may occur, for example, in a spot optimization context, where an advertiser purchases a spot but wishes to deliver location-specific ads, or location-specific tags associated with an ad for general distribution, to provide information (e.g., contact information or promotional information)

for a local retail outlet. Location targeting is not limited to specifications provided by advertisers. For example, a network operator may wish to target its subscribers on a location dependent basis. This may be done, for example, to target specific promotions to areas where competing service providers have begun offering services or are otherwise targeting the network operation subscriber base. In such cases, voting and reporting may be deemed unessential and may be skipped or ignored. Rather, the localized asset or tag may simply be distributed with metadata so as to enable CPEs to select the appropriate content.

In the case of localized tags associated with general distribution ads, an asset provider may or may not desire to designate location as a voting parameter. For example, in the case of fine location targeting, voting based on location criteria might result in low vote totals for any localized asset or tag, even though the content might otherwise be well matched to a large portion of the potential audience. This may be addressed in a number of ways. For example, the asset provider may omit the location criteria as a voting criteria (e.g., the location criteria may be included only as delivery criteria in the case of available bandwidth to submit multiple or all localized assets or tags), or the location criteria may be designated as secondary criteria (to be used only when there is bandwidth available for multiple localized assets). Alternatively, the location criteria may be used as delivery criteria only in a hybrid synchronous/forward-and-store system. For example, tags associated with a general distribution may be disseminated with location metadata prior to a spot and stored by appropriate CPEs. The general distribution ad may then be voted on as described above. If the general distribution ad is disseminated, it may be selected by the CPE for delivery and the tag may be delivered with the ad.

In any event, the location targeting functionality described below involves allowing asset providers or other parties to specify location criteria, allowing CPEs to know their own positions, and allowing CPEs to compare their positions to the location criteria. Each of these is addressed in turn below.

A. Specifying Target Location Criteria

Specifying target location criteria may be accomplished via the same interface system used to specify other criteria. This interface system is generally described below, followed by a discussion of the specific location functionality.

Figure 28A:
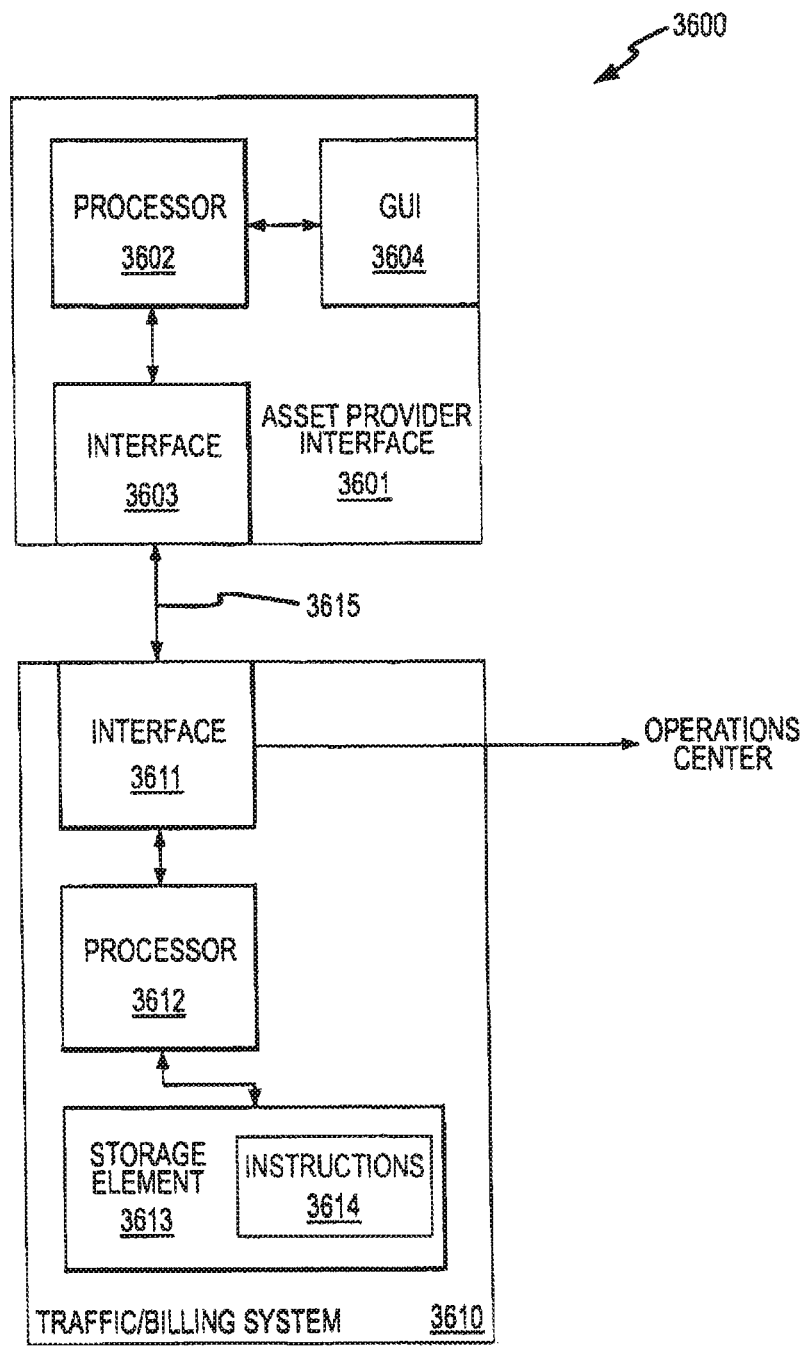
FIG. 28A is a block diagram of an exemplary targeted content interface system.

FIG. 28A is a block diagram of exemplary targeted content interface configuration 3600. Targeted content interface configuration 3600 may be used to interface with an asset provider, such as an advertiser. Targeted content interface configuration 3600 may provide the advertiser with an interface to a system that targets content for broadcast networks, such as the system described above. In this regard, advertiser interface 3601 may include processor 3602 that provides graphical user interface ("GUI") 3604 to an advertiser. For example, processor 3602 may be a general-purpose computer configured with a monitor to display GUI 3604. GUI 3604 may provide information to the advertiser with respect to generating an ad campaign (e.g., a television commercial campaign). Examples of such information may include demographics, monetary budget, desired time, and/or broadcast network program.

Additionally, GUI 3604 may receive information from the advertiser pertaining to desired/selected ad campaigns. For example, an information content provider may choose to display certain ads to a particular viewing audience at a given time of day. The advertiser may also wish to enter a maximum budget and/or a cost per ad impression (i.e., delivered ad, although typically measured in cost per thousand, or "CPM"). Generally, the cost associated with the ad may be set by the MSO after negotiation. The advertiser may enter this information into GUI 3604 such that processor 3602 may, among other things, transfer the information to traffic/billing system 3610 via interface 3603.

Interface 3603 may be configured for providing communications between advertiser interface 3601 and traffic/billing system 3610. For example, interface 3603 may communicatively couple to interface 3611 of traffic/billing system 3610 via communication link 3615. Communication link 3615 may be an Internet link as is used to transport communications via Internet protocol (e.g., TCP/IP). As such, GUI 3604 may be configured as an applet that operates within a Web browser, such as Microsoft's Internet Explorer. In such an embodiment, GUI 3604 may download information from traffic/billing system 3610 that enables an advertiser to manage an ad campaign.

The invention, however, is not intended to be limited to a particular type of communications between the advertiser and traffic/billing system 3610. For example, communication link 3615 may be a server connection and/or a virtual private network connection. In such an embodiment, GUI 3604 may be associated with a customized software application that allows communications between the advertiser and traffic/billing system 3610. The software application may be controlled by instructions 3614 stored with storage element 3613 of traffic/billing system 3610. For example, instructions 3614 may direct processor 3612 to deliver an application to advertiser interface 3601 such that GUI 3604 is displayed therewith.

Processor 3612 may also be configured for controlling billing operations for an advertiser. For example, processor 3612 may communicate with an operations center. The operations center may convey information pertaining to delivered ads of a particular campaign that the advertiser has entered with traffic/billing system 3610 (i.e., via GUI 3604). Based on this information of content segment traffic, processor 3612 may generate costs associated with delivered ads (e.g., impressions). As such, a bill may be generated for the advertiser and delivered to the provider via communication link 3615 or other means, such as traditional mailing, email and/or withdrawal from a deposit account. Preferably, however, billing is performed by the MSO. In that regard, processor 3612 may present the information to the MSO such that a bill may be generated for the advertiser.

In the context of location targeting, billing boundaries may be considered in relation to specified location zones for ad (or other asset) targeting. The traffic/billing system 3610 generally covers a defined geographic area. This area may include a number of Designated Market Areas (DMAs) used for audience measurement and other purposes and may define a complex shape, e.g., including discontiguous segments. That is, the system 3610 typically will generate bills for advertisers based on dissemination of ads for the defined geographic area. If the advertiser wishes to disseminate an ad on a broader basis, this can be accomplished by establishing multiple contracts with multiple systems that generate multiple bills. In some cases, an advertiser may wish to target ads to a zone that extends across a traffic/billing system boundary. This can be accommodated in a number of ways. For example, the location targeting logic may be implemented such that an advertiser cannot define a zone that extends across a traffic/billing system boundary. Consequently, an advertiser desiring to define a zone extending across such a boundary can establish multiple contracts with multiple systems, each of which includes location targeting information defining a portion of the desired targeting zone.

Alternatively, the location targeting logic can allow an advertiser to define a targeting zone extending across a traffic/billing system boundary. In such a case, the logic could cause multiple bills to be generated corresponding to the multiple traffic/billing systems implicated. As a further alternative, the location targeting logic could cause a single bill to be generated in such cases for the advertiser's convenience. In this regard, separate network operators associated with the separate traffic/billing systems may settle accounts in relation to such billings. It will be appreciated that an interface between the separate traffic/billing systems may be defined to accommodate such functionality.

Figure 28B:
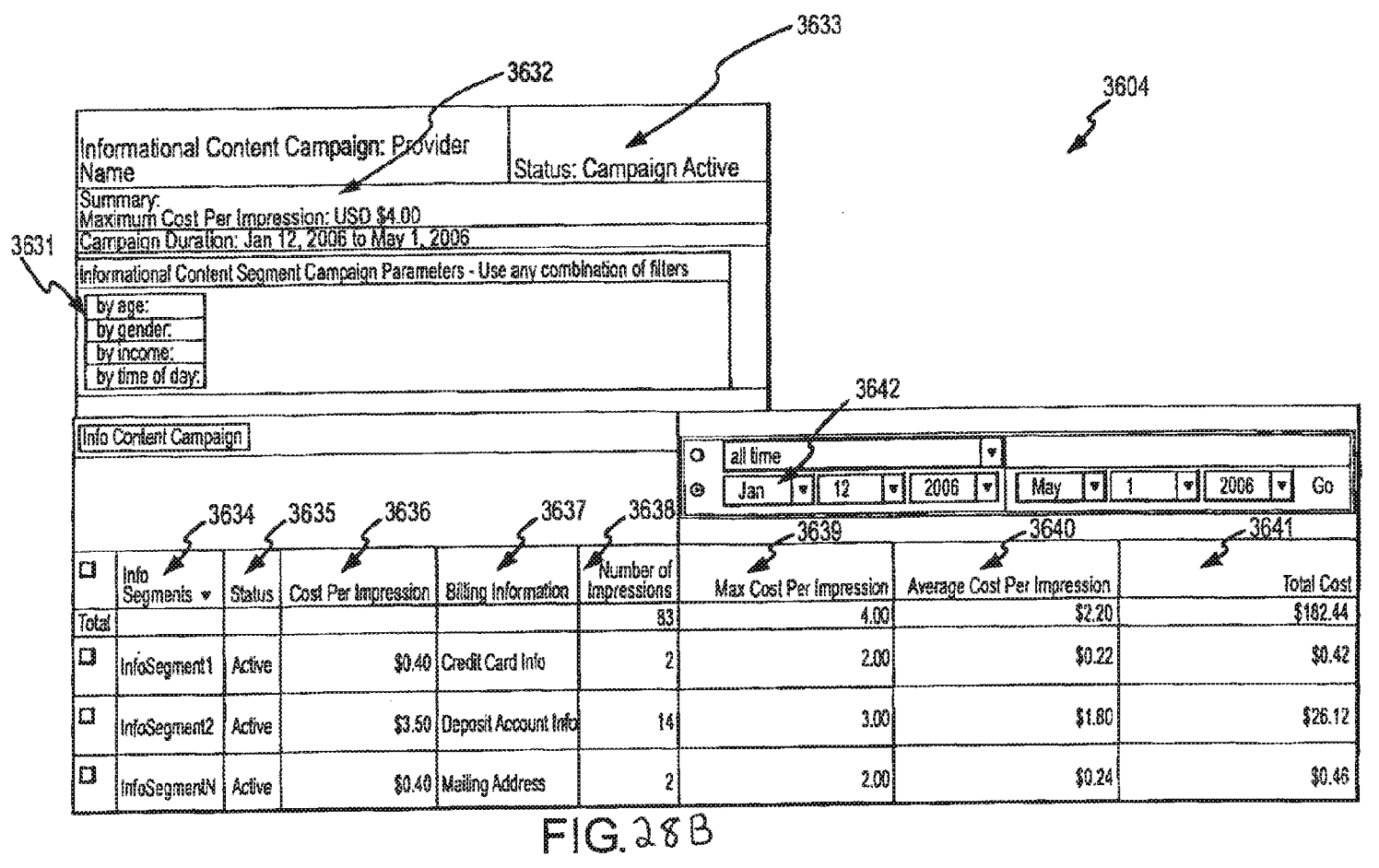

FIG. 28B is exemplary GUI 3604 of targeted content interface configuration 3600 of FIG. 28A. In this embodiment, GUI 3604 provides a resource that enables the advertiser to initiate an advertising campaign. For example, an advertiser may wish to generate an ad campaign for commercial breaks within broadcast network content (e.g., television commercial breaks). GUI 3604 allows the advertiser to generate the ad campaign for ads by entering certain campaign parameters (e.g., cost per impression 3636, billing information 3637, maximum cost per impression 3639, campaign dates 3642, and/or various demographic information 3631). Costs associated with each ad may be negotiated with the MSO prior to the ad campaign.

An advertiser may provide ads to a system that targets the ads to certain CPEs, such as CPEs 2810 described hereinabove. For example, an advertiser may provide ads to an ad server. The advertiser may then establish desired delivery attributes (e.g., demographic information 3631, such as age, gender, income, and/or time of day) for delivery for the ads via GUI 3604. That is, the advertiser may associate various attributes of CPE users to ads such that the ads are delivered accordingly (e.g., based on votes cast by the CPEs as described hereinabove). Additionally, the advertiser may include information regarding the maximum cost per impression (e.g., maximum cost per delivered ad) and/or duration of the ad campaigns.

GUI 3604 may be implemented as an interfacing application delivered, for example, to the advertiser by a server based system (e.g., traffic/billing system 3610). Alternatively, GUI 3604 may be implemented as a web site in which an advertiser interfaces through, for example, a Web browser, such as Microsoft Internet Explorer. In either case, GUI 3604 may provide information to traffic/billing system 3610 regarding certain campaign information (e.g., demographics, billing information, etc.). Similarly, GUI 3604 may provide information to advertiser regarding costs associated with the ad campaigns. For example, GUI 3604 may receive information from traffic/billing system 3610 regarding the number of impressions (e.g., deliveries of ads to individual CPEs) and the costs associated with those impressions.

While one embodiment has been shown and described herein, those skilled in the art should readily recognize that the invention is not intended to be limited to the illustrated embodiment. For example, GUI 3604 may be implemented in other ways that fall within the scope and spirit of the invention. Those skilled in the art are familiar with implementing such interfaces in a variety of ways.

FIG. 28C illustrates GUI 3645 in an alternative embodiment to GUI 3604. In this embodiment, GUI 3645 incorporates audience estimation information. For example, a system used for targeting ads to CPEs, such as system 2800 of FIG. 28, may estimate the number of audience members based on CPE usage. This audience estimation may be incorporated into GUI 3645 such that an advertiser may designate where ads should be delivered as well as budget for delivered ads.

GUI 3645 may enable the advertiser to select various features that correspond to audience members. For example, the advertiser may input a certain audience profile based on gender 3650, income level 3651, age 3652, geographic region 3653 (e.g., zip code, city, suburb, neighborhood, individual dwelling, state or custom location zone as described above, etc.), as well as other parameters (e.g., channel inclusion 3656, channel exclusion 3657, program exclusion 3655, etc.) to designate delivery of a particular ad. Based on these parameters, the system may estimate an "audience universe" (e.g., a number of audience members fitting that profile) and allocate a cost for the ad. Audience estimation is shown and described below.

Intuitively, the advertiser may enter a certain audience profile according to various audience parameters age 3652, income level 3651, gender 3650, etc. The parameters of program exclusion 3655 may enable the advertiser to exclude various programs, or broadcast network content. For example, by entering a certain broadcast network content program title, the advertiser may deselect insertion of an ad from that broadcast network content program.

Similarly, individual network channels may be included (i.e., channel inclusion 3656) or excluded (i.e., channel exclusion 3657) by the entry of certain channel information within designated fields. Such may enable the advertiser to designate which channels receive ads. For example, an advertiser wishing to deliver ads relating to lingerie would likely not wish to deliver such content segments to viewers watching children's programming. As such, the advertiser may use GUI 3645 to exclude such ads from viewers of the children's programming. In a similar fashion, the ad provider may wish to include certain other channels that would be preferential for a particular ad campaign. For example, the ad provider may wish to deliver ads relating to men's shaving products (e.g., shaving cream, razors, etc.) to viewers of a sports network.

In addition to the audience selection parameters mentioned, GUI 3645 may include other parameters that an advertiser may use to generate a campaign of ads. For example, the advertiser may select days of the week 3660 and the number of weeks 3661 in which the ads are to be delivered to the designated audience profile. In this regard, advertiser may also select the start and end dates 3662 and the start and end times 3663 of the selected days. As well, the advertiser may select the frequency 3659 during this campaign in which the ads are to be delivered to the designated audience profile.

Optional features may include "skipping" certain times in which the ads are to be delivered. For example, an advertiser may desire delivery of an ad during a certain week while skipping other weeks within a campaign start date and end date. The advertiser may therefore enter the weeks to be skipped in the skip weeks field 3664.

The system may also use these selected campaign parameters to estimate the audience universe. For example, the system may retrieve a priori information corresponding to entered campaign parameters. That is, the system may retrieve the number of audience members using CPEs at times that correspond to the campaign parameters. For example, the system may develop such predictive information based on prior voting and report information. As discussed above, the system has access to a large volume of information, based on such voting and reports, regarding audience size and composition that is indexed to programming channel and time. Accordingly, the system is well equipped to estimate the audience universe. Indeed, in many respects, the system has capabilities that exceed traditional ratings based systems. This information may be displayed in audience universe estimate 3658. Additionally, GUI 3645 may include cost allocation parameters for which the system may generate bills for the advertiser. For example, each ad within a given campaign may have a "cost per impression" 3665. As such, the system may use an audience universe estimate 3658 and multiply the cost per impression for an individual ad to estimate a total cost for a given ad campaign. Generally, though, the price of an ad is based on a universe estimate (i.e., number of audience members) times a frequency of the ad times the cost of the ad.

Other information for GUI 3645 may include items such as client identification 3667 and the particular market 3668 for the client. For example, a company such as Intel Corp. may be identified as a high technology company desiring to display ads to a certain group of consumers, such as college-educated individuals between the ages of 28 and 42. An Intel representative may use GUI 3645 to tailor an ad campaign that delivers ads relating to Intel processors that enhances delivery of such ads to the desired audience. The system may therefore use the market information as a "filter" for certain broadcast network channels having at least a viewership component that matches a desired audience. In this regard, aggregation of CPE users may be achieved.

Figure 29:
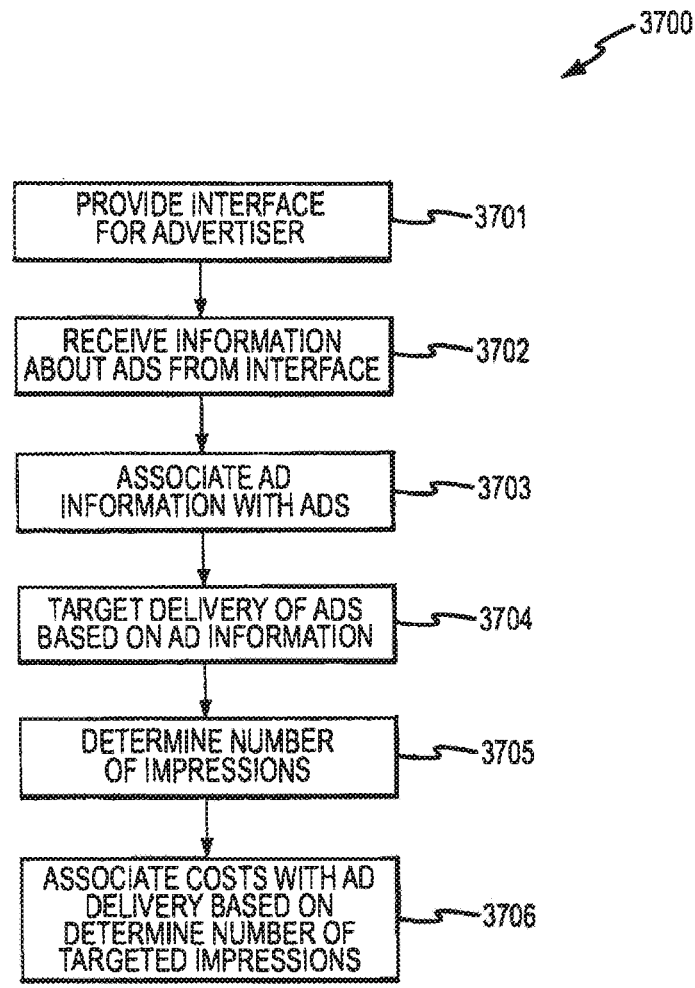
FIG. 29 is a flowchart of an exemplary targeted content interface process.

FIG. 29 is a flowchart of exemplary targeted content interface process 3700. In this embodiment, an interface is provided for an asset provider, in process element 3701. For example, a system used for targeting ads to CPEs, such as system 2800 of FIG. 28, may provide a communicative interface, such as GUI 3604 of FIG. 36B to an advertiser. With the communicative interface, the advertiser may communicate information pertaining to campaigns for selected ads. That is, advertiser may provide user attributes to be associated with ads. The provider may also provide account/billing information such that costs associated with campaigns may be provided thereto.

The system may receive the information about the ads from the interface, in process element 3702. The system may then associate information with the ads of the advertiser, in process element 3703. For example, such information may include demographic attributes (e.g., age, gender, income level, location of CPE or STB etc.) of desired targets. As such, the system may target delivery of the ads based on the information, in process element 3704. That is, the system may provide ads in connection with broadcast network content as described hereinabove (e.g., on dedicated asset channels, in the programming channel, etc.).

The system may deliver the broadcast network content and ads to CPEs, which select appropriate ads. For example, attributes of CPE users may be inferred and matched to targeting criteria for an ad. As such, one group of CPE users may receive broadcast content associated with a first ad while a second group of CPE users receive broadcast content associated with a second ad (e.g., that differs from the first ad). Regardless, each ad that is delivered to a CPE user may be deemed an impression. The CPEs, upon delivering the ad, may report back to the system that the segment was delivered. As such, the system may determine the number of target impressions delivered, in process element 3705.

Based on the number of impressions, the system may associate costs with ads, in process element 3706. For example, each ad may have a predetermined cost associated with the segment. The total cost for the ad campaign is therefore the number of impressions times the associated cost per impression. This information may then be communicated to the advertiser such that payment can be made.

The interface may also include elements for specifying a targeted area. As noted above, the present system allows for great flexibility in designating a targeted area and, in particular, is not limited to broadcast network topology. While this allows for improved targeting, it also entails certain complications related to the definition of the targeted area. Some areas corresponding to existing demarcations may be easily defined, such as by identifying towns, neighborhoods, zip codes or the like. For example, particular advertisers may wish to target geographical areas that are not specifically defined in relation to the advertiser's business or business location, e.g., uptown Manhattan, the tri-state areas the District of Columbia, etc. Such geographical zones may be predefined for selection by an advertiser in relation to the interface. Similarly, other geographical zones, not necessarily being recognized outside of the system, may be predefined for selection by an advertiser in relation to the interface. For example, based on demographic analysis or intelligence developed through ad contracting, vote tallying and delivery report analysis, the system may develop predefined (in relation to a given ad contract process) zones having characteristics of potential interest to classes of advertisers, e.g., luxury consumer zones, senior citizen zones, student zones, discount shopper zones or young professional zones. Similarly, geographically defined zones may be correlated to audience size and classification such that, if an advertiser wishes to target 100,000 females between ages 18-34, this may be accomplished based on geographic targeting without requiring any geographic expertise. Additionally, other areas may be defined by entering a small amount of information, for example, a location (e.g., of a retail outlet) and a proximity parameter (e.g., a 5 mile radius). In such cases, the interface elements used to specify the location criteria may include text boxes, drop down menus and the like.

Moreover, it will be appreciated that definition of location zones is not limited to such a graphical user interface. For example, in some cases, it may be convenient to define a geographical zone by loading or accessing a customer or other mailing list or otherwise by reference to an external data source or file. In this regard, each address on a mailing list may define a segment of a composite geographical zone or any location element (e.g., a grid cell as discussed in more detail below) having a least a preselected number of hits from a mailing list may be flagged for inclusion in a geographical zone. Similarly, in the case of defining a zone by way of a radius from a business outlet or other location, such a definition, as noted above, may simply involve an address and a radius and can easily be provided by phone (e.g., to sales personnel of the network operator) or other means.

However, in other cases, an asset provider may wish to target a custom or arbitrary geographical area. The present invention provides a system for targeting assets to geographical areas in a manner that is independent of network topology. In one implementation, the system includes asset filtering at the CPE level in relation to the location of the CPE. As such, the system may target individual CPEs, groups of CPEs or geographical areas, in a manner that is independent of the network topology. Such targeting may be facilitated by a graphical user interface, including a map, such that the user can draw the target area in relation to the map, e.g., using a touch screen, a mouse, a stylus or a drawing tool. Such a map may allow for zooming in or zooming out to accommodate fine or coarse area definition. These inputs may then be processed to translate the inputs into an internal format, for example, using a hierarchy of defined area elements. For example, FIG. 30 includes a number of streets 4102-4103 that are included in a ZIP code 4106 that is in turn included with a number of other ZIP codes 4108-4109 within a region 4112. Such information regarding subscribers associated with the STBs may be obtained from an MSO. Because the system uses information from the MSO, it is capable of distributing ads to the correct region, ZIP code, or street. Furthermore, the system may comprise (on a lower level) individual street addresses. However, it may be desired to generalize such information, e.g., to a block centroid, so that sensitive information is not available to advertisers or other parties to whom a subscriber may not want the information released. Similarly, the geographical area corresponding to the coverage of a traffic/billing system of other universe of location available for targeting may be divided into predefined subsets, e.g., grid elements. In this manner, the size of the grid elements may be selected to accommodate a desired level of targeting granularity. The size of the grid elements may also be selected so as to provide privacy protection in relation to the location information employed, e.g., so that location information can be conveyed in the form of a grid element identity, which is not personally identifiable or specific to any particular person/household. Moreover, such granularity is readily scalable (e.g., by changing the cell size or combining cells) to conform to any regulations that may apply with respect to a given jurisdiction.

Figure 30:
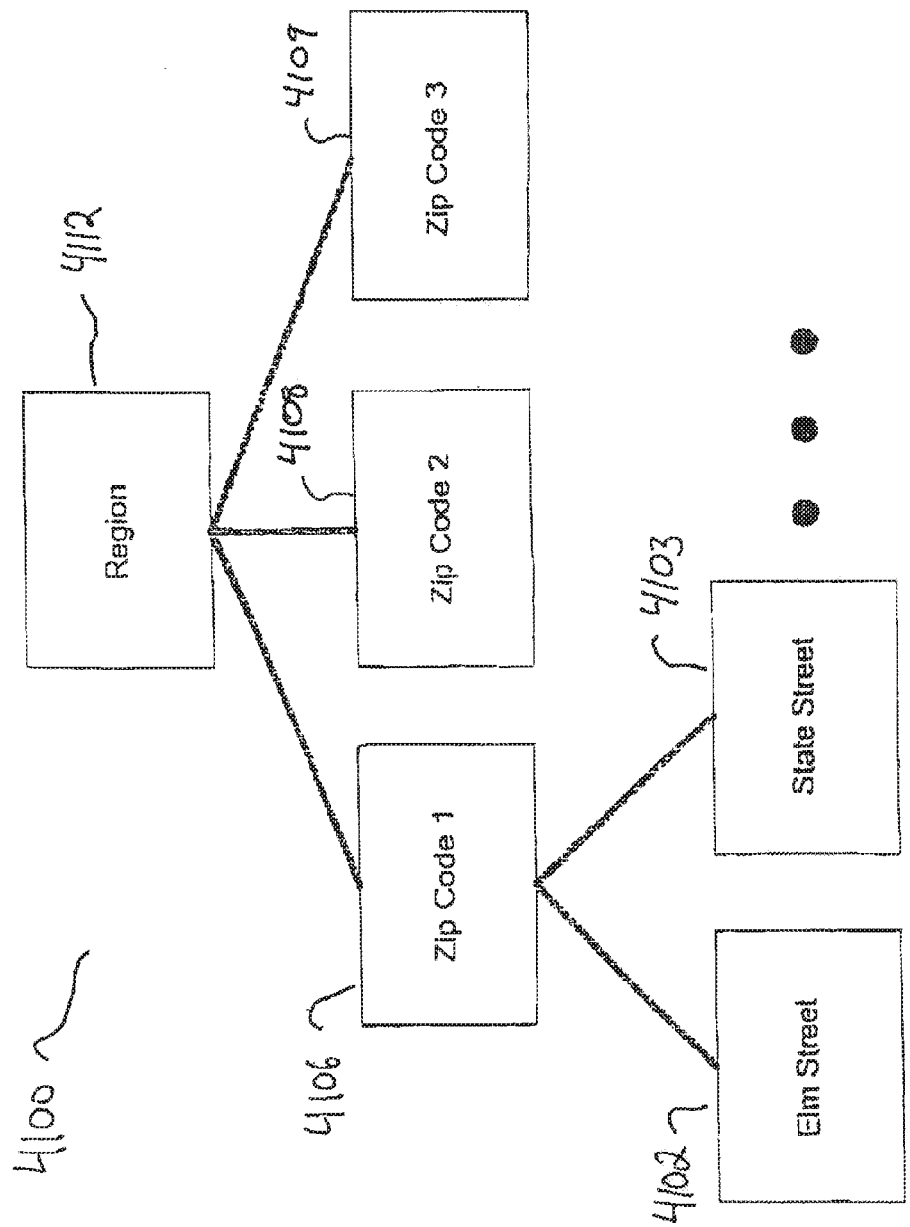
FIG. 30 is a schematic diagram illustrating one structure for defining user equipment location that can be utilized in accordance with the present invention.

The chart 4100 in FIG. 30 is an example of a hierarchical geography classification. Although the chart 4100 and elements (e.g., streets 4102-4103, ZIP codes 4106, 4108, 4109, region 4112) are shown here having a hierarchical structure, those skilled in the art should readily recognize that the invention is not intended to be limited to the illustrated embodiment. Rather, the geographical elements or structures may be represented in a number of possible alternate structures. For example, it may be convenient to utilize census divisions such as blocks, block groups, census tracts, metro areas, etc. Similarly, political divisions such as counties, wards, precincts and the like may be utilized.

Figure 31A:
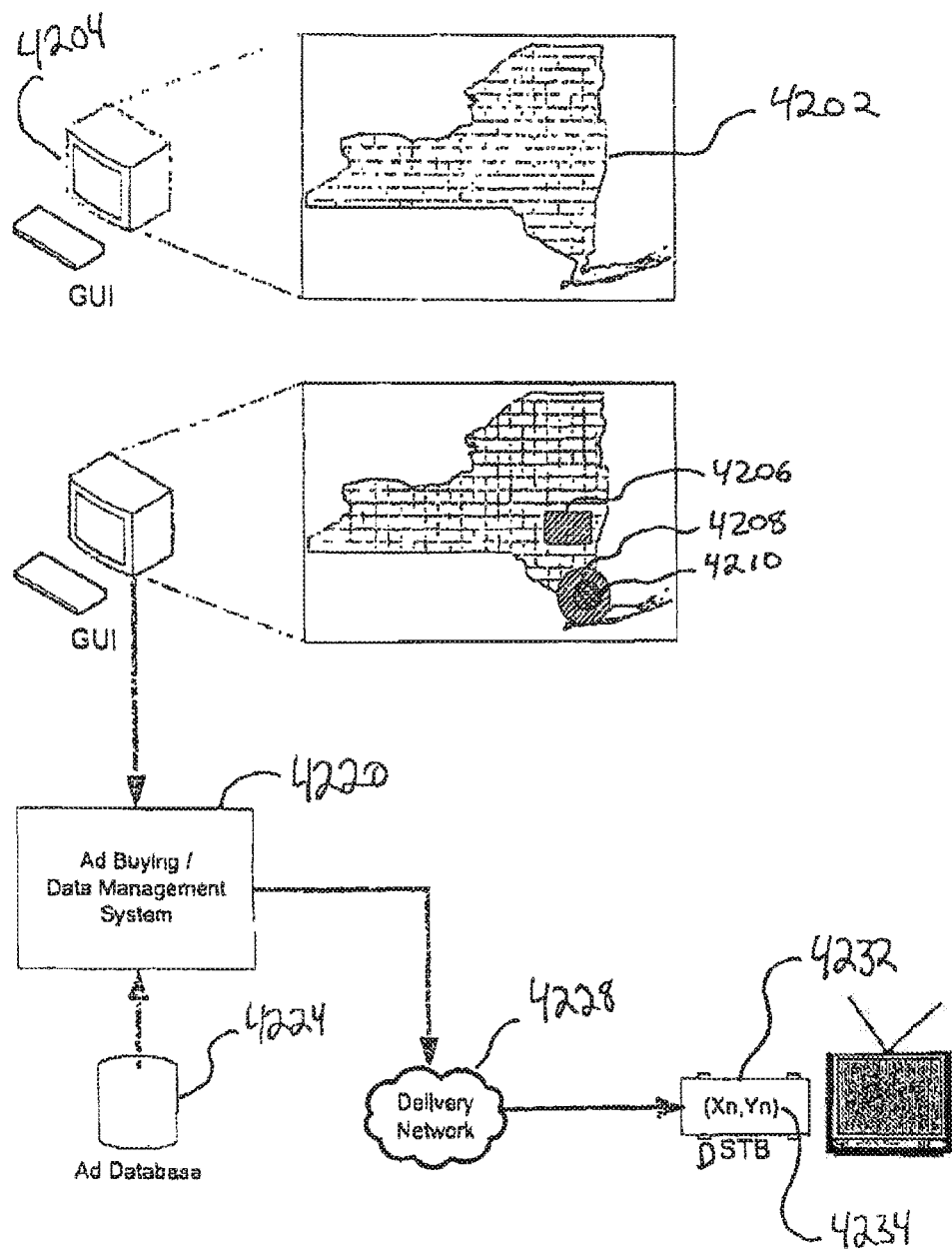
FIGS. 31A-31B illustrate alternative location definition functionality and structure in accordance with the present invention.

For example, as shown in FIG. 31A, a geographical region, such as the State of New York, may be represented by a grid of coordinates 4202. The grid of coordinates 4202 may be viewed by an asset provider on a GUI displayed on a computer screen 4204. The asset provider may then select a region of an arbitrary shape (e.g., rectangle 4206, circles 4208 and 4210) on the grid to represent his preference for geographical targeting of an asset. It should be noted that the shapes of the targeted regions may be arbitrary and may include areas that are not part of the grid (e.g., the circles 4208 and 4210 include some of the states of Connecticut and New Jersey). Areas not part of the grid may be discarded or may be applied to another grid. Because the system is independent of network topology considerations such as locations of nodes or locations served by headends, the targeted areas may include areas served by multiple parts of the network or by other networks, and may exclude many other parts of the network(s). Furthermore, the areas selected by the asset provider may be areas that are deemed to be inclusion areas or exclusion areas, respectively selecting those areas for asset delivery or selecting those areas to which the asset should not be delivered. For example, circle 4208 may be an inclusion area and 4210 may be an exclusion area, allowing an asset provider to target an annular region that is within a range of distances from a central location.

The targeting system may be implemented such that a network operator or other party is able to place limitations on the targeting zones that may be defined. For example, the network operator may wish to place minimum or maximum size limits on zones or may wish to limit zone shapes to a certain set of predefined shapes (e.g., to avoid the need for cumbersome zone definitions). Such limitations can be effected in any appropriate manner such as by providing error messages when a limit is violated or enabling selection of zones only from among "legal" shape options. Moreover, the location targeting functionality or all targeting functionality may be excluded from certain geographic areas, e.g., school campuses, corporate campuses, retirement communities, etc. Such exclusions may be implemented in connection with a graphical user interface as discussed above.

The coordinate system shown in FIG. 31A is a Cartesian coordinate system, however, many other coordinate systems may also be used separately or in combination. For example a radial coordinate system could determine distances from particular landmarks as well as arcs and circles. Additionally, shapes may be used that correspond to real features as well as arbitrary shapes. For example, the boundaries of county lines, major roadways, streams and lakes, or other useful delineations may be used in defining the shapes available to asset providers for defining a target geographical area.

Any appropriate coordinate system and associated projection methodology may be employed in connection with defining location zones and CPE or other user equipment device locations. That is, the interface noted above involves representation of an area of the Earth's surface on a two-dimensional screen. As is well known, any projection of the Earth's surface onto a flat surface will involve some distortion of the true topology of the Earth's surface. Cartographers have developed many different projection techniques to address this problem, and different ones of these techniques have difference relative advantages in relation to preserving properties of shapes (over a localized area), preserving direction, preserving distances, etc. Accordingly, the coordinate system and projection technique may be selected to preserve any qualities deemed important to a network operator or advertisers.

Several practical considerations mitigate the affects of projection distortion in the noted application. First, distortion affects become more pronounced as the size of the area to be mapped increases. These offsets typically are not linear, and modeling them can involve complex mathematics. However, over small areas, linear approximations can be used with little error. In the context of targeted advertising, it is expected that accuracy will be most crucial when targeting zones are small and will be less crucial when targeting in coarse. Consequently, for many targeted advertising applications, it is expected that many different coordinate systems and projection techniques will yield adequate results and such selection may be based on other considerations such as reducing computational complexity and processing resources. In this regard, it is expected that typical targeted advertising applications will require resolution no more fine than that required to identify a residence and, in many cases, groups of residences or neighborhoods. As a result, it is expected that distortion errors on the order of 10 meters will generally have little or no impact, and, in some cases, errors will be tolerable at least until they are well in excess of 100 meters.

In addition, cable markets typically exist within a narrow range of latitudes. Mapping models can take advantage of this assumption, since distortion with certain common projections increases with distance from the equator. Extreme polar latitudes are unlikely to be critical in many targeted advertising applications. In consideration of all of the above, it is expected that a conventional planar projection onto a Cartesian coordinate grid will be suitable for many targeted advertising applications. In particular, such a projection can be executed in relation to a cylindrical coordinate system where the axis of the cylinder extends through the Earth's poles. Such a projection is expected to have adequate accuracy for the noted applications, while advantageously allowing for simple processing and requiring minimal processing resources to implement location comparison algorithms as described below. However, it is anticipated that other coordinate systems and projections may be preferred for certain targeted advertising applications.

It should be noted that the same coordinate system and projection processes need not be used for all purposes in the targeted advertising system. For example, as noted above, a cylindrical coordinate system may be used to define a planar projection map for a user interface. This does not mean that if an advertiser wishes to target a circular area defined by a point and a radius that the targeted area must be distorted from a circular area relative to the Earth's surface (spherical projection) to reflect the distortion inherent in the noted cylindrical projection. That is, the circular area may be defined as a true circle in relation to the Earth's surface (in which case it would appear distorted on the user interface), or it may be defined as an imperfect circle in relation to the Earth's surface in order to appear as a true circle on the user interface. In one implementation, it has been decided to define circular geographic advertising zones as true circles in relation to the Earth's surface, resulting in slightly imperfect circle representations on the user interface. This is believed to more accurately reflect the desires of the advertisers who define such zones.

Moreover, different platforms of the system may define geographic zones in different ways. For example, a user equipment device may expediently compare its location to a circular zone defined by a point and a radius. In a particular implementation, another network platform, such as a headend or a traffic and billing system platform, may represent that zone as a distorted circle (due to a projection process) or as a set of rectangular cells approximating the circular zone. Translation between these different representations of a given area may be implemented automatically. In addition, the error resulting from this translation process can be precisely determined and correlated to numbers with affected network users. Those users can even be identified if desired. It is therefore expected that projection related errors can be minimized and, if desired, can be addressed by appropriate logic.

While the noted graphical user interface provides a useful mechanism for use in defining geographical zones, it will be appreciated that many location targeting objectives can be satisfied without using such, an interface. For example, many advertisers desire to advertise based on census divisions, political divisions, proximity to a retail outlet or other geographical bases that do not require graphical mapping. In such cases, the divisions may be identified directly or other information may be input directly without using a graphical interface as described above. For example, such information may be transferred as data files, textual inputs, dialogue box inputs, drop-down menu selections, etc.

B. CPE Location Information

As noted above, in one implementation, voting and/or ad delivery decisions are based on a comparison of the targeting location criteria to the location of the CPE. Thus, in this implementation, the CPE knows its location. This can be accomplished in a variety of ways. For example, the CPE location can be programmed into the CPE before the CPE is provided to the network user. However, this may be cumbersome, does not address equipment already in the field and does not accommodate moving of equipment. With regard to moving of equipment, this encompasses both the occasional movement of essentially fixed equipment (e.g., movement of a set top box in connection with a change of residence) and routine movement of mobile devices.

Alternatively, CPE location information may be provisioned from a source external to the network. For example, the CPE or subscriber may access a Geographical Information System (GIS) or other site to obtain geographical coordinates corresponding to a street address of the CPE. However, as will be discussed below, it may be preferred to store location information at the CPE in a format other than geographical coordinates.

In still other cases, the CPE or other user equipment device may be capable of determining its position. For example, a variety of personal computing devices (including certain cell phones or portable hard drive based devices) have or may soon have GPS or other positioning system capabilities. Additionally, some devices may be positioned via telephony system technologies such as cell ID, cell sector, microcell, TDOA, AOA, aGPS, etc. Moreover, a number of systems have been proposed or developed for locating IP devices, for example, in connection with positioning VOIP devices to meet government regulations for routing of emergency calls to PSAPs and otherwise providing device location information. Accordingly, user equipment device location information may be obtained in various ways involving various communications pathways.

Figure 34A:
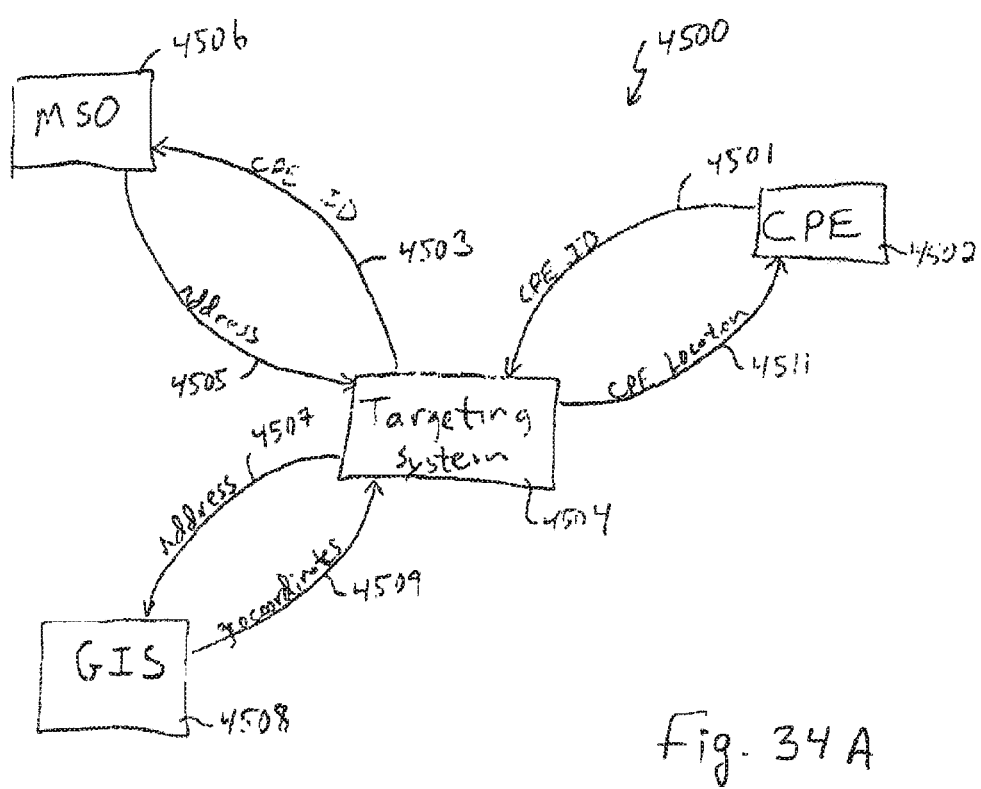
FIGS. 34A-34C illustrate exemplary alternative processing pathways for location targeting-related information in accordance with the present invention.

FIG. 34A illustrates a location provisioning system 4500 and associated process wherein CPE location is provided through the broadcast network. The process is initiated by transmission (4501) of a CPE, identification from the CPE 4502 to the targeting system 4504. The targeting system 4504 may be resident at a headend, at a separate platform and/or may be distributed over multiple platforms. The targeting system 4504 transmits (4503) the CPE ID to an MSO who can correlate the CPE ID to a street address of the associated network user. This street address is provided (4505) back to the targeting system 4504.

It will be appreciated that this address may, be directly related to a grid element or region used by the targeting system 4504. However, in the illustrated implementation, the address is transmitted (4507) to a GIS platform 4508, which returns (4509) corresponding geographical coordinates or a geocode.

This geocode may then be transmitted (4511) to the CPE 4502. However, it may be preferred to provide processed location information to the CPE. For example, the geocode may be generalized (e.g., to the coordinates) to avoid use of personally identifiable information. Alternatively, the geocode may be correlated to a grid structure used for specifying target location criteria. In this regard, the format of the CPE location information provisioned by the targeting system 4504 may be a function of the methodology employed to match CPE location information to the targeting location criteria as described below.

Figure 34B:
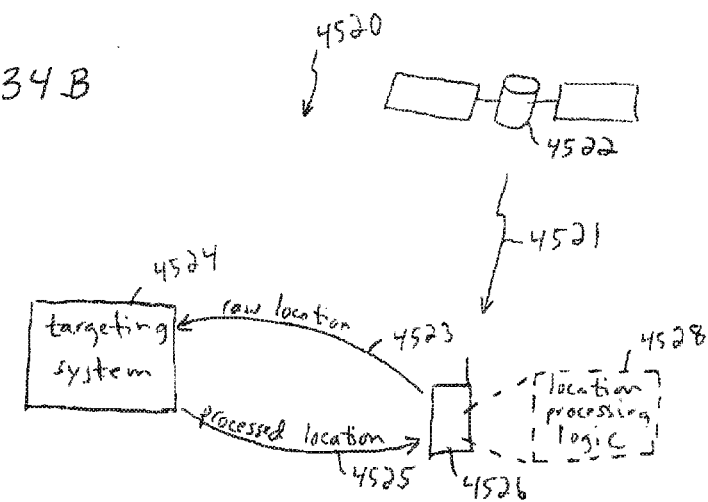

FIG. 34B illustrates an alternative system 4520 for provisioning location information. In this case, a user equipment device 4526 is capable of determining its own position. Specifically, in the illustrated embodiment, the device 4526 obtains location information based on signals 4521 from a satellite based location system 4522. Although only a single satellite is illustrated, it will be appreciated that determining location information generally involves contact with at least three satellites for two-dimensional location information and four satellites for three-dimensional location information (including altitude). As noted above, it may be desired to express the device location information in terms of a grid element or the like rather than in terms of a raw geocode. Such a grid is not limited to a Cartesian coordinate system but may be defined in relation to any coordinate system. Thus, in the illustrated embodiment, location information 4523 is transmitted from the device 4526 to the targeting system 4524. Such location information 4523 may be encrypted or transmitted in component form to address privacy concerns. The targeting system 4524 receives the location information 4523 and provides processed location information 4525 back to the device 4526. For example, the targeting system 4524 may match coordinates to a cell of a grid or otherwise correlate the location information 4523 to the process location information 4525. Alternatively, this matching of the raw location information to processed location information may be performed by location processing logic 4528 resident on the user equipment device 4526.

Figure 34C:
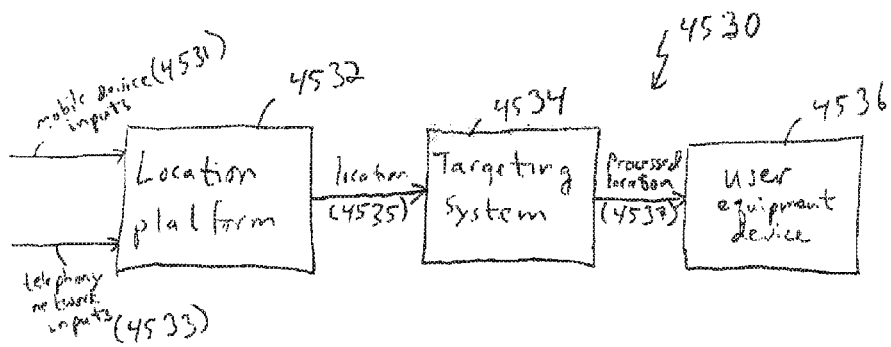

FIG. 34C shows a further alternative system 4533 for provisioning location information regarding a user equipment device 4536. In this case, the targeting system 4534 obtains location information 4535 from a location platform 4532. For example, the location platform 4532 may be a location gateway of a mobile telephone network. Such a location platform 4532 may receive location input from a variety of sources. Thus, for example, the platform 4532 may receive mobile device inputs 4531 from mobile devices capable of determining their own position as well as telephony network inputs 4533 from any of a variety of network based positioning systems as discussed above. The location information of 4535 may be provided, for example, in the form of geographical coordinates together with an uncertainty. The targeting system 4534, as above, expresses the location information 4535 in terms of a grid cell or other location identifier used for purposes of the targeted advertising system. This process location information 4537 is provided to the user equipment device 4536.

It will be appreciated that it may be desired to occasionally update location information for a user equipment device. The frequency of updating such information may be a function of the type of user equipment device. Thus, for example, in the case of stationary customer premises equipment, it may be sufficient to update device location only upon a change of address of the subscriber. Thus, the targeting system may receive an address change notification for a particular device and, in response, push updated location information to the user equipment device. In the case of mobile devices such as mobile telephones and portable hard drive based devices, location information may need to be updated more frequently. Thus, in the case of mobile telephones, a location platform may receive updated location information on a periodic basis, in response to a polling process, a power-on signal, a cell hand-off procedure or the like. The targeting system may register with the location platform to receive such updates as they become available or may otherwise request updates on a periodic basis. In the case of user equipment devices capable of determining their own positions, position information may be updated continually. Alternatively, such devices may report location information to the targeting system and receive processed location information periodically or upon determining that updated location information is needed due to a change in position determined by monitoring raw location information. In any event, once the device location information is obtained at the user equipment device by one of these techniques, the device location can be compared to targeting criteria, as described below.

A variety of other mechanisms can be used for providing location information to the user equipment devices. For example, a user equipment device may query a network platform to obtain the device's location by entering a MAC address or other identifier. Alternatively, the network may periodically push a table of device location information, e.g., indexed to MAC addresses or other device identifiers, to network devices. In this case, individual devices may access the table, retrieve the relevant information and then discard the table so as to avoid persistent storage of extraneous information. As a further alternative, an installer or other person may carry a GPS or other locating device and load location information into the device. Any suitable process for providing the location information may be utilized in this regard.

C. Location Matching

The CPE, or other user equipment device can then use its stored location information to identify appropriate assets, e.g., in a voting context or as part of an ad delivery decision. In the present implementation, this involves a comparison of the CPE location information to the location targeting criteria specified by the metadata associated with an asset. Any appropriate comparison technique can be employed in this regard. For example, in the case of an ad targeted to CPE's within a given radius of a specified location, the distance between the CPE location and the specified location can be compared to the given radius. Such a comparison can be executed according to the following equation:

$$(x_d - x_c)^2 + (y_d - y_c)^2 < r^2$$

where $x_d$ and $y_d$ are the coordinates of the device, $x_c$ and $y_c$ are the center coordinates of the specified location, and r is the specified radius. The coordinates may be absolute geocode coordinates or reference coordinates for a grid element.

If the location targeting criteria defines a polygon, a variety of point-in-polygon algorithms can be employed. For example, in the case of a square, the location of the device $x_d$, $y_d$ may be compared to the locations of two diagonally opposed vertices ($x_{v1}, y_{v1}$ and $x_{v2}, y_{v2}$), where $x_{v1} < x_{v2}$ AND $y_{v1} < y_{v2}$, as follows:

$$x_{v1} < x_d < x_{v2} \text{ AND } y_{v1} < y_d < y_{v2}$$

Similar logical constraints can be defined for other polygons. For these or more complex shapes, a boundary can be expressed mathematically. A ray can then be defined extending from the CPE location (e.g., from the CPE location north to the traffic/billing system boundary). For zones defined by a single continuous peripheral boundary, intersections between the ray and boundary can be identified such that an odd number of intersections indicates an in-zone status of the CPE location, and an even number of intersections indicates an out-of-zone status. That is, each boundary crossing effects a change in status from inside the zone to outside or vice versa. If the ray extends beyond the boundary of any permissible zone (thus indicating a ray end status of outside the zone), then the status of the CPE location is a function of whether the total number of boundary crossings along the ray is an even or odd number. Further examples of point-in-polygon algorithms and specific implementations thereof can be found in Haines, Eric, "Point in Polygon Strategies," in *Graphics Gems IV*, Paul Heckbert (editor), Academic Press, 1994, ISBN 0123361559, which is incorporated herein by reference.

As a further alternative, a quadtree data structure, hierarchical grid data format or the like may be used to efficiently define target areas. Thus, for example, the broadcast network service area may be divided into four quadrants. Each of these quadrants may be divided into quadrants, and so on, until the desired level of location granularity is defined. The finest level of granularity is the lowest or first level of the data structure. At the second level, each element is composed of four elements of the first level and so on. This structure can then be used to define a target area. For example, grid elements included in a target area may be flagged in the mapping logic. If all four level 1 grid elements corresponding to a given level 2 element are flagged, then the level 2 element is flagged and the level 1 elements are unflagged. The same applies at higher levels. This allows for efficient definition of complex shapes.

Figure 31B:
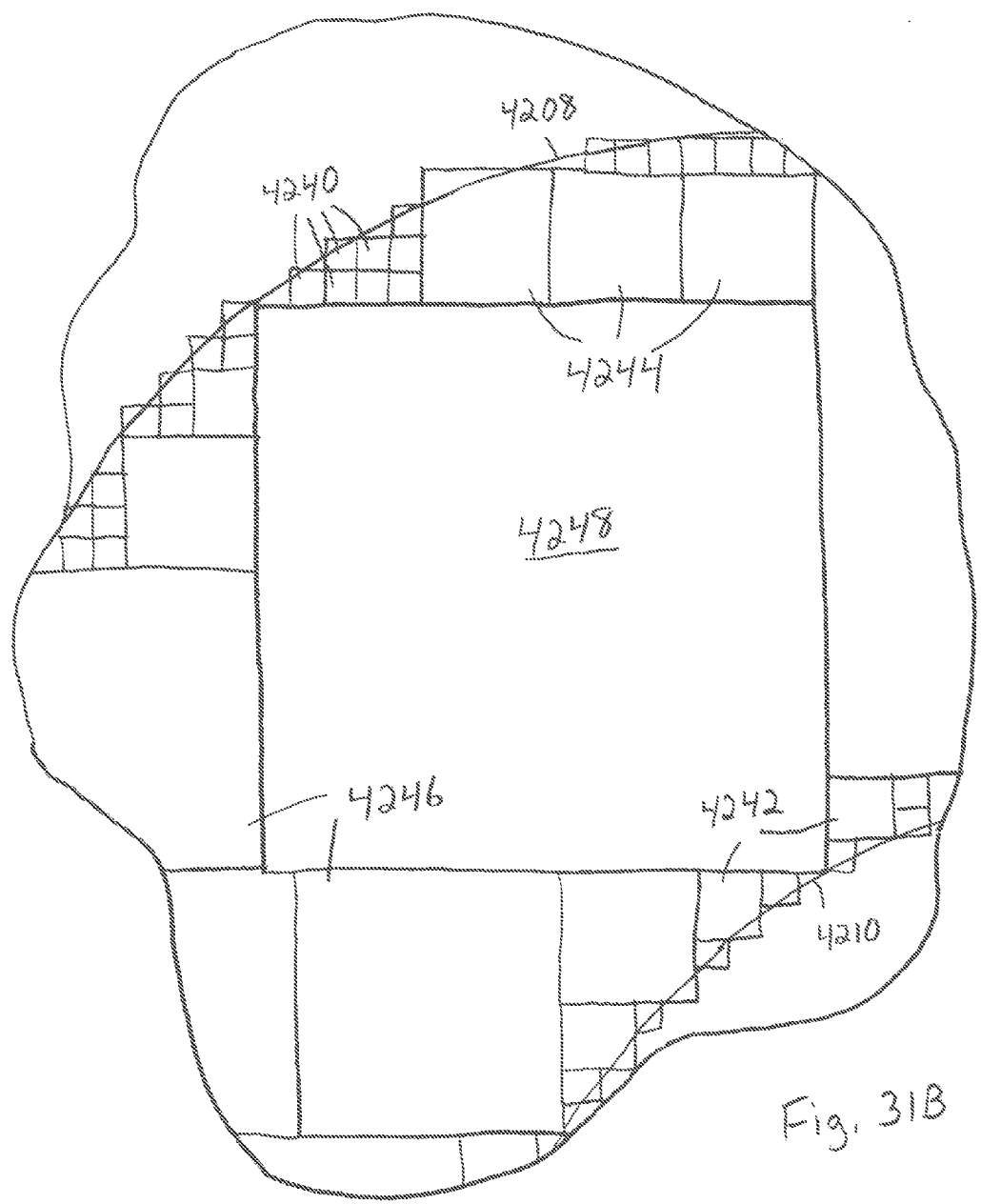

This is illustrated in FIG. 31B where a portion of boundaries 4208 and 4210 from FIG. 31A are shown. The area included within the boundaries 4208 and 4210 of the illustrated segment is approximated by level 1 elements 4240, level 2 elements 4242, level 3 elements 4244, level 4 elements 4246 and level 5 elements 4248. At the boundary, whether an element is flagged can be determined by one or more rules, such as the element must be wholly within the boundary or a majority of the element must be within the boundary.

In this manner, any area—even complex areas or areas composed of discontiguous elements—can be efficiently defined and can be defined in relation to a common grid structure. Moreover, such complex areas can be represented, compactly, thus reducing the amount of data that must be transmitted across the network. As described above, each CPE can know its position in terms of its corresponding element at each level of the grid structure. Matching a CPE location to a targeted zone then simply involves finding a match of a CPE location element to a target zone element at any level of the grid structure. Moreover, it will be appreciated that, due to the geometric nature of this grid structure, the entire area of a broadcast network can be defined to a fine level of granularity with few grid levels.

Figure 33:
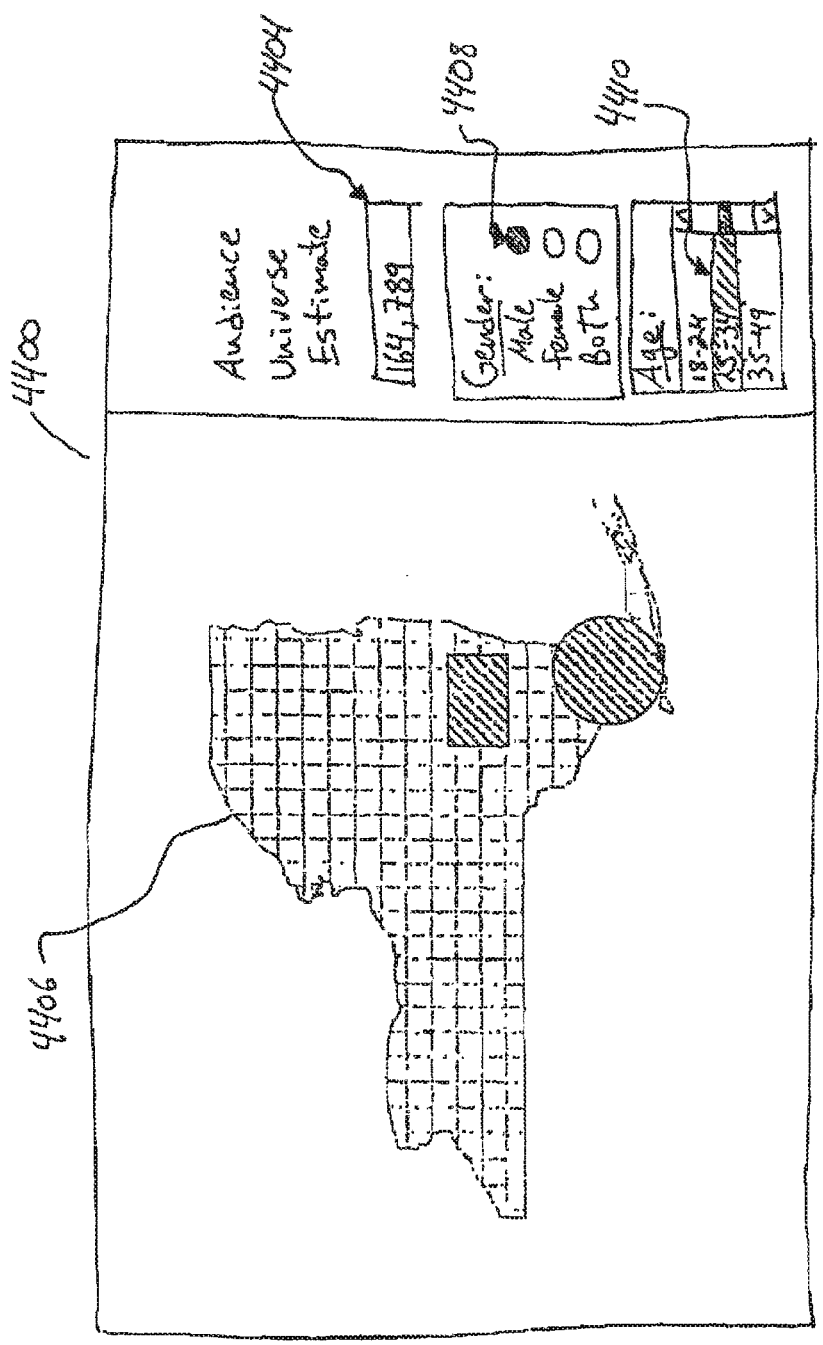
FIG. 33 illustrates an exemplary GUI for the location targeting system of FIG. 32.

As depicted in FIG. 33, the GUI 4400 used to specify location targeting criteria may be configured to provide an asset provider with feedback about the audience size within the selected area. The GUI 4400 may, therefore, provide a total audience universe estimate 4404 next to the geographical grid 4406 for the asset provider to view while making selections. The GUI 4400, in this example, calculates an anticipated audience size based on the geographical area selected, thereby providing an asset provider with a gauge of how expensive a particular advertisement campaign may be. Other filters may be included in the GUI 4400 to allow the asset provider to determine, for example, the number of males 4408 between the ages of 25 and 34 (e.g., 4410) within the geographical areas selected. Therefore, the GUI 4400 may provide feedback of the potential audience universe 4404 within a particular geographical area at any level of audience classification desired.

Moreover, the GUI 4400 may include other information to assist advertisers in developing a targeting model. Thus, for example, the GUI 4400 may include information identifying population concentrations, concentrations of particular demographic groups, predefined location zones and the like. This information may be presented in any appropriate form such as color coding, legends, text, etc. Moreover, the information may be accessed in interactive fashion. Thus an advertiser wishing to identify concentrations of a particular demographic group, a particular neighborhood or zip codes may enter corresponding information via pull-down menus, a "where are they?" dialog box or other appropriate input devices.

After the asset provider has inputted information relating to a targeted geographical area, the GUI 4400 or software presenting the targeting application forwards the information describing the grid location, size, and type of each shape to the ad buying/data management system 4220. This information is converted into geometry metadata (e.g., identifying grid (FIG. 31A) elements, coordinates defining a polygon, a point and radius, etc.) and the ad buying/data management system associates this geometry metadata with a particular ad from the ad database 4224. The ad buying/data management system 4220 creates metadata from the particular ad in the ad database 4224 and transmits it with the geometry metadata through the delivery network 4228 to the CPE 4232 (e.g., in an ad list submitted prior to transmission of the ad or metadata submitted together with the ad). Because the delivery network may be a broadcast network, some CPEs 4232 may receive ad metadata and geometry metadata that is not appropriate for that particular CPE 4232. The delivery network may or may not employ filtering within a network such as headend filtering or node filtering as described above. In the illustrated embodiment, the CPE 4232 receives the ad metadata and processes it with respect to known location parameters stored inside the CPE 4232. Thus, the CPE 4232 performs an CPE-level filtering.

The CPE-level filtering, as discussed above, may depend on the type of metadata provided by the ad buying/data management system. For example, the geometry metadata provided may include two corners defining a rectangle 4206. The CPE 4232 may construct a set of coordinates within the rectangle 4206 that are included in the rectangle 4206. Assuming that the rectangle 4206 defines an area to be included in the delivery area, the CPE 4232 may then determine whether its coordinates (represented by the coordinates 4234) lie within a set of coordinates defined by the rectangle 4232. Similarly, the metadata sent by the ad buying/data management system may include points defining a trapezoid or other polygon. Another type of metadata may include a point and a radius defining a circle (e.g., 4208 and 4210). The central coordinate pair may correspond to automotive dealership, sporting/events center or other central location of interest to the asset provider. Geometry metadata may include complex metadata such as the shapes described above or other more complex shapes. Geometry metadata may also include a list of points or other forms of encoded lists such as a raster scan, Huffman coding, or run-length coding. Furthermore, as discussed above, the metadata may identify flagged elements at multiple levels of a quadtree data structure. In addition, any combination of metadata may be included as asset providers may desire particular flexibility in determining a targeted area. Indeed, any manner of representing the targeted geography may be included.

Additionally, an asset provider may be interested in designating different levels of fit required between the location of the CPE (e.g., coordinates 4234) and the geometry metadata. For example, an asset provider may require that an asset be delivered only if the CPE 4232 is within a particular county, but may be willing to pay a premium if the asset is delivered within a particular radius of their retail outlet. In another example, the asset provider may draw two circles such as 4208 and 4210, defining a premium area with circle 4210 and a non-premium area 4208. Furthermore, multiple geometry metadata may include overlapping areas such as several contiguous counties, but may exclude a certain portion or portions of the multi-county area. In such a case, the criteria that must be met includes a location criterion of the CPE 4232 being included in the multi-county area and a location criterion of the CPE 4232 being excluded from a particular region of that area, for the asset to be delivered.

FIG. 32 depicts an exemplary state diagram 4300 of the code for an CPE 4232. The CPE 4232 contains an area of code or software (e.g., block diagram 4300) and a CPE hardware interface 4302. The CPE 4232 may perform targeting functions in manner that is consistent with the rest of the system as herein described, such as through voting, determining a goodness of fit, delivery and reporting. For example, the CPE 4232 may receive an asset list (ADR file 4304) and determine a fit between a location 4306 of the ADR 4305 and the location classification parameter 4308 (e.g., stored location coordinates in the CPE). It will be noted, in this regard, that geography may be considered by the targeting system in constructing asset lists. For example, if multiple headends are managed in a single targeting system, and an asset is targeted to a geographic zone that only overlaps a subset of those headends, that asset may only be included in the asset lists disseminated by that subset of headends. The CPE 4232 may then provide a rank 4312 or goodness of fit parameter relating to the ADR or asset list, and combine this rank with ranks (e.g., ranks 4314 and 4316) determined based on other criteria and other classification parameters. The CPE 4232 may then use these ranks to provide an ordered ADR list 4320, or an ordered asset list.

In relation to the ADRs, a CPE need not persistently store geographical targeting information. Specifically, a number of ads may include information defining targeted geographical zones. This information, even if expressed compactly, may include significant amounts of data. To avoid unnecessary use of storage resources, this location information can be used to perform a matching function as described above and then discarded. This is, the location information can be accessed and compared to the CPE location to determine whether or not there is a match. In either case; the location information can be discarded.

These lists become part of an ADR pool 4324 from which the top ADRs 4326 may be used to form a vote 4330. The vote 4330 may be provided to the broadcast network by the CPE 4232 in a manner described above, such as through statistical voting sampling, or during an opportunistic time. The ADR pool 4324 may also be used by the CPE 4232 to select a path 4334 or other plan of viewing assets during an avail window. During such an avail window, the CPE 4232 may navigate through an asset flotilla to deliver assets targeted to the CPE 4232 by asset providers. A viewlist 4338 may be used by the CPE 4232 to compile a report that signifies a particular asset was delivered 4340. An asset delivery notice (ADN 4344) may then be created and transmitted to the network by the CPE 4232.

The clickstream 4350 of a viewer is created when that viewer selects programming or a channel on the CPE 4232 or otherwise provides volume or other inputs. The clickstream 4350 may be used along with information about programming demographics 4352 retrieved from a program guide file 4354 to determine demographics such as age and gender of the viewer presently watching the programming. Such a process is further described above. The set of viewer demographics may be used to determine a rank 4316 of an ADR 4305 based on the viewer's fit to the age/gender 4356 contained in the ADR 4305.

Furthermore, information inferred from the clickstream 4350 may also be included in the viewlist 4338. The CPE 4232 may use the viewlist 4338 (as well as information from the ADR pool 4324) to construct a path 4334. For example, the CPE 4232 may determine from the viewlist 4338 that the viewer is presently watching a sports network and therefore may determine a particular path 4334 that is appropriate based on the present channel being watched.

Location may, in some instances be treated just as other classification parameters are treated by the CPE 4232. For example, targeted classifications may just as easily include location criteria as age, gender, or income criteria in a manner as described above. Thus, the location criteria may be treated interchangeably and analogously with other demographic, psychographic, or marketing criteria 4332.

Location criteria may also be treated differently from other criteria. For example, the location of the CPE 4232 may not change as often as the demographics or psychographics of the user presently watching the television set. In such a case, location information about the CPE 4232 may be determined only periodically (e.g., a reboot of the CPE 4232), and may be stored by the CPE 4232 for quick reference, e.g., as a geographic coordinate pair or geocode or as a grid element identifier. In addition, if the CPE 4232 determines that a particular asset may never be delivered by the CPE 4232 (e.g., because of a strict exclusion of the particular location classification parameter of the CPE 4232), the CPE 4232 may discard the asset metadata or ADR related to the asset and discontinue further inquiry into the goodness of fit of the other classification parameters of the CPE 4232 and/or the viewer.

The location parameters within the CPE 4232 may be used with any type of asset delivery architecture, including forward and store architectures, asset channel navigation architectures, analog architectures, or any combination thereof. For example, a CPE 4232 may store a first asset and/or ADR that is forwarded to it because a location parameter in the CPE 4232 matches a location criterion in the asset, regardless of whether the CPE 4232 is presently being watched, because it may often be assumed that the location parameter of the CPE 4232 does not change between uses of the CPE. Similarly, in advance of an asset flotilla being presented to the CPE 4232, the CPE 4232 may know which assets in the flotilla may or may not be delivered, regardless of who is using the CPE when the flotilla actually arrives. Location parameters of the target CPE 4232 may also be used when an asset or ADR is delivered for real-time filtering of the asset or ADR. Therefore, location may be used both in a real-time manner as well as a non-real-time manner as a layer of filtering, and the particular nature of location criteria/foci and location parameters may be advantageously used by the system.

Location classification parameters 4308 may be stored by the CPE 4232 for use in ranking an asset or an ADR 4305. The CPE 4232 may receive such location classification parameters 4308 from the network as a response to the CPE 4232 providing identification information. On receipt of the CPE identification information by an element within the network (e.g., a customer database) the network may determine the location classification parameter 4308 from information stored in the database. Such information may include the billing address of the customer. The location classification parameter 4308 preferably does not include any individually identifiable information or other sensitive information. For example, the location classification parameter 4308 may include a pair of coordinates on a grid (e.g., (Xn, Yn)) that correspond to multiple users or households. This grid may be a proprietary grid to further conceal any sensitive information in the location classification parameter, or may be in more readily recognizable set of coordinates such as longitude and latitude. The location classification parameter 4308 is sent through the network to the CPE 4232 where it is received and stored. Alternatively, the location classification parameter 4308 may be included within a list of location classification parameters 4348, and may be correlated with a list of CPE identifiers. This list 4348 may be broadcast by the network so that an CPE 4232 may receive the list 4348 and retrieve its own location classification parameter 4308. Those skilled in the art will readily recognize that other systems or methods may be used to communicate with the CPE 4232 and provide the CPE 4232 with its location classification parameter 4308.

When a CPE 4232 reports to the network a delivery of an asset through an ADN 4344, or other form of notification of a particular asset delivery, the CPE 4232 may include information specific to the CPE 4232, including the location of the CPE 4232. However such a report may raise privacy concerns as a subscriber may not wish for an advertiser, or another party, to know that a particular subscriber was either targeted for such an asset, or that such an asset was actually viewed. In this example, the subscriber may find it acceptable for the CPE 4232 to report through the ADN 4344 that an asset was successfully delivered to a CPE 4232 and viewer that met all of the classification, parameters included with the asset (or otherwise provide goodness of fit information). Thus, the actual location or household where the asset was delivered does not need to be disclosed in the ADN 4344 or report, and sensitive information does not need to be disclosed.

It will thus be appreciated that the location targeting functionality can be fully integrated with the functionality of the overall targeting system as described above. Targeting can thus be based on location and other classification parameters such as demographics. Moreover, location targeting can be implemented in connection with audience aggregation and spot optimization models, synchronous and forward-and-store architectures and with voting and reporting functionality. Especially in this case of spot optimization (as is the case for other classification parameters), voting need not always be executed for location targeting (e.g., where there is sufficient bandwidth to provide all asset options for a spot within a given broadcast area). In such cases, the targeting criteria can be provided together with the asset such that the device can select and deliver the appropriate asset. However, it will be appreciated, as noted above, that the functionality associated with implementing location targeting may sometimes vary from that associated with other targeting. For example, location information for a user equipment device may be provided from the network or a location system, whereas other kinds of information may be inferred from a click-stream. Moreover, location is generally device dependent rather than user dependent and may not change as often as other classification parameters for certain devices.

V. Tag Targeting

It is often desired to associate tags with ads in order to better tailor the ad message to a targeted individual household or group. As noted above, such tags may simply be handled as a separate asset (with appropriate logic to maintain the association with the related asset) and targeted to the desired audience segments as discussed above.

However, it is often desired to overlay the tag with the asset such that the asset is seamlessly associated with the asset or such that asset graphics and/or audio continue uninterrupted through at least a portion of the time period where the tag is delivered. Examples of the use of tags are illustrated by FIGS. 35-37.

Figure 35A:
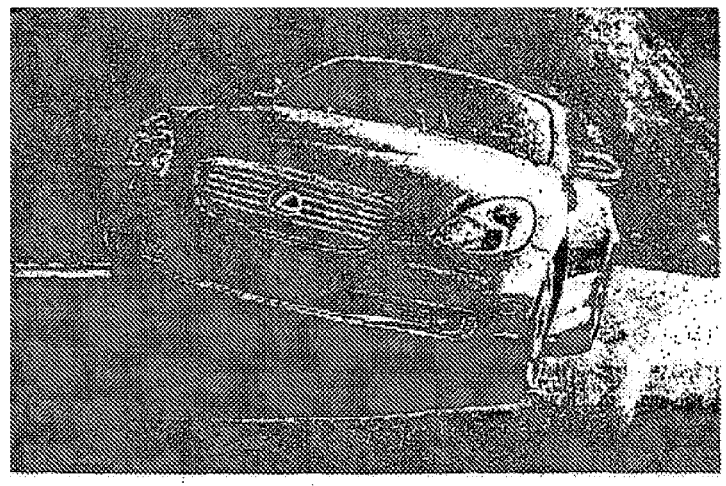
Figure 35B:
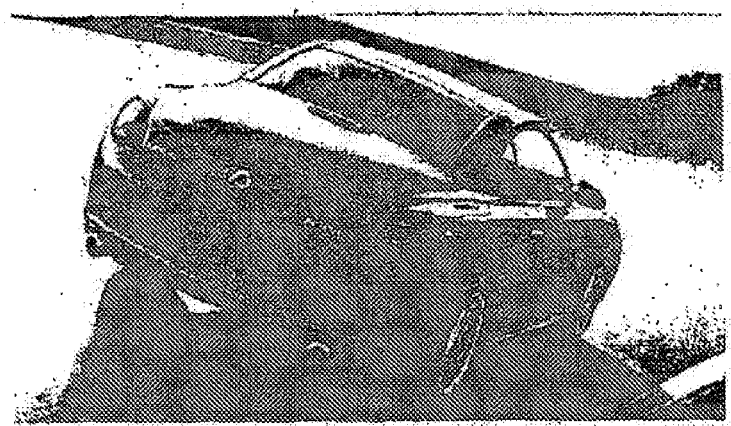
Figure 35C:
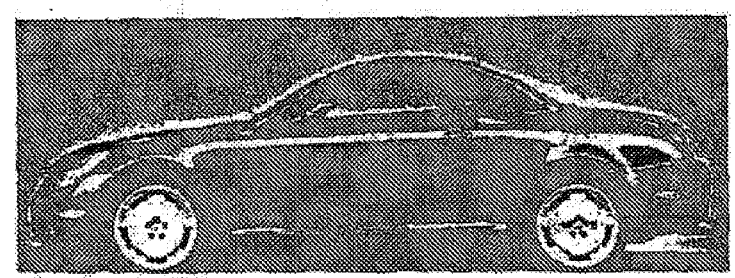
Figure 35D:
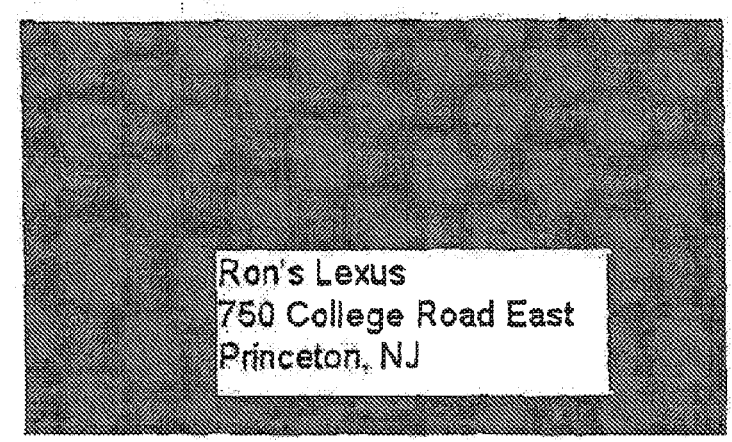

FIGS. 35A-35D illustrate a simple tagging application. The illustrated Figures represent frames of an ad. The last frame; represented by FIG. 35D, is displayed at the conclusion of the ad spot. Thus, a general distribution ad, such as a national ad, is modified by the tag illustrated in FIG. 35D, to provide localized, personalized or otherwise differentiated content, in this case, information regarding a local dealership. This type of system is valuable to advertisers as it allows for combination of the benefits of high quality national scale advertisements with localized information of interest to consumers. The system is also valuable to system operators as they can derive revenues from both, in this case, the automobile manufacturer and the local dealership.

Figure 36A:
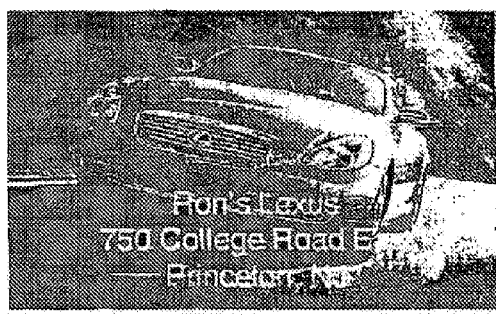
FIG. 36A-37B show alternative ad/tag combinations delivered in accordance with the present invention.
Figure 36B:
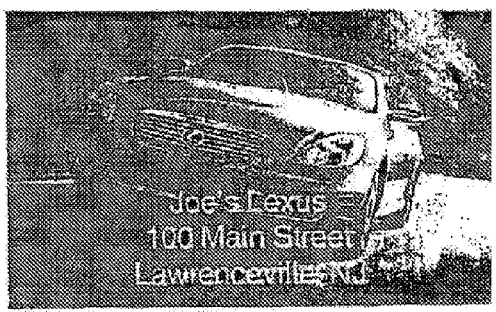

FIGS. 36A and 36B illustrate the use of different tags in connection with the same ad. In this case, an automobile ad is modified by the inclusion of ad tags to identify two different dealerships. It will be appreciated that it would be desirable to deliver these different ad tags in different geographic areas, e.g., proximate to the respective dealerships. It is also noted that the tags, in the case of FIGS. 36A and 36B, are overlayed with the ad. This is desirable for a number of reasons, including increased ad appeal and avoiding the need for extended spot length to accommodate the tag. The present invention accommodates this functionality by utilizing digital overlay devices with appropriate controls to manage and synchronize the output of these devices to ads.

Figure 37A:
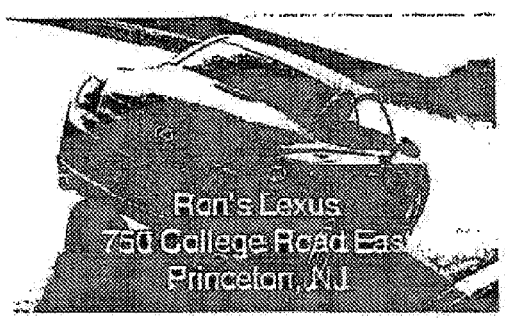
Figure 37B:
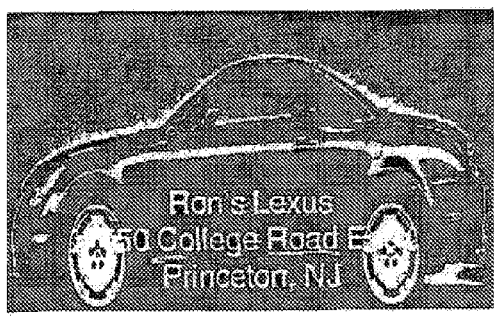

FIGS. 37A and 37B illustrate a further tag implementation. Specifically, in the illustrated example, the same tag is utilized in connection with different ads. It will thus be appreciated that a variety of different ad-tag combinations can be generated in accordance with the present invention. Moreover, targeting of the ads and tags may involve different criteria. For example, in a spot optimization context, an automobile manufacturer may target different ads to different audience segments based on, e.g., demographics. Thus, a first demographic group may receive a sports car ad, whereas another demographic group may receive a luxury car ad. In either case, the tag may be targeted based on location, e.g., proximity to a given dealership.

It should be noted that tag targeting is not limited to location. For example, a department store may associate different tags with an ad to highlight different promotions, e.g., a white sale or a sale on power tools. It may be desired to target those tags to different demographic segments (in addition to or in place of targeting based on geographic zones as discussed immediately above). Thus, it will be appreciated that tags may be targeted based on any of the criteria discussed above associated with asset targeting, though tag targeting and asset targeting may be independent.

The following discussion describes three different tag systems that may be denoted the Simple Tag™ system, the Smart Tag™ system and the Brilliant Tag™ system. These systems have different relative advantages relating to ease of implementation and sophistication of targeting, and any one of these systems may be advantageous for a particular application. Moreover, as discussed below, the systems can be combined to provide hybrid targeting as may be desired. It will be appreciated that these systems are provided to illustrate a variety of implementations in accordance with the present invention, but other implementations are possible within the scope of the present invention.

Figure 38C:
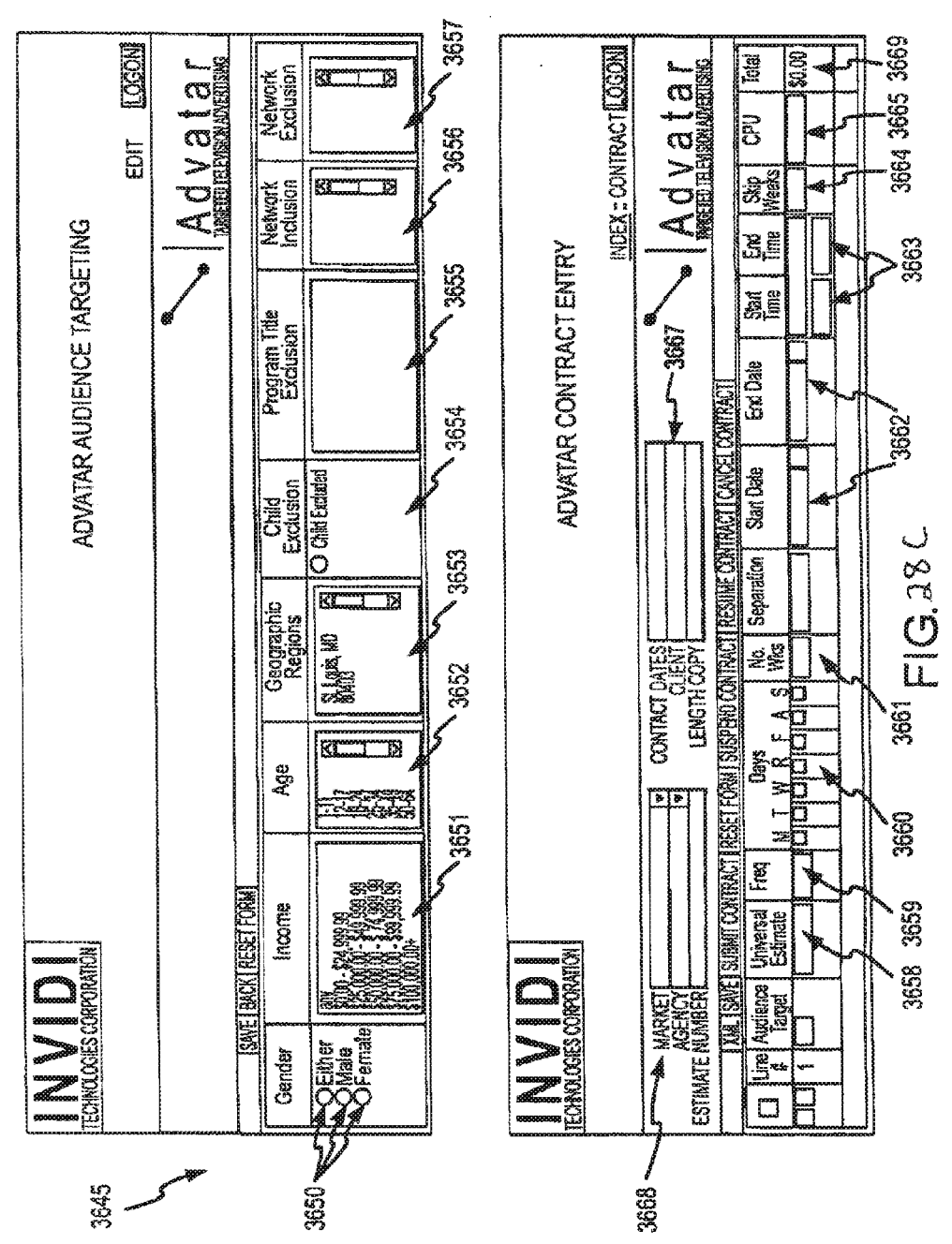

FIG. 38 illustrates a Simple Tag™ system 4900. The system 4900 is implemented in connection with a cable television network that includes a regional headend 4902 and a number of local hubs 4904. The system 4900 enables a system operator to insert high quality tags or overlays and does not require any dedicated logic at user equipment devices at the households 4906. In this case, tag targeting is based on location and, more specifically, on network subdivision location. The granularity of the targeting will depend on where the system is deployed. In this regard, the system may be deployed at the regional headend 4902, at the hubs 4904, at zones (groups of nodes) or at nodes. In some network architectures, finer granularity may be allowed, for example, in connection with nodes of switched digital networks. Furthermore, it should be noted, as will be discussed in more detail below, that location targeting may be performed on the basis of locations independent of network topology with minimal logic resident at the user equipment devices.

In the illustrated embodiment, tag targeting is implemented at the hubs 4904. Thus, all viewers serviced by each hub will see the same tag. Each of the illustrated hubs 4904 includes an ad tag overlay device 4908 and a tag controller 4910. As will be described in more detail below, these components 4908 and 4910 are operative to insert tags in connection with associated ads where the tags are specifically selected for that hub area. Alternatively, if sufficient bandwidth is available, the regional headend 4902 could provide different tag versions of the same networks to the hubs 4904. In that case, overlay equipment would not be required at each of the hubs 4904.

FIG. 39 illustrates tag targeting components 5000 that may be implemented in connection with each of the hubs. The illustrated components 5000 include a tag controller 5010, including an SCTE 30 interface part 5618, a digital overlay device 5008, a DPI splicer 5012, a DPI ad Server 5014 and a cable system 5016. The tag controller 5010 receives content via interface 5009 from a content distribution system (not shown). This content includes the tag content, which may be in the form of text, graphics (still frame or video) and/or audio content. In addition, the tag controller 5010 receives traffic information via interface 5011 from a traffic and billing system such as described above. This traffic information generally includes ad scheduling information.

The DPI Splicer 5012 receives the ads from the DPI Ad Server 5014. The tag controller 5010 is operative for establishing SCTE 30 communications via interface 5001 with the DPI ad splicer 5012, which, in turn, exchanges communications via interface 5003 with the ad server 5014. In addition, the tag controller 5010 is operative to distribute and manage tag content on the digital overlay device 5008, as will be described below. In this regard, ad triggers (carried in the network in the form of SCTE 35 messages) are provided to the DPI splicer 5012 via interface 5005 from a broadcast content source (not shown). The splicer 5012 communicates with the controller 5010 via interface 5001 in response to the cue message information. When the controller 5010 determines that a tag needs to be inserted, it communicates with the splicer 5012 via interface 5007. The splicer 5012 then provides a tag trigger to the overlay device 5008 via interface 5017. Finally, the controller 5010 receives tag verification data from the digital overlay device 5008 and provides tag verifications 5011 to the traffic and billing system. Alternatively or additionally, tag verifications may be sent from the user equipment devices of the cable system 5016 to the controller 5010 via interface 5019, which, in turn, provides verifications (in raw or aggregated form) to the traffic and billing system. In this manner, the traffic and billing system can account for actual delivery of tags in providing affidavits to advertisers and generating bills.

The digital overlay device 5008 receives tag content via interface 5013 from the tag controller 5010 and programming and ad content as well as tag triggers via interface 5017 from the DPI Splicer 5012. The overlay device 5008 uses this trigger information to overlay appropriate tag content on the appropriate network at the time specified in the trigger. In general, this will involve associating the tag content with a designated ad, though tags may be provided in connection with other programming. It will be appreciated that no audio delay is required in this regard. The overlay is terminated at the time specified in the trigger by the digital overlay device 5008. The network with the overlayed tag is then output to the cable system 5016 via interface 5021 for delivery to individual user equipment devices.

Figure 40:
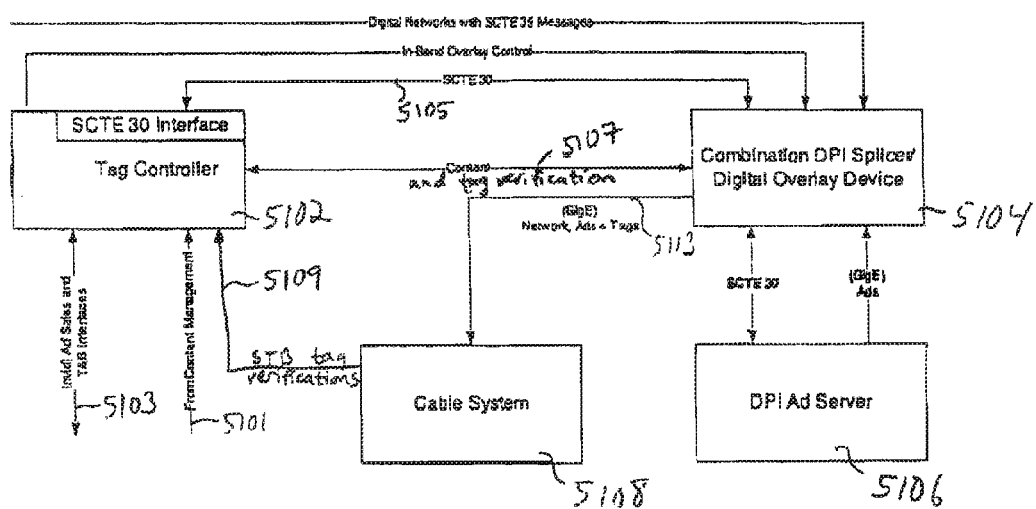

FIG. 40 shows an alternative implementation 5100 of the Simple Tag™ system. In particular, the functionality of the digital, overlay device and the DPI ad splicer are combined into a single component 5104. As in the example described above, the tag controller 5102 is operative to receive tag content via interface 5101 from a content distribution system and receive traffic information 5103 from the traffic and billing system. In this case, the controller 5102 establishes SCTE 30 communications via interface 5105 with the splicer overlay device 5104 and distributes tag content to the splicer overlay device 5104. The tag controller 5102 also receives tag verification data from the splicer overlay device 5104 via interface 5107 and provides tag verifications via interface 5103 to the traffic and billing system. The tag controller 5102 also provides triggers to the device 5104 over the interface 5105. Again, tag verifications may be provided by the user equipment devices of cable system 5108 to the tag controller 5102 via interface 5109, which, in turn, can provide verification information to the traffic and billing system in raw or aggregated form via interface 5103.

As noted above, component 5104 combines the functionality of the digital overlay device and the DPI ad splicer. In this regard, the device 5104 performs standard DPI ad splicing, receives tag content via interface 5107 from the tag controller 5102, receives trigger information via interface 5105 from the tag controller 5102 in the form of SCTE 35 messages with custom descriptors and overlays appropriate tag content on the appropriate network at the time specified in the trigger. The splicer/overlay device 5104 also terminates the tag overlay at the time specified by the trigger. Finally, the splicer/overlay device 5104 outputs the network, including the ad together with the associated tag 5113 to the cable system 5108 for delivery to individual user equipment devices. In the illustrated example, the ad server 5106 and the splicer/overlay device 5104 each have an output interface such as Gigabit Ethernet, IPTV or any other appropriate interface.

Figure 41:
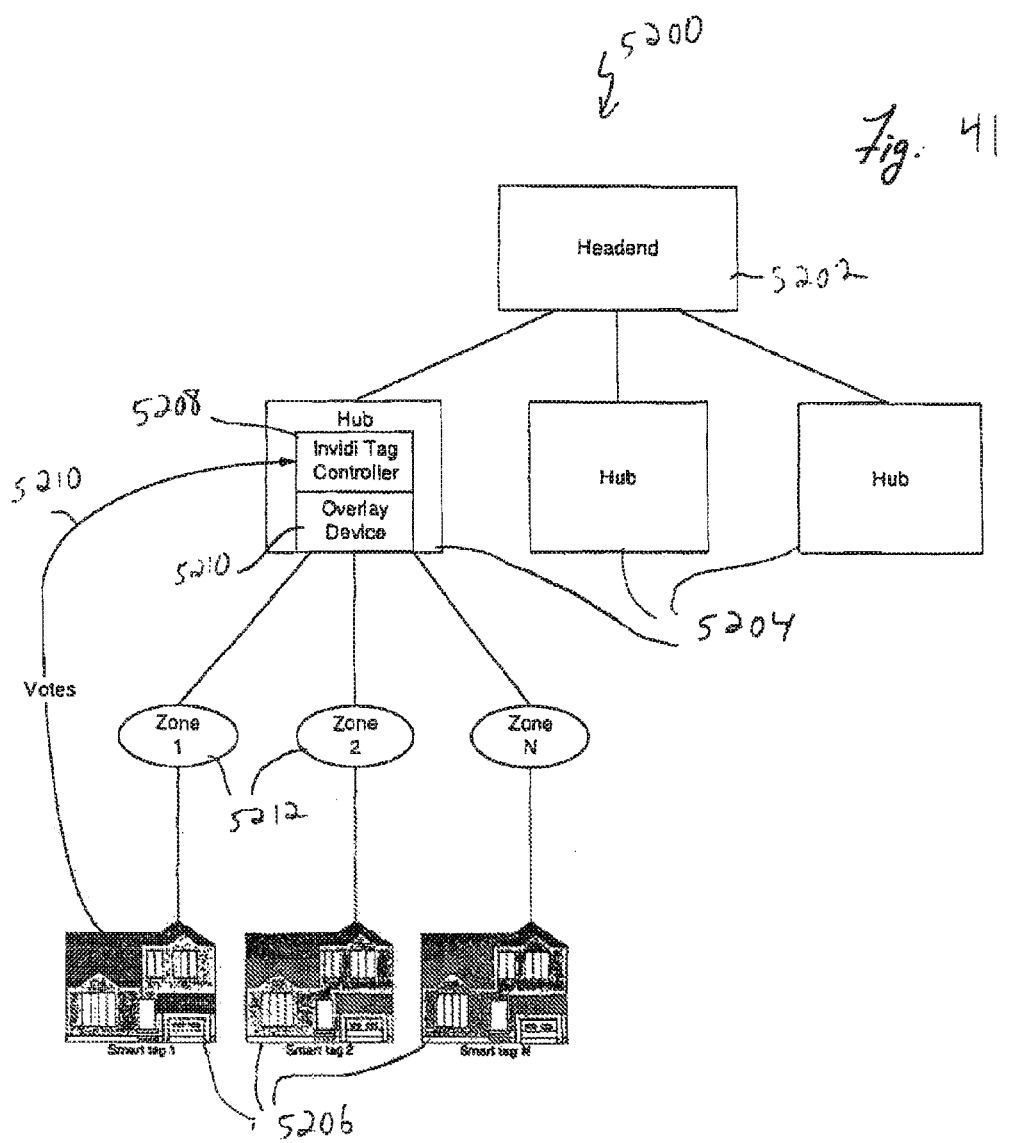

FIG. 41 illustrates a Smart Tag™ System in accordance with the present invention. Again, the system 5200 is implemented in connection with a network that includes a regional headend 5202 and a number of local hubs 5204. Each of the hubs 5204 is associated with a number of subscriber households 5206. Again, each hub 5204 includes a tag controller 5208 and an overlay device 5210.

However, in this case, each of the hub areas is divided into a number of location zones 5212. For example, each of these zones may encompass a number of nodes, analogous to a Service Group. In addition, the user equipment device(s) associated with each household 5206 includes an application operative to transmit votes 5210 to the hub 5208. These votes 5210 can be analogous to the votes described above in connection with asset targeting, though it should be appreciated that targeting of assets and targeting of tags may be independent of one another and may be processed on different platforms. As described above in connection with the voting process for targeting of assets, information, such as a list of tags and associated targeting parameters, may be distributed to user equipment devices in advance of an ad for which a tag is to be associated. The user equipment device receives this information and transmits the vote 5210 identifying one or more tags, for example, together with a goodness of fit score. All of the user equipment devices, or a sampling thereof, for each zone 5212 may submit votes in this regard.

The hub 5204 processes these votes to select a tag for association with a given ad on a given channel for each zone 5212. In this regard, all households within a zone area receive the same tag. However, the households 5206 in different zones 5212 may receive different tags based on the voting.

Thus, in the illustrated implementation, the tag controller 5208 is operative to broadcast tag descriptions to user equipment devices, to receive and process votes and to inform the overlay device 5210 of the appropriate tag for each zone 5212. The user equipment devices in the illustrated implementation are operative to determine user or household classification information, receive the tag description information from the tag controller 5208 and use the classification information and the description information to vote for one or more appropriate tags. As described above, the classification information may be determined based on user inputs, such as a remote control click stream and/or other information.

Figure 42:
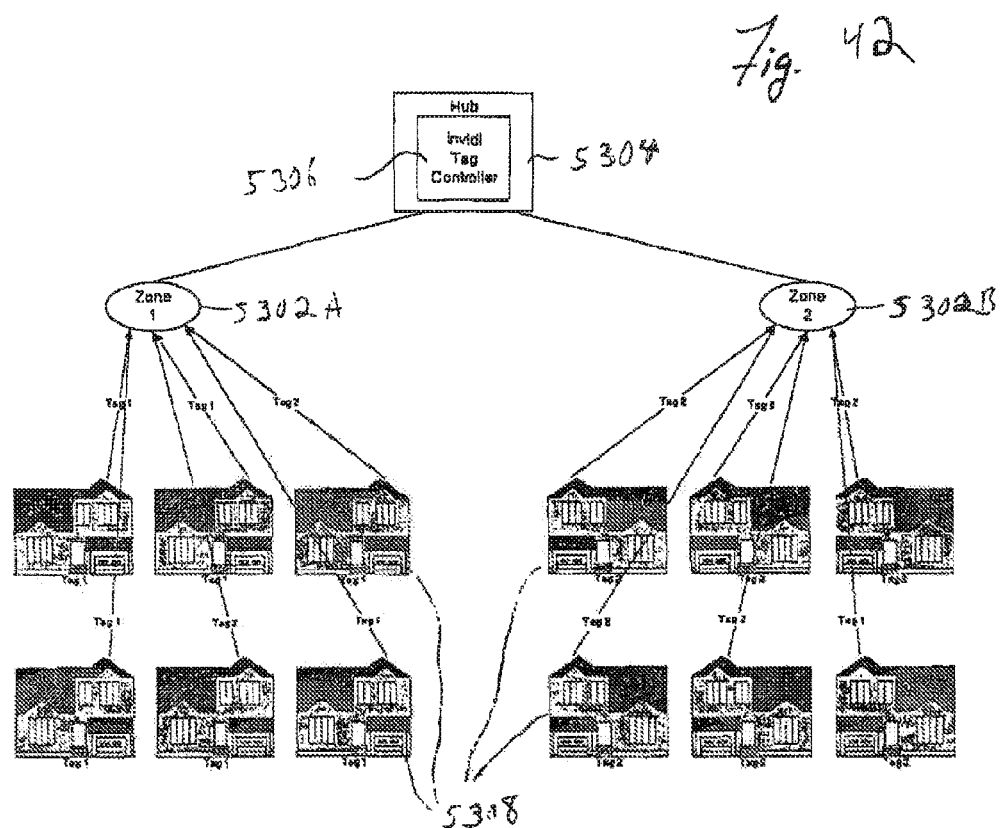

FIG. 42 further illustrates the Smart Tag™ functionality. In this case, there are two zones 5302 A and 13 associated with a hub 5304. The tag controller 5306 broadcasts descriptive information for the tags to user equipment devices of at least some households 5308 connected to the hub 5304. As noted above, these user equipment devices include a classifier capable of developing and/or storing a profile for a corresponding user or household. The user equipment devices utilize this classification information to vote for one or more appropriate tags.

In the illustrated example, in zone 1 5302A, four user equipment devices voted for tag 1 while two user equipment devices voted for tag two. By contrast, in zone 2 5302B, five user equipment devices voted for tag 2 while one user equipment device voted for tag 1. As a result, the tag controller 5306 may direct the digital overlay device to insert tag 1 at the appropriate time for zone 1 and to insert tag 2 at the appropriate time for zone 2 5302B.

In the case of the illustrated system, every user equipment device in zone 15302A will receive tag 1 while every user equipment device in zone 2 5302B will receive tag 2. The illustrated example assumes that two different outputs are generated in the hub 5304: one for zone 1 5302A and one for zone 2 5302B. It will be appreciated that, if a tag is targeted strictly on network subdivision location, voting would be unnecessary as the tag controller 5306 could assign the correct tag for each network subdivision zone. However, if targeting is based on location parameters that are independent of network subdivisions, voting may still be useful. Of course, voting will be useful for targeting parameters other than location such as marketing information or promotions.

It will be appreciated that the illustrated system represents an improvement in targeting in relation to the Simple Tag™ system described above. Specifically, while the granularity of targeting is still limited to network subdivisions (in this case, zones), the tag inserted for each zone is based on current network conditions. As a result, a better matching of the tag to the targeted group may be achieved. Nonetheless, as the above example illustrates, some user equipment devices will receive a tag other than that for which they voted. That is, some user equipment devices will not receive the most suitable tag. This result may be tolerable for many applications. Indeed, this result may be viewed as entirely desirable, given that the result can be achieved with minimal tag targeting logic associated with the user equipment devices. However, where better targeting is desired, the Brilliant Tag™ system may be utilized.

FIG. 43 illustrates a Brilliant Tag™ system implementation. Again, the system 5400 is implemented in connection with a network that includes a regional headend 5402 associated with a number of hubs 5404. In the illustrated network, each of the hubs 5404 is associated with a number of zones 5406, each of which, in turn, is associated with a number of subscriber households 5408. At least some of the households 5408 include one or more user equipment devices that are operative to transmit votes 5409 to a targeting system 5410 associated with the hub 5404, as described above.

In the case of the illustrated Brilliant Tag™ system 5400, the user equipment devices are operative to insert tags in association with ads. In this manner, different user equipment devices, even within a given zone 5406, can render different tags in connection with the same ad-on the same channel at the same time.

Accordingly, the illustrated system 5410 is operative to broadcast tag descriptions to the user equipment devices, to receive and process votes, to broadcast multiple tag assets (e.g., based on the votes) to each user equipment device within a given zone 5406 and to broadcast tag triggers to the user equipment devices. Alternatively, in connection with a forward and store architecture, the tags may be transmitted to the user equipment devices in advance of the ad together with targeting information for the tag. Such an implementation may be executed with or without voting.

In the illustrated implementation, the user equipment devices are operative to store or develop classification information for a user or household, to receive tag description information from the targeting system 5410, to vote for one or more tags, to receive the tag triggers and to render the appropriate tag at the appropriate time on the appropriate channel. These tags can include text, audio, and/or graphics (still-frame or video) depending on the storage and graphic overlay capabilities of the user equipment devices. Because tag insertion is executed at the user equipment devices in the illustrated embodiment, it will be appreciated that the system 5400 cannot infer accurate delivery information based on broadcasting of the tags. Accordingly, it is desirable to receive report information from the user equipment devices. Accordingly, in the illustrated embodiment, at least some of the user equipment devices are further operative for reporting (in relation to at least some tag deliveries) tag delivery to the targeting system 5410, which, in turn, provides reporting information (in raw or aggregated form) to the traffic and billing system.

It will be appreciated that the illustrated system 5400 does not require any additional overlay device in order to perform tagging. However, combinations of the above noted systems may be utilized. For example, a Smart Tag™ system could be deployed in the hub 5404 to overlay a roughly targeted high resolution graphic image while a Brilliant Tag™ system could be implemented at the user equipment device to add a highly targeted text based tag. The combination of the two systems thus provides the highest quality of graphics and the most precisely targeted text message for tags associated with a given ad.

A variety of functionality may be implemented in connection with the tag systems described above. As noted above, the bandwidth available for tag distribution may be limited. It is desirable to populate this bandwidth with tags that are well targeted to the current audience or otherwise selected to maximize value. This may be accomplished, in part, through a voting process as described above. Specifically, a list of available tags may be distributed to at least some user apartment devices in advance of the ad slot for which tags are available. At least some (preferably, a statistically significant sampling) of those user equipment devices may submit votes. These votes may identify one or more appropriate tags as determined by comparison of targeting parameters associated with the tags with classification parameter values for a current user or users. The classification parameter values may be determined by a classifier using, among other things, a click stream entered by the user or users.

In addition, at least some of the user equipment devices may generate reports identifying the tags delivered by the user equipment devices. In some cases, especially where the user equipment device is not actively involved in inserting the tag, the user equipment device may become aware of the tag delivered based on a water mark or metadata associated with tag. Additionally or alternatively, reports may be generated and a headband or other network platform involved in tag distribution. For example, where both the user equipment device and a network platform are involved in inserting a tag, reports may be generated from both user equipment devices and one or more network platforms.

Relatedly, a hybrid tag may be generated from content inserted at multiple locations. For example, a part of the tag content may be generated at a headband or other network platform and another part of the tag content may be generated at a separate network platform or at the user equipment device. This may be desirable, for example, when it is desired to construct a tag including high-quality graphics as well as highly targeted content. The high-quality graphics may be generated at a network platform and highly targeted text may be delivered to user equipment devices. This represents a significant improvement in relation to certain prior tag systems that were limited to lower quality graphics overlapped at the end of an ad.

The tag systems as described above are not limited to operation in conventional broadcast mode. For example, tags may be utilized in connection with VOD or time shifted programming. In the latter regard, networks and network operators are increasingly making programming available on a time shifted basis, for example, the day after the original run of the programming. In such cases, it may be desired to customize the ads and/or the tags in relation to the time shifted context. For example, the ads and/or tags may be customized based on the time of day of the time-shifted programming. This can be accomplished using the tag targeting systems as described above.

In such time-shifted cases, as well as in other cases, the tag to be used in connection with the programming content (as well as any asset associated with the tag) may be transmitted to the user equipment device in synchronization with the programming content or separate therefrom. For example, it may be desired to transmit tags in advance of the time-of-delivery for the tags, e.g., for storage on a DVR hard drive or in any other suitable memory associated with a user equipment device, e.g., a flash drive. This may facilitate the use of tags that are very specifically targeted to individual households or users based on location or other targeting criteria. For example, many different tags may be transmitted with very specific targeting criteria. These tags can be transmitted over a significant period of time as bandwidth is available, thus reducing bandwidth related limitations on the number of tags that may be utilized. Individual user equipment devices can analyze the targeting criteria as received and store only appropriate, or potentially appropriate, tags, thus reducing storage related limitations on the number of tags that may be utilized. Accordingly, highly targeted tags can be implemented in a practical manner.

The tag systems as described above can also be used in connection with IPTV or other systems that allow for delivery of individualized content streams to specific user equipment devices. In such cases, particular ad/tag combinations can be directly delivered to individual user equipment devices. As a result, records regarding delivery of tags to user equipment devices can be generated by the network platform that addresses the combination to the user equipment device.

In addition, the capabilities of user equipment devices may be considered in relation to the tags distributed to the devices. For example, classes of devices may be defined depending on the capabilities of the devices. These classes of devices may be used as a voting criterion or otherwise considered in selecting tags for distribution. Also, the tags distributed to devices may be based in part on settings associated with the devices. For example, a device may have a setting reflecting a preferred language of the user. This setting may be used as a voting criterion or otherwise considered in selecting a language of the tag to be distributed. Similarly, if the tags are distributed in multiple languages, the setting on the box may be used to select which tag to insert.

Billing for tag delivery may be combined with other billing. Specifically, network operators may desire to bill advertisers based on the delivery of tags. It will be appreciated in that advertisers are also built based on delivery of associated assets that may be implemented by a separate system. Advertisers may desire to have these bills combined. In this regard, the traffic and billing system can combine billings for tying delivery and for asset delivery. It is noted in this regard that the tag targeting system is generally aware of the association between a tag and the related assets. This relationship can be used to link the related billing values. In any event, the tag may be associated with a particular advertiser thus enabling association of the tag billing with the appropriate bill.

Moreover, the potential audience for a tag may be estimated by the traffic and billing system or a targeted advertising system ad sales interface. In this regard, the advertiser may enter various targeting parameters as discussed above in connection with establishing a tag contract. Based on these targeting parameters, the traffic and billing system can estimate in substantially real-time the likely audience for the tag. This estimation may be based on intelligence built up based on voting, reporting or other data related to previous tag campaigns.

Contracts for the delivery of the tags may be purchased and sold in a variety of different ways. For example, this may be accomplished through the traffic and billing system (e.g., a campaign management system) as described above or through a separate sales interface, e.g., associated with the targeted advertising system. It is noted, in this regard, that in some cases the tags will benefit a party other than the advertiser who has purchased a spot in connection with which the tag is delivered, e.g., the spot may be purchased by an automobile manufacturer and the tag may principally benefit a local dealer in other cases, the tag may benefit the same party who purchased the associated spot, e.g., in the case of a department store ad with targeted tags to promote specific special offers as a function of user classification parameters. As a result, a business model associated with the tags may or may not generate separate bills to separate parties in connection with various ad/tag combinations. Moreover, as an important attribute of the tag targeting system is its ability to provide more finely targeted information in connection with ads having a more general distribution, the delivery of tags in terms of audience size and composition will often not be commensurate with that of associated ads, thus indicating the desirability for separate accounting.

In addition, as noted above, various implementations of the tag targeting system are possible relating, for example, to whether the tags are inserted at the user equipment device or elsewhere and whether reports are generated by user equipment devices. Depending on the implementation, different information may be available (e.g., the presence or absence of goodness of fit information based on reports from user equipment devices) from different sources (reports form user equipment devices or from network insertion platforms). While a traffic and billing system may be adapted to accommodate such differences in implementation, it may be preferable in some cases to handle purchases of tag delivery and billing therefore to a separate campaign manager.

Moreover, tag space—which may have time, bandwidth (e.g., channel), location (e.g., relative to a television screen), geographic location, user classification and/or other dimensions—may be sold by auction. For example, using a graphical user interface as described above (modified to include a field for bids), an advertiser may enter a bid for any tag space available for bidding. Such tag space may be defined by a network operator or agent thereof, or may be defined by the advertiser by populating the various fields available on the user interface. A bidding time period may be defined, for example, extending subject to practical limitations up to the time for delivery of the tag. Advertisers may view the status of their bids on-line or may be notified (e.g., by e-mail, phone, etc.) if a bid has been exceeded by a competing bid. In cases where a given tag space (e.g., in terms of time, channel and screen space) as defined by a network operator or advertisers, is available on an apportioned, non-conflicting basis (e.g., in terms of different geographic areas or audience classification), there may be more than one successful bid. In this manner, tag space can be efficiently allocated.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed:

1. Method for use in targeting broadcast network content, comprising the steps of:
    first providing a first network platform for transmitting non-local assets in first asset delivery opportunities dedicated to delivery of non-local assets and inserting one or more local assets in one or more second asset delivery opportunities dedicated to delivery of local assets, each of the first and second asset delivery opportunities being associated with a given program presented on given bandwidth of said broadcast network at a given time;
    second providing a plurality of second network platforms, each of said second network platforms being operative for receiving content from said first network platform and selectively providing portions of said content for delivery at one or more user equipment devices, each of said second network platforms comprising a classifier configured to determine a classification of one or more current users of each respective one or more user equipment devices;
    determining a first current viewer classification of a first one of said user equipment devices using the classifier of a first one of said second network platforms;
    determining a second current viewer classification of a second one of said user equipment devices using the classifier of a second one of said second network platforms;
    selecting, using the first one of said second network platforms, a first asset received from the first network platform and associating the first asset with a first tag to thereby provide first combined content, said first combined content having a high suitability with respect to the one or more current viewers relative to other network users, said first tag comprising at least one of text, graphics, video or audio content to supplement content of said first asset;
    selecting, using the second one of said second network platforms, a second asset, the same as or different than said first asset, received from the first network platform and associating the second asset with a second tag to thereby provide second combined content, said second combined content having a high suitability with respect to the second current viewer relative to other network users, said second tag comprising at least one of text, graphics, video or audio content to supplement content of said second asset;
    third providing, from the first one of said second network platforms to at least the first one of said user equipment devices, said first combined content for one of said first and second asset delivery opportunities; and
    fourth providing, from a second one of said second network platforms to at least a second one of said user equipment devices different than said first one, said second combined content for said one of said first and second asset delivery opportunities;
    wherein said first combined content is different than said second combined content.

2. A method as set forth in claim 1, wherein at least one of said second network devices comprises a hub associated with a number of user equipment devices.

3. A method as set forth in claim 1, where in at least one of said second network devices is co-located with a user equipment device.

4. A method as set forth in claim 1, wherein said first and second combined content are provided to said first and second ones of said second network platforms prior to a time of delivery of said first and second combined content segments by said first and second ones of said user equipment devices.

5. A method as set forth in claim 1, further comprising the step of providing report information to a billing system of a broadcast network, said report information providing an indication concerning which of said first tag or said second tag was delivered to each of said user equipment devices.

6. A method as set forth in claim 1, further comprising the step of transmitting an indication regarding a suitability of at least one of said tags from a user equipment device to a network platform.

7. A method as set forth in claim 1, said first one of said user equipment devices and said second one of said user equipment devices are each disposed in a first broadcast network subdivision, said first broadcast network subdivision defining an area wherein all user equipment devices receive the same broadcast content on a given bandwidth segment, said method further comprising delivering, at a first time, said first combined content segment at said first one of said user equipment devices, said first user equipment device being associated with a first bandwidth segment of said broadcast network at said first time, and delivering, at said first time, a said second combined content segment at said second one of said user equipment devices, said second one of said user equipment devices being associated with said first bandwidth segment of said broadcast network at said first time.

8. A method for use in targeting broadcast network content, comprising the steps of:
    providing a network platform for processing assets for delivery to user equipment devices in said broadcast network;
    obtaining a number of assets at said network platform;
    obtaining a number of tags comprising at least one of text, graphics, video and audio content to supplement an associated one of said assets and for association with said assets at said network platform, each of said tags representing a local asset option;
    establishing a first combined content segment by overlaying one of said tags on one of said assets;
    establishing a second combined content segment by overlaying one of said tags on one of said assets, wherein said first combined content segment is different than said second combined content segment;

classifying a first subset of the current users of a given bandwidth segment of said broadcast network by determining a first user classification common to said first subset of the current users;

classifying a second subset of the current users of a given bandwidth segment of said broadcast network by determining a second user classification common to said second subset of the current users, wherein at least some of said first subset of users are disposed within the same broadcast network subdivision as at least some of said second subset of users, said broadcast network subdivision defining an area wherein all user equipment devices receive the same broadcast content on said given bandwidth segment at a given time;

delivering said first combined content segment to the first subset of the current according to a determination that said first combined content segment has a high suitability with respect to the first user classification relative at least to the second user classification; and delivering said second combined content segment to the second subset, different than said first subset, of the current users according to a determination that said second combined content segment has a high suitability with respect to the second user classification relative at least to the first user classification.

9. A method as set forth in claim 8, wherein at least one of said first and second combined content segments is delivered using a bandwidth segment separate from said given bandwidth segment.

10. A method as set forth in claim 8, further comprising the step of receiving report information from at least some users of said first and second subsets of the current users, said report information providing an indication concerning actual delivery of a tag.

11. A method as set forth in claim 8, further comprising the step of receiving communications from at least some users of said first and second subsets of the current users, each said communication including an indication regarding a suitability of one or more of said tags for delivery at an associated user equipment device.

12. A method as set forth in claim 8, wherein said steps of delivering said first combined content segment and delivering said second combined content segment comprise selecting said first and second combined content segments at user equipment devices.

13. An apparatus for use in targeting broadcast network content, comprising:

a network platform for processing assets for delivery to user equipment devices in said broadcast network;

an input interface structure, associated with said network platform, for receiving a number of assets and a number of tags for association with said assets, each of said tags comprising at least one of text, graphics, video and audio content to supplement an associated one of said assets;

a classifier for classifying a first subset of the current users of a given bandwidth segment of said broadcast network by determining a first user classification common to said first subset of the current users, and for classifying a second subset of the current users of a given bandwidth segment of said broadcast network by determining a second user classification common to said second subset of the current users, wherein at least some of said first subset of users are disposed within the same broadcast network subdivision as at least some of the second subset of users, said network subdivision defining an area wherein all user equipment devices receive the same content on a given bandwidth segment at a given time;

an overlay device for establishing a first combined content segment by overlaying one of said tags on one of said assets and establishing a second combined content segment by overlaying one of said tags on one of said assets, wherein said first combined content segment is different than said second combined content segment; and an output interface structure, associated with said network platform, for delivering said first combined content segment to said first subset of said current users of a given bandwidth segment of said broadcast network according to a determination that said first combined content segment has a high suitability with respect to the first user classification relative at least to the second user classification, and delivering said second combined content segment to said second subset, different than said first subset, of the current users of said given bandwidth segment of said broadcast network according to a determination that said second combined content segment has a high suitability with respect to the second user classification relative at least to the first user classification.

14. An apparatus as set forth in claim 13, wherein said output interface structure is operative for inserting at least one of said first combined content segment and said second combined content segment into a bandwidth segment separate from said given bandwidth segment.

15. An apparatus as set forth in claim 13, further comprising a processor for receiving input information from user equipment devices indicating a suitability of tags and selecting said first and second combined content segments based on said input information.

16. An apparatus as set forth in claim 13, further comprising a processor operative for associating targeting information related to user classification information with said first and second combined content segments.

* * * * *